United States Patent [19]
Havekost et al.

[11] Patent Number: 5,768,119
[45] Date of Patent: Jun. 16, 1998

[54] PROCESS CONTROL SYSTEM INCLUDING ALARM PRIORITY ADJUSTMENT

[75] Inventors: Robert B. Havekost, Austin; Ken J. Beoughter; Roy Faltesek, both of Round Rock, all of Tex.

[73] Assignee: Fisher-Rosemount Systems, Inc., Austin, Tex.

[21] Appl. No.: 631,556

[22] Filed: Apr. 12, 1996

[51] Int. Cl.⁶ .......................... G05B 15/00; G05B 19/18
[52] U.S. Cl. .......................... 364/133; 364/188; 364/187; 395/200.02; 395/200.03
[58] Field of Search .................. 364/146, 188, 364/133, 187, 136; 395/200.03, 200.05, 200.02; 345/214, 215, 965, 970

[56] References Cited

U.S. PATENT DOCUMENTS

| | | | |
|---|---|---|---|
| 3,665,172 | 5/1972 | Spaargaren et al. | 235/150.1 |
| 4,639,852 | 1/1987 | Motomiya | 364/138 |
| 4,641,269 | 2/1987 | Japenga et al. | 364/473 |
| 4,663,704 | 5/1987 | Jones et al. | 364/188 |
| 5,164,894 | 11/1992 | Cunningham-Reid et al. | 364/131 |
| 5,307,346 | 4/1994 | Fieldhouse | 370/85.1 |
| 5,371,895 | 12/1994 | Bristol | 395/800 |
| 5,412,756 | 5/1995 | Bauman et al. | 395/50 |
| 5,432,711 | 7/1995 | Jackson et al. | 364/514 |
| 5,444,851 | 8/1995 | Woest | 395/200.1 |
| 5,452,201 | 9/1995 | Pieronek et al. | 364/188 |
| 5,475,856 | 12/1995 | Kogge | 395/800 |
| 5,481,741 | 1/1996 | McKaskle et al. | 395/800 |
| 5,485,620 | 1/1996 | Sadre et al. | 395/700 |
| 5,491,625 | 2/1996 | Perssnall et al. | 364/133 |
| 5,513,095 | 4/1996 | Pajonk | 364/131 |
| 5,530,643 | 6/1996 | Hodorwski | 364/191 |
| 5,549,137 | 8/1996 | Lenz et al. | 137/468 |
| 5,550,980 | 8/1996 | Pascucci et al. | 395/200.05 |
| 5,566,320 | 10/1996 | Hubert | 395/474 |
| 5,576,946 | 11/1996 | Bender et al. | 364/146 |

*Primary Examiner*—Reba I. Elmore
*Assistant Examiner*—Ramesh Patel
*Attorney, Agent, or Firm*—Skjerven, Morrill, MacPherson, Franklin & Friel LLP; Ken J. Koestner

[57] ABSTRACT

A process control system includes an alarm and event monitoring and display system for which various users of the system can easily prioritize the alarm and event information that is displayed. The alarm and event configuration is highly flexible and is configured by a user to display particular events in a hierarchical manner, as directed by the user. The user sets a desired alarm priority, selecting high importance alarms for more urgent display and annunciation and rendering a lower display status to less urgent events. At log-on, a particular system user is associated with a display configuration for displaying alarm and event information that is pertinent to that user and the process control system is automatically "primed" with current alarms and initiate process information about new alarm and event occurrences.

30 Claims, 31 Drawing Sheets

PROCESS CONTROL SYSTEM INCLUDING ALARM PRIORITY ADJUSTMENT

CROSS-REFERENCE TO RELATED APPLICATIONS

This application is related to copending application by Nixon et al., entitled "A Process Control System Using Standard Protocol Control of Standard Devices and Non-standard Devices", filed on even date herewith, U.S. patent application Ser. No. 08/631,862, which application is hereby incorporated by reference in its entirety, including any appendices and references thereto.

This application is related to copending application by Nixon et al., entitled "A Process Control System for Versatile Control of Multiple Process Devices of Various Device Types", filed on even date herewith, U.S. patent application Ser. No. 08/631,521, which application is hereby incorporated by reference in its entirety, including any appendices and references thereto.

This application is related to copending application by Nixon et al., entitled "Process Control System for Monitoring and Displaying Diagnostic Information of Multiple Distributed Devices", filed on even date herewith, U.S. patent application Ser. No. 08/631,557, which application is hereby incorporated by reference in its entirety, including any appendices and references thereto.

This application is related to copending application by Nixon et al., entitled "Process Control System Including Automatic Sensing and Automatic Configuration of Devices", filed on even date herewith, U.S. patent application Ser. No. 08/631,519, which application is hereby incorporated by reference in its entirety, including any appendices and references thereto.

This application is related to copending application by Nixon et al., entitled "A Process Control System User Interface Including Selection of Multiple Control Languages", filed on even date herewith, U.S. patent application Ser. No. 08/631,517, which application is hereby incorporated by reference in its entirety, including any appendices and references thereto.

This application is related to copending application by Dove, entitled "System for Assisting Configuring a Process Control Environment", filed on even date herewith, U.S. patent application Ser. No. 08/631,458, which application is hereby incorporated by reference in its entirety, including any appendices and references thereto.

This application is related to copending application by Nixon et al., entitled "Process Control System Using a Control Strategy Implemented in a Layered Hierarchy of Control Modules", filed on even date herewith, U.S. patent application Ser. No. 08/631,520, which application is hereby incorporated by reference in its entirety, including any appendices and references thereto.

This application is related to copending application by Dove et al., entitled "System for Configuring a Process Control Environment", filed on even date herewith, U.S. patent application Ser. No. 08/631,863, which application is hereby incorporated by reference in its entirety, including any appendices and references thereto.

This application is related to copending application by Nixon et al., entitled "A Process Control System Using a Process Control Strategy Distributed Among Multiple Control Elements", filed on even date herewith, U.S. patent application Ser. No. 08/631,518, which application is hereby incorporated by reference in its entirety, including any appendices and references thereto.

This application is related to copending application by Nixon et al., entitled "Improved Process System", filed on even date herewith, U.S. Provisional patent application Ser. No. xx/xxx,xxx, which application is hereby incorporated by reference in its entirety, including any appendices and references thereto.

BACKGROUND OF THE INVENTION

1. Field of the Invention

This invention relates to process control systems. More specifically, the present invention relates to a process control system which monitors and uniformly displays diagnostic information of devices of multiple different types.

2. Description of the Related Art

Present-day process control systems use instruments, control devices and communication systems to monitor and manipulate control elements, such as valves and switches, to maintain at selected target values one or more process variables, including temperature, pressure, flow and the like. The process variables are selected and controlled to achieve a desired process objective, such as attaining the safe and efficient operation of machines and equipment utilized in the process. Process control systems have widespread application in the automation of industrial processes such as the processes used in chemical, petroleum, and manufacturing industries, for example.

Control of the process is often implemented using microprocessor-based controllers, computers or workstations which monitor the process by sending and receiving commands and data to hardware devices to control either a particular aspect of the process or the entire process as a whole. The specific process control functions that are implemented by software programs in these microprocessors, computers or workstations may be individually designed, modified or changed through programming while requiring no modifications to the hardware. For example, an engineer might cause a program to be written to have the controller read a fluid level from a level sensor in a tank, compare the tank level with a predetermined desired level, and then open or close a feed valve based on whether the read level was lower or higher than the predetermined, desired level. The parameters are easily changed by displaying a selected view of the process and then by modifying the program using the selected view. The engineer typically would change parameters by displaying and modifying an engineer's view of the process.

In addition to executing control processes, software programs also monitor and display a view of the processes, providing feedback in the form of an operator's display or view regarding the status of particular processes. The monitoring software programs also signal an alarm when a problem occurs. Some programs display instructions or suggestions to an operator when a problem occurs. The operator who is responsible for the control process needs to view the process from his point of view. A display or console is typically provided as the interface between the microprocessor based controller or computer performing the process control function and the operator and also between the programmer or engineer and the microprocessor based controller or computer performing the process control function.

Alarm and event information is one type of information that is highly critical to monitor and display in a process control system. However with the various types of devices in a process control system, including a wide variety of field devices, alarm information is not generally monitored in a useful manner. For example, very different urgencies may exist with respect to a particular alarm. Some alarm conditions may be indicative merely that some routine servicing should take place without urgency. Other alarm conditions require immediate attention. Certain devices in the process control system may measure highly critical conditions while other devices monitor much less urgent information. Furthermore, important some alarm conditions may relate to information the interaction of multiple portions of the control system, for example, the combined operations of a controller and device or multiple devices and controllers. Alarm conditions relating to multiple circuits and devices in a system are typically not handled by existing process control systems.

Alarm and event information is most useful when related to the various control operations that are occurring when the conditions are monitored. Conventional process control systems typically access and display alarm information with no relation to the control operations or control schemes that are functioning during diagnostic testing. Conventional process control systems generally do not have a consistent system for setting priority of different alarm conditions and events.

One problem associated with the use of graphical views for alarm and event displays is that existing systems allow only the equipment manufacturer, not a user of this equipment, to define the alarms and events to be monitored, along with associated graphical views, or modify predefined event priorities. Different types of users may need to visualize different aspects of the process control system. For example, some users have a capability to change only some operating aspects of the control system. These users should have access to condition information which they can control while for other events that may be controlled by another user, alarm information is not urgently needed.

What is needed is a uniform or universal design environment that can easily be used, not only by a designer or manufacturer but also a user, to prioritize display of alarm and event information.

SUMMARY OF THE INVENTION

In accordance with the present invention, a process control system includes an alarm and event monitoring and display system for which various users of the system can easily prioritize the alarm and event information that is displayed. The alarm and event configuration is highly flexible and is configured by a user to display particular events in a hierarchical manner, as directed by the user. The user sets a desired alarm priority, selecting high importance alarms for more urgent display and annunciation and rendering a lower display status to less urgent events. At log-on, a particular system user is associated with a display configuration for displaying alarm and event information that is pertinent to that user and the process control system is automatically "primed" with current alarms and initiate process information about new alarm and event occurrences.

Many advantages are achieved using the described process control method. One advantage is that alarm information is presented to a user who can best use that information in a manner directed by the user. Another advantage is that a user attains access to the appropriate information automatically, at log-on. A further advantage is that the information stream is "primed" when a user logs on so that pertinent alarm events begin immediate accumulation for that user.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings.

DETAILED DESCRIPTION OF THE PREFERRED EMBODIMENTS

Figure 1A:
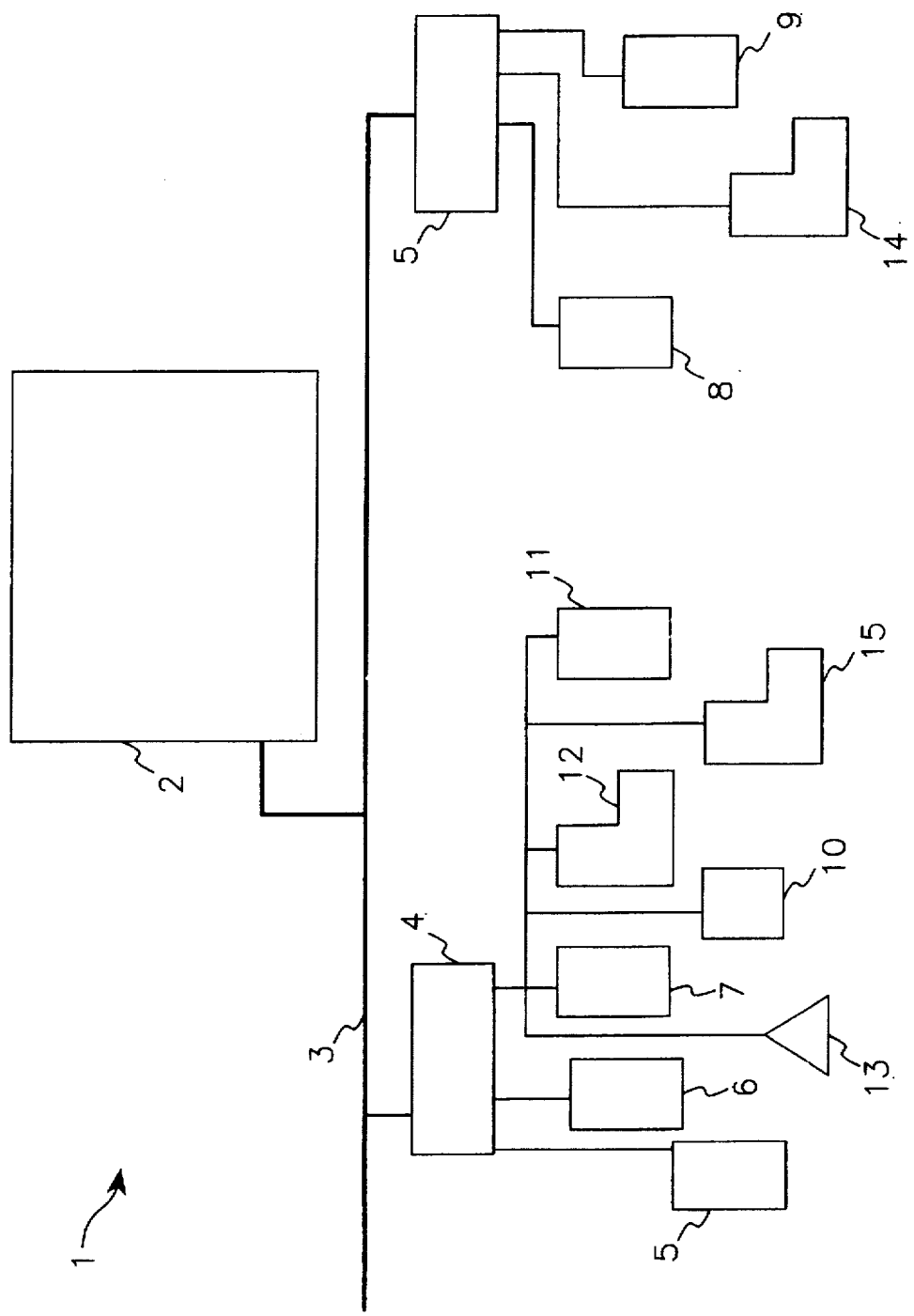
FIGS. 1A, 1B and 1C illustrate a screen display, a first schematic block diagram and a second schematic block diagram, respectively, process control systems in accordance with a generalized embodiment of the present invention which furnishes a capability to create a new control template and a capability to modify an existing control template for only one view, such as an engineering view.

Referring to FIG. 1A, a control system is shown. In general, the system 1 includes a main processing device, such as personal computer 2, that is connected to a local area network ("LAN") 3 via a local area network card. Although any local area network protocol may be used, a non-proprietary ethernet protocol is beneficial in many applications because it allows for communications with the local area network 3. The local area network 3 is dedicated to carrying control parameters, control data and other relevant information concerned in the process control system. As such, the LAN 3 may be referred to as an area controlled network or ACN 3. The ACN 3 may be connected to other LANs for sharing information and data via a hub or gateway without affecting the dedicated nature of ACN 3.

In accordance with standard ethernet protocol, a plurality of physical devices may be connected to the ACN 3 at various "nodes." Each physical device connected to the ACN 3 is connected at a node and each node is separately addressable according the LAN protocol used to implement ACN 3.

To establish a redundant system, it may be desirable to construct ACN 3 from two or more ethernet systems such that the failure of a single ethernet or LAN system will not result in the failure of the entire system. When such "redundant ethernets" are used the failure of one ethernet LAN can be detected and an alternate ethernet LAN can be mapped in to provide for the desired functionality of ACN 3.

The main personal computer ("PC") A forms a node on the ACN 3. The PC 2 may, for example, be a standard personal computer running a standard operating system such as Microsoft's Window NT system. Main PC 2 is configured to generate, in response to user input commands, various control routines that are provided via the ACN 3 to one or more local controllers identified as element 4 and 5 which implement the control strategy defined by the control routines selected and established in main PC 2. Main PC 2 may also be configured to implement direct control routines on field devices such as pumps, valves, motors and the like via transmission across the ACN 3, rather than through a local controller 4 or 5.

Local controllers 4 and 5 receive control routines and other configuration data through the ACN 3 from PC 2. The local controllers then generate signals of various types to various field devices (such as pumps, motors, regulator valves, etc.) 6 through 15 which actually implement and perform physical steps in the field to implement the control system established by the routines provided by PC 2.

Two types of field devices may be connected to local controller 4 and 5 including field devices 6 through 10 which are responsive to specific control protocol such as FieldBus, Profibus and the like. As those in the art will appreciate, there are standard control protocols (e.g. FieldBus) according to which specific protocol instructions are provided to a protocol-friendly field devices (e.g., a Fieldbus field devices) will cause a controller located within the field device to implement a specific function corresponding to the protocol function. Accordingly, field devices 6 through 11 receive protocol specific (e.g., FieldBus) control commands from either the local controllers 4 and 5 or the personal computer 2 to implement a field device-specific function.

Also connected to local controllers 4 and 5 are non-protocol field devices 12 through 15, which are referred to as non-protocol because they do not include any local processing power and can respond to direct control signals. Accordingly, field devices 12 through 15 are not capable of implementing functions that would be defined by specific control protocol such as the FieldBus control protocol.

Functionality is supplied to allow the non-protocol field devices 12 through 15 to operate as protocol-friendly (e.g., FieldBus specific) devices 6 through 11. Additionally, this same functionality allows for the implementation of the protocol-specific control routines to be distributed between the local field devices 6 through 11, the local controllers 4 and 5 and the personal computer 2.

Figure 1B:
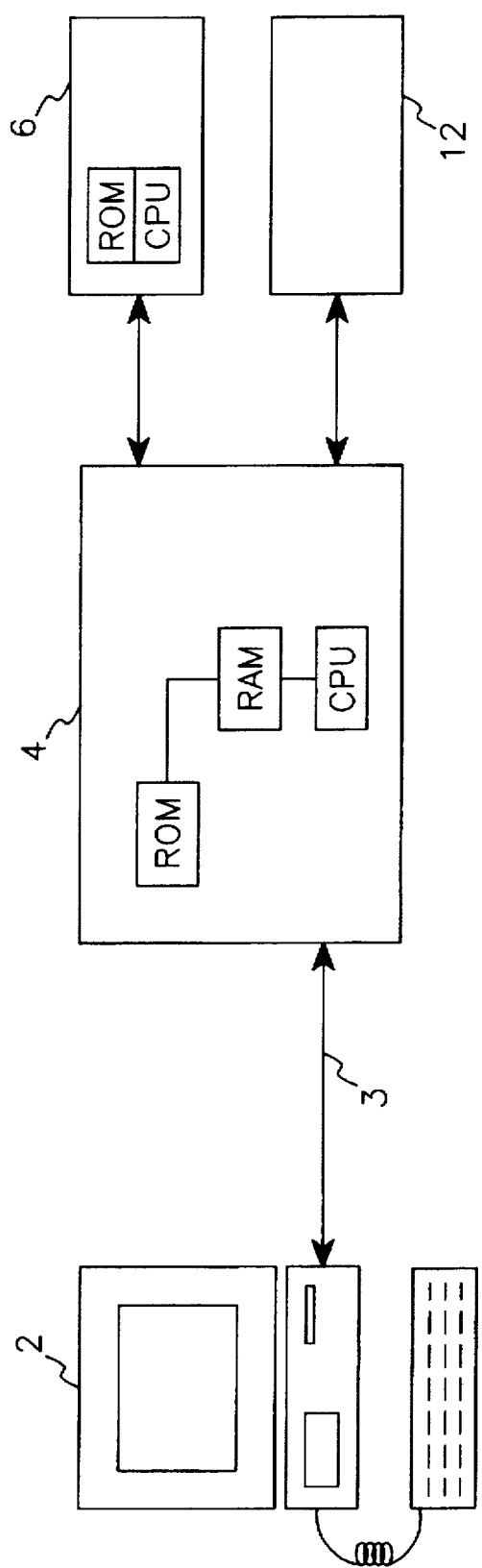

The distribution of protocol-specific control routines is illustrated in more detail in FIG. 1B. FIG. 1B refers to one portion of the system shown in FIG. 1A, specifically the personal computer 2, the ethernet 3, local controller 4, a smart field device 6 and a dumb device 12, in greater detail.

Personal computer 2 includes program software routines for implementing standard functional routines of a standard control protocol such as the FieldBus protocol. Accordingly, personal computer 2 is programmed to receive FieldBus commands and to implement all of the functional routines for which a local field device having Fieldbus capabilities could implement. The ability and steps required to program personal computer 2 to implement FieldBus block functionality will be clearly apparent to one of ordinary skill in the art.

Connected to personal computer 2 by the ethernet 3 is local controller 4. Local controller 4 includes a central processing unit connected to a random access memory which provides control signals to configure the central processing unit to implement appropriate operational functions. A read only memory is connected to the random access memory. The read only memory is programmed to include control routines which can configure the central processing unit to implement all of the functional routines of a standard control protocol such as FieldBus. Personal computer 2 sends signals through ethernet 3 to the local controller 4 which causes one, more or all of the programmer routines in the read only memory to be transferred to the random access memory to configure the CPU to implement one, more or all of the standard control protocol routines such as the Field-Bus routines.

The smart field device 6 includes a central processing unit which implements certain control functions. If the devices is, for example, a FieldBus device then the central processing unit associated with the field device 6 is capable of implementing all of the FieldBus functionality requirements.

Because the local controller 4 has the ability to implement FieldBus specific controls, controller 4 operates so that non-protocol device 12 acts and is operated as a FieldBus device. For example, if a control routine is running either in personal computer 2 or on the CPU of local controller 4, that control routine can implement and provide FieldBus commands to FieldBus device 6 and non-protocol device 12, operating as a Fieldbus device. Since field device 6 is a FieldBus device, device 6 receives these commands and thereby implements the control functionality dictated by those commands. Non-protocol device 12, however, works in conjunction with the central processing unit of local controller 4 to implement the FieldBus requirements such that the local controller in combination with the field device implements and operates FieldBus commands.

In addition to allowing non-FieldBus device 12 to act and operate as a FieldBus device, the described aspect allows for distribution of FieldBus control routines throughout the system 1 shown in FIG. 1A. For example, to the extent that a control routine initially requests field device 6 to implement more than one FieldBus control routine, the system 1 allows for control to be divided between the local controller 4 and the local controller 5 such that a portion of the FieldBus control routines are being implemented by local controller 5 and other FieldBus routines are implemented by the use of the FieldBus routines stored on local controller 4. The division of FieldBus routine implementation may allow for more sophisticated and faster control and more efficient utilization of the overall processing power of the system. Still further, the fact that personal computer 2 has the ability to implement FieldBus control routines, the FieldBus routines are further distributed between the local controller 4 and the personal computer 2. In this manner, the system allows personal computer 2 to implement one or all of the FieldBus routines for a particular control algorithm.

Still further, the system allows for the implementation of FieldBus controls to a non-FieldBus device connected directly to the ethernet 3 through use of the FieldBus control routines stored on personal computer 2 in the same manner that FieldBus routines are implemented on non-FieldBus device 12 through use on the FieldBus routines stored on local controller 4.

Figure 1C:
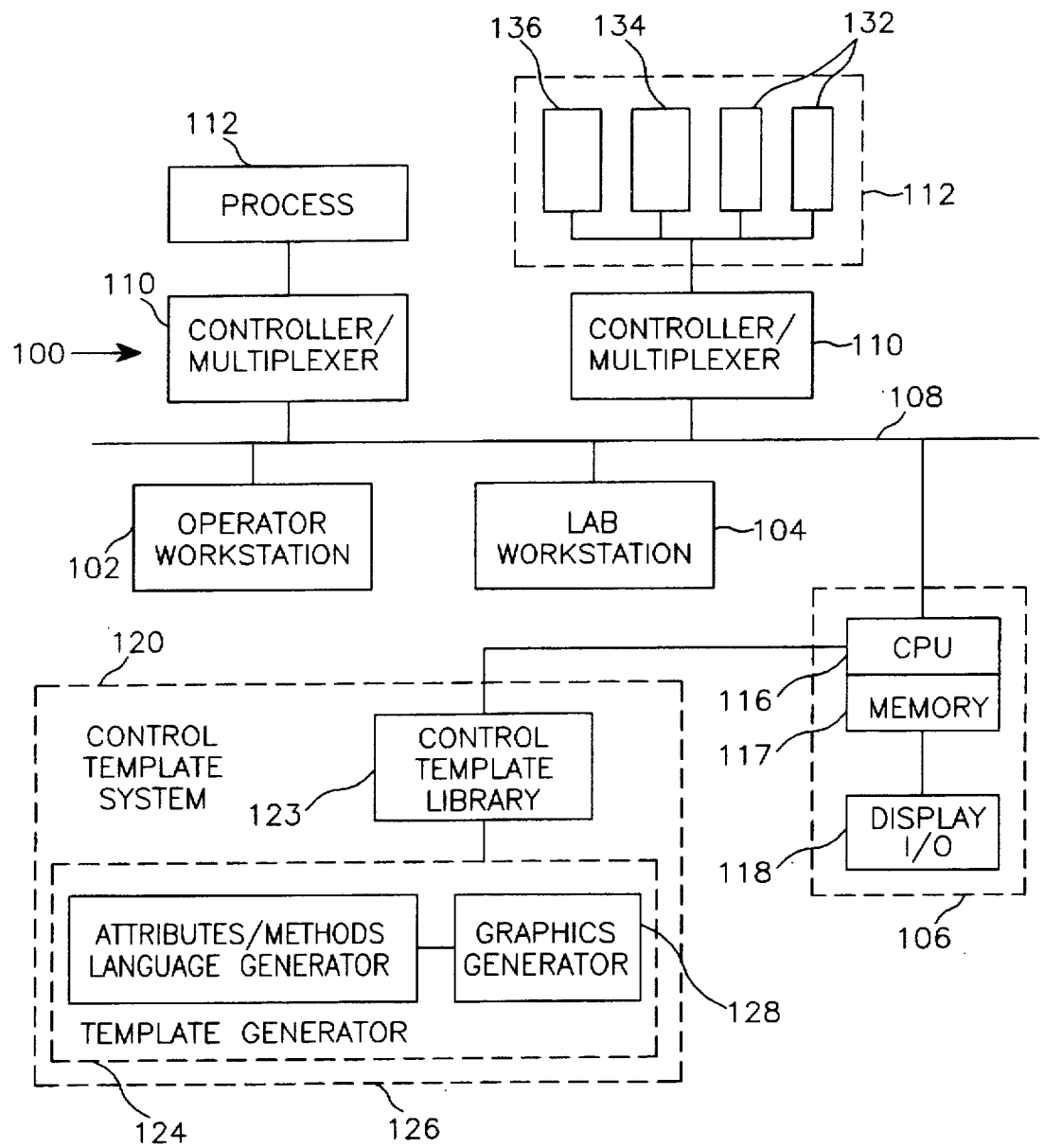

A process control environment 100 is shown in FIG. 1C and illustrates a control environment for implementing a digital control system, process controller or the like. The process control environment 100 includes an operator workstation 102, a laboratory workstation 104, and an engineering workstation 106 electrically interconnected by a local area network ("LAN") 108 for transferring and receiving data and control signals among the various workstations and a plurality of controller/multiplexers 110. The workstations 102, 104, 106 are shown connected by the LAN 108 to a plurality of the controller/multiplexers 110 that electrically interface between the workstations and a plurality of processes 112. In multiple various embodiments, the LAN 108 includes a single workstation connected directly to a controller/multiplexer 110 or alternatively includes a plurality of workstations, for example three workstations 102, 104, 106, and many controller/multiplexers 110 depending upon the purposes and requirements of the process control environment 100. In some embodiments, a single process controller/multiplexer 110 controls several different processes 112 or alternatively controls a portion of a single process.

In the process control environment 100, a process control strategy is developed by creating a software control solution on the engineering workstation 106, for example, and transferring the solution via the LAN 108 to the operator workstation 102, lab workstation 104, and to controller/multiplexer 110 for execution. The operator workstation 102 and lab workstation 104 supply interface displays to the control/monitor strategy implemented in the controller/multiplexer 110 and communicates to one or more of the controller/multiplexers 110 to view the processes 112 and change control attribute values according to the requirements of the designed solution. The processes 112 are formed from one or more field devices, which may be smart field devices or conventional (non-smart) field devices. The process 112 is illustratively depicted as two Fieldbus devices 132, a HART (highway addressable remote transducer) device 134 and a conventional field device 136.

In addition, the operator workstation 102 and lab workstation 104 communicate visual and audio feedback to the operator regarding the status and conditions of the controlled processes 112. The engineering workstation 106 includes a central processing unit (CPU) 116 and a display and input/output or user-interface device 118 such as a keyboard, light pen and the like. The CPU 116 typically includes a dedicated memory 117. The dedicated memory 117 includes a digital control system program (not shown) that executes on the CPU 116 to implement control operations and functions of the process control environment 100. The operator workstation 102, the lab workstation 104 and other workstations (not shown) within the process control environment 100 include at least one central processing unit (not shown) which is electrically connected to a display (not shown) and a user-interface device (not shown) to allow interaction between a user and the CPU. In one embodiment, the process control environment 100 includes workstations implemented using a Motorola 68040 processor and a Motorola 68360 communications processor running in companion mode with the 68040 with primary and secondary ethernet ports driven by the 68360 processor (SCC1 and SCC3 respectively).

The process control environment 100 also includes a template generator 124 and a control template library 123 which, in combination, form a control template system 120. A control template is defined as the grouping of attribute functions that are used to control a process and the methodology used for a particular process control function, the control attributes, variables, inputs, and outputs for the particular function and the graphical views of the function as needed such as an engineer view and an operator view.

The control template system 120 includes the control template library 123 that communicates with the template generator 124. The control template library 123 contains data representing sets of predefined or existing control template functions for use in process control programs. The control template functions are the templates that generally come with the system from the system designer to the user. The template generator 124 is an interface that advantageously allows a user to create new control template functions or modify existing control template functions. The created and modified template functions are selectively stored in the control template library 123.

The template generator 124 includes an attributes and methods language generator 126 and a graphics generator 128. The attributes and methods language generator 126 supplies display screens that allow the user to define a plurality of attribute functions associated with the creation of a new control template function or modification of a particular existing control template function, such as inputs, outputs, and other attributes, as well as providing display screens for enabling the user to select methods or programs that perform the new or modified function for the particular control template. The graphics generator 128 furnishes a user capability to design graphical views to be associated with particular control templates. A user utilizes the data stored by the attributes and methods language generator 126 and the graphics generator 128 to completely define the attributes, methods, and graphical views for a control template. The data representing the created control template function is generally stored in the control template library 123 and is subsequently available for selection and usage by an engineer for the design of process control solutions.

The process control environment 100 is implemented using an object-oriented framework. An object-oriented framework uses object-oriented concepts such as class hierarchies, object states and object behavior. These concepts, which are briefly discussed below, are well known in the art. Additionally, an object-oriented framework may be written using object-oriented programming languages, such as the C++ programming language, which are well-known in the art, or may be written, as is the case with the preferred embodiment, using a non-object programming language such as C and implementing an object-oriented framework in that language.

The building block of an object-oriented framework is an object. An object is defined by a state and a behavior. The state of an object is set forth by fields of the object. The behavior of an object is set forth by methods of the object. Each object is an instance of a class, which provides a template for the object. A class defines zero or more fields and zero or more methods.

Fields are data structures which contain information defining a portion of the state of an object. Objects which are instances of the same class have the same fields. However, the particular information contained within the fields of the objects can vary from object to object. Each field can contain information that is direct, such as an integer value, or indirect, such as a reference to another object.

A method is a collection of computer instructions which can be executed in CPU 116 by computer system software. The instructions of a method are executed, i.e., the method is performed, when software requests that the object for which the method is defined perform the method. A method can be performed by any object that is a member of the class that includes the method. The particular object performing the method is the responder or the responding object. When performing the method, the responder consumes one or more arguments, i.e., input data, and produces zero or one result, i.e., an object returned as output data. The methods for a particular object define the behavior of that object.

Classes of an object-oriented framework are organized in a class hierarchy. In a class hierarchy, a class inherits the fields and methods which are defined by the superclasses of that class. Additionally, the fields and methods defined by a class are inherited by any subclasses of the class. I.e., an instance of a subclass includes the fields defined by the superclass and can perform the methods defined by the superclass. Accordingly, when a method of an object is called, the method that is accessed may be defined in the class of which the object is a member or in any one of the superclasses of the class of which the object is a member. When a method of an object is called, process control environment 100 selects the method to run by examining the class of the object and, if necessary, any superclasses of the object.

A subclass may override or supersede a method definition which is inherited from a superclass to enhance or change the behavior of the subclass. However, a subclass may not supersede the signature of the method. The signature of a method includes the method's identifier, the number and type of arguments, whether a result is returned, and, if so, the type of the result. The subclass supersedes an inherited method definition by redefining the computer instructions which are carried out in performance of the method.

Classes which are capable of having instances are concrete classes. Classes which cannot have instances are abstract classes. Abstract classes may define fields and methods which are inherited by subclasses of the abstract classes. The subclasses of an abstract class may be other abstract classes; however, ultimately, within the class hierarchy, the subclasses are concrete classes.

All classes defined in the disclosed preferred embodiment, except for mix-in classes which are described below, are subclasses of a class, Object. Thus, each class that is described herein and which is not a mix-in class inherits the methods and fields of class Object.

Figure 2:
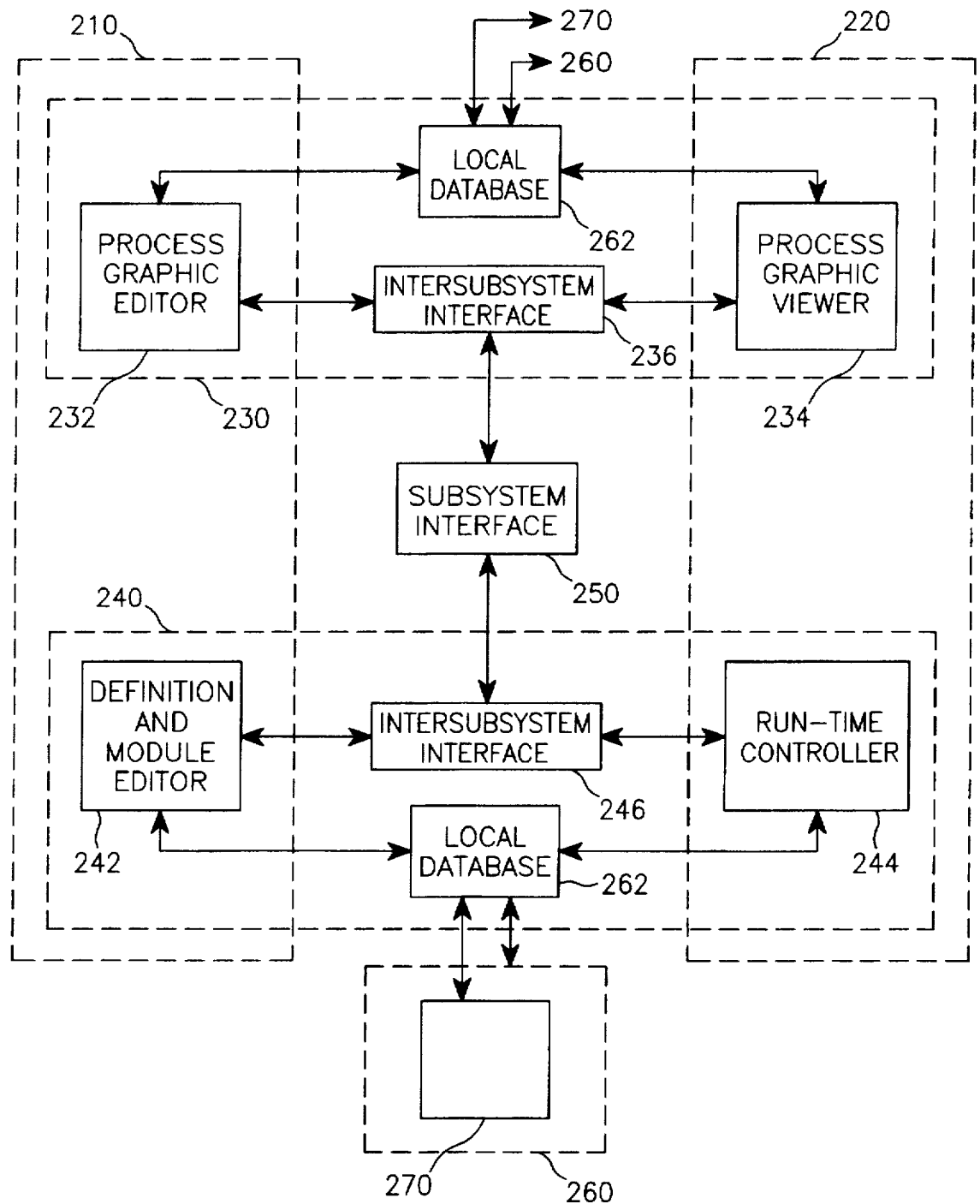
FIG. 2 is a schematic block diagram showing the process control environment in a configuration implementation and a run-time implementation.

The process control environment 100 exists in a configuration model or configuration implementation 210 and a run-time model or run-time implementation 220 shown in FIG. 2. In the configuration implementation 210, the component devices, objects, interconnections and interrelationships within the process control environment 100 are defined. In the run-time implementation 220, operations of the various component devices, objects, interconnections and interrelationships are performed. The configuration implementation 210 and the run-time implementation 220 are interconnected by downloading. The download language creates system objects according to definitions supplied by a user and creates instances from the supplied definitions. Specifically, a completely configured Device Table relating to each device is downloaded to all Workstations on startup and when the Device Table is changed. For controller/ multiplexers 110, a downloaded Device Table only includes data for devices for which the controller/ multiplexer 110 is to initiate communications based on remote module data configured and used in the specific controller/multiplexer 110. The Device Table is downloaded to the controller/ multiplexer 110 when other configuration data is downloaded. In addition to downloading definitions, the download language also uploads instances and instance values. The configuration implementation 210 is activated to execute in the run-time implementation 220 using an installation procedure. Also, network communications parameters are downloaded to each device when configuration data are downloaded and when a value is changed.

The process control environment 100 includes multiple subsystems with several of the subsystems having both a configuration and a run-time implementation. For example, a process graphic subsystem 230 supplies user-defined views and operator interfacing to the architecture of the process control environment 100. The process graphic subsystem 230 has a process graphic editor 232, a part of the configuration implementation 210, and a process graphic viewer 234, a portion of the run-time implementation 220. The process graphic editor 232 is connected to the process graphic viewer 234 by an intersubsystem interface 236 in the download language. The process control environment 100 also includes a control subsystem 240 which configures and installs control modules and equipment modules in a definition and module editor 242 and which executes the control modules and the equipment modules in a run-time controller 244. The definition and module editor 242 operates within the configuration implementation 210 and the run-time controller 244 operates within the run-time implementation 220 to supply continuous and sequencing control functions. The definition and module editor 242 is connected to the run-time controller 244 by an intersubsystem interface 246 in the download language. The multiple subsystems are interconnected by a subsystem interface 250.

The configuration implementation 210 and the run-time implementation 220 interface to a master database 260 to support access to common data structures. Various local (non-master) databases 262 interface to the master database 260, for example, to transfer configuration data from the master database 260 to the local databases 262 as directed by a user. Part of the master database 260 is a persistent database 270. The persistent database 270 is an object which transcends time so that the database continues to exist after the creator of the database no longer exists and transcends space so that the database is removable to an address space that is different from the address space at which the database was created. The entire configuration implementation 210 is stored in the persistent database 270.

The master database 260 and local databases 262 are accessible so that documentation of configurations, statistics and diagnostics are available for documentation purposes.

The run-time implementation 220 interfaces to the persistent database 270 and to local databases 262 to access data structures formed by the configuration implementation 210. In particular, the run-time implementation 220 fetches selected equipment modules, displays and the like from the local databases 262 and the persistent database 270. The run-time implementation 220 interfaces to other subsystems to install definitions, thereby installing objects that are used to create instances, when the definitions do not yet exist, instantiating run-time instances, and transferring information from various source to destination objects.

Device Tables are elements of the configuration database that are local to devices and, in combination, define part of the configuration implementation 210. A Device Table contains information regarding a device in the process control environment 100. Information items in a Device Table include a device ID, a device name, a device type, a PCN network number, an ACN segment number, a simplex/redundant communication flag, a controller MAC address, a comment field, a primary internet protocol (IP) address, a primary subnet mask, a secondary IP address and a secondary subnet mask.

Figure 3:
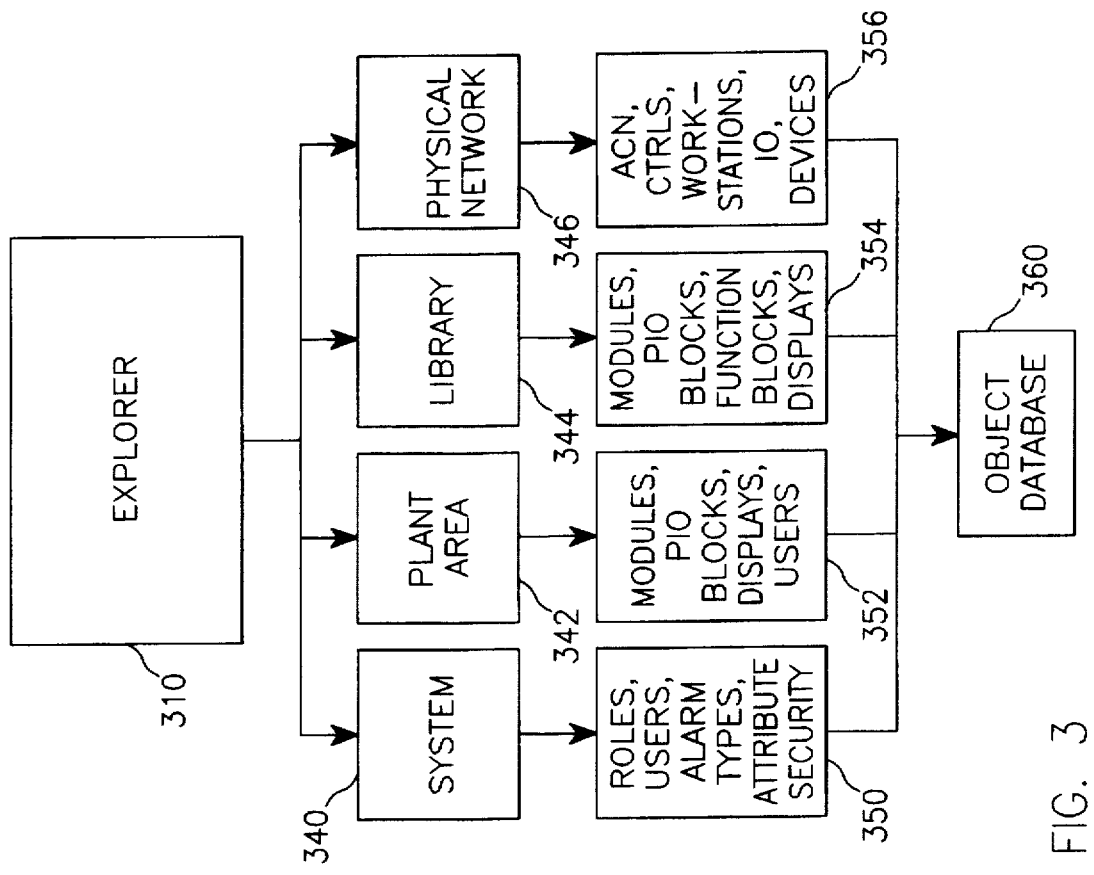
FIG. 3 is a block diagram illustrating a user interface for usage with both configuration and run-time models of the process control environment.
Figure 3:
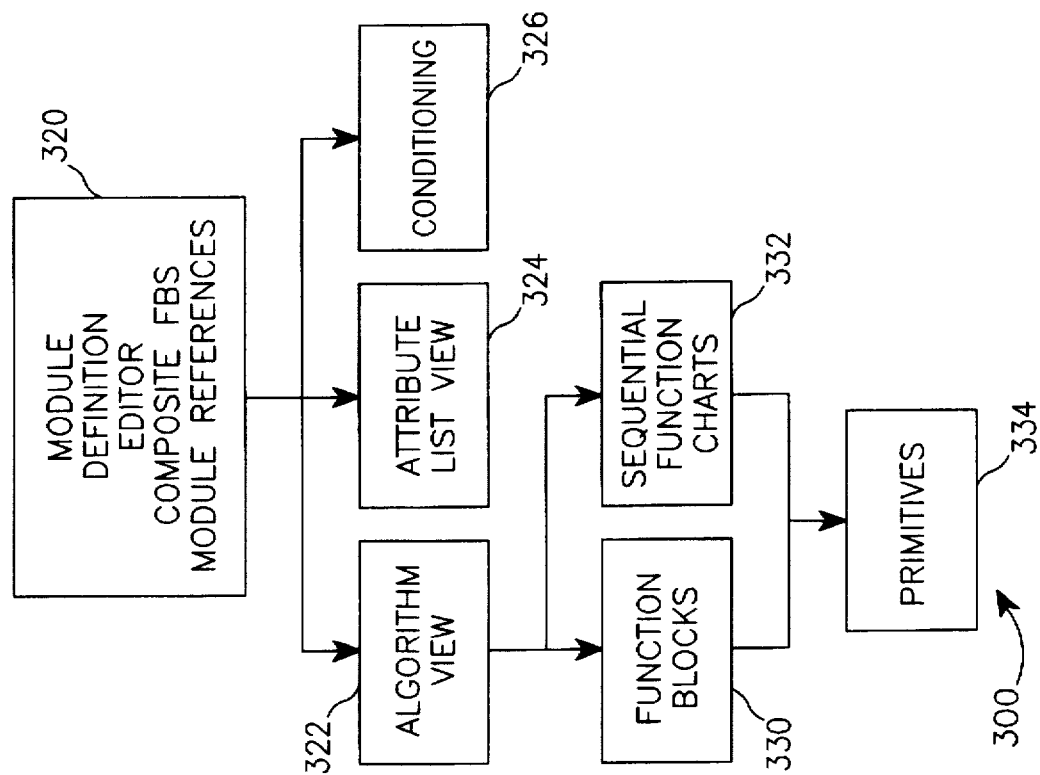

Referring to FIG. 3, a block diagram illustrates a user interface 300 for usage with both the configuration and run-time models of the process control environment 100 shown in FIG. 1C. Part of the user interface 300 is the Explorer™ 310, an interfacing program defined under the Windows NT™ operating system which features a device-based configuration approach. Another part of the user interface 300 is a module definition editor 320 for interfacing to the process control environment 100 using a control-based configuration approach.

The Explorer™ 310 is operated by a user to select, construct and operate a configuration. In addition, the Explorer™ 310 supplies an initial state for navigating across various tools and processors in a network. A user controls the Explorer™ 310 to access libraries, areas, process control equipment and security operations. FIG. 3 illustrates the relationship between various tools that may be accessed by a task operating within the process control environment 100 and the relationship between components of the process control environment 100 such as libraries, areas, process control equipment and security. For example, when a user selects a "show tags" function from within an area, a "tag list builder" is displayed, showing a list of control and I/O flags. From the tag list builder, the user can use an "add tag" function to add a module to a list, thereby invoking a "module editor".

Figure 4:
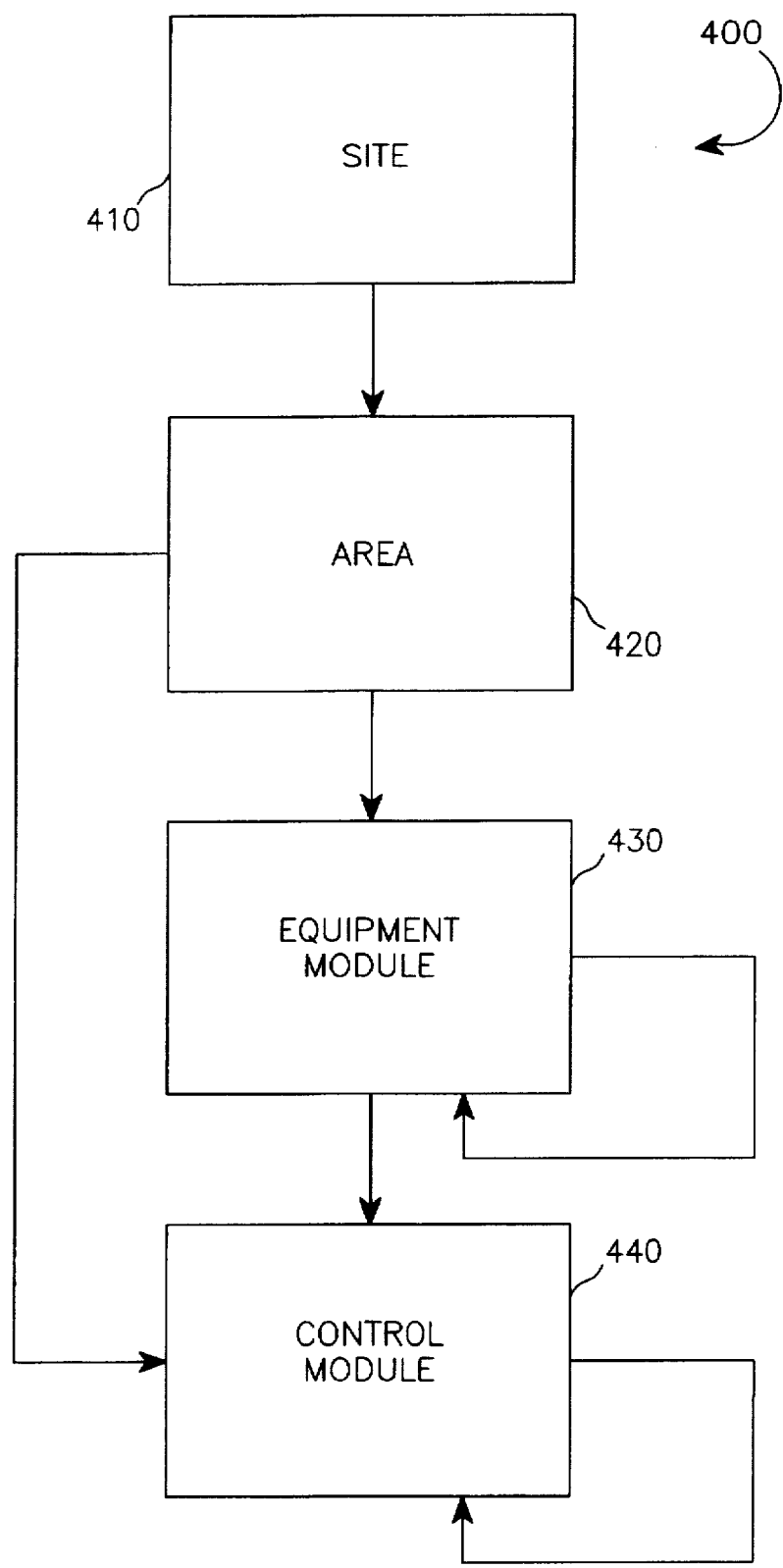
FIG. 4 is a schematic block diagram which depicts a hierarchical relationship among system objects of a configuration model in accordance with an embodiment of the present invention.

Referring to FIG. 4, a schematic block diagram illustrates a hierarchical relationship among system objects of a configuration model 400. The configuration model 400 includes many configuration aspects including control, I/O, process graphics, process equipment, alarms, history and events. The configuration model 400 also includes a device description and network topology layout.

The configuration model hierarchy 400 is defined for usage by a particular set of users for visualizing system object relationships and locations and for communicating or navigating maintenance information among various system objects. For example, one configuration model hierarchy 400, specifically a physical plant hierarchy, is defined for usage by maintenance engineers and technicians for visualizing physical plant relationships and locations and for communicating or navigating maintenance information among various instruments and equipment in a physical plant. An embodiment of a configuration model hierarchy 400 that forms a physical plant hierarchy supports a subset of the SP88 physical equipment standard hierarchy and includes a configuration model site 410, one or more physical plant areas 420, equipment modules 430 and control modules 440.

The configuration model hierarchy 400 is defined for a single process site 410 which is divided into one or more named physical plant areas 420 that are defined within the configuration model hierarchy 400. The physical plant areas 420 optionally contain tagged modules, each of which is uniquely instantiated within the configuration model hierarchy 400. A physical plant area 420 optionally contains one or more equipment modules 430. An equipment module 430 optionally contains other equipment modules 430, control modules 440 and function blocks. An equipment module 430 includes and is controlled by a control template that is created according to one of a number of different graphical process control programming languages including continuous function block, ladder logic, or sequential function charting ("SFC"). The configuration model hierarchy 400 optionally contains one or more control modules 440. A control module 440 is contained in an object such as a physical plant area 420, an equipment module 430 or another control module 440. A control module 440 optionally contains objects such as other control modules 440 or function blocks. The control module 440 is thus a container class, having instances which are collections of other objects. The control module 444 is encapsulated so that all of the contents and the implementation of the methods of the control module are hidden.

Figure 5:
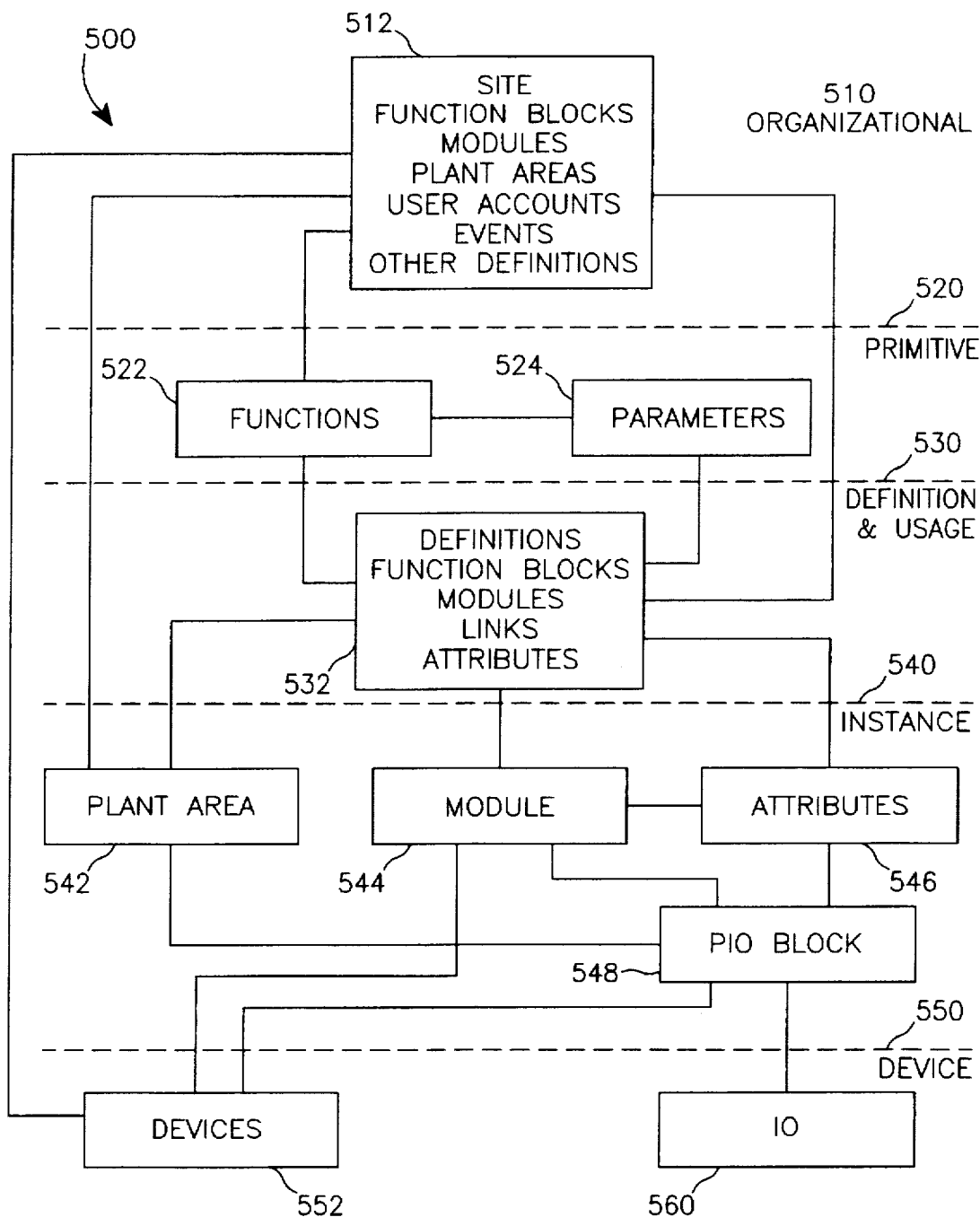
FIG. 5 is a schematic block diagram which depicts a configuration architecture that operates within the hierarchical relationship illustrated in FIG. 4.

Referring to FIG. 5, a schematic block diagram shows a configuration architecture 500 that operates within the configuration model hierarchy 400 illustrated in FIG. 4. The configuration architecture 500 includes a several objects and classes at multiple levels of abstraction. At an organizational level of abstraction 510, the configuration architecture 500 includes a site class 512 which contains "named" objects and classes within the configuration architecture 500. Named objects and classes are definitions, display components such as screens and graphics and other items. The named objects and classes include function blocks, user accounts, modules, plant areas, events, libraries and other site-wide information. Examples of named items are block definitions, equipment module definitions, control module definitions, plant area names and the like.

At a primitive level of abstraction 520, the configuration architecture 500 includes primitives that define the interfaces to functions within the configuration architecture 500, including hard-coded functions such as "+". The primitive level of abstraction 520 includes the classes of functions 522 and parameters 524. Functions 522 are operational functions at the lowest level of abstraction in the configuration architecture 500. Functions 522 are typically coded in the C or C++ languages. In one embodiment of the configuration architecture 500, the full set of implemented function blocks 522 are primitives. Objects and classes at the primitive level of abstraction 520 are defined throughout the site class 512. Parameters 524 are classes and objects at the lowest level of abstraction in the configuration architecture. Parameters 524 include integer numbers, real numbers, vectors, arrays and the like. Attribute values are mapped into parameters 524 for usage within a function block 522. In one embodiment, function blocks 522 at the primitive level of abstraction 520 include the function block primitives listed in TABLE I, as follows:

TABLE I

Function Blocks

| Function Block | Description/Comments |
| --- | --- |
| Action | Handles simple assignment statements using expression capability. |
| ADD | Simple Add function with extensible inputs. |
| AI | FF Standard Analog Input |
| AI Lite | A scaled back version of the FF analog input. |
| AI HART | The FF Standard Analog Input with some extra ability to handle HART devices. |
| AND | Simple And function with extensible inputs. |
| AO | FF Standard Analog Output. (From FF standard specification) |
| Arithmetic | FF Standard Arithmetic Block. (From FF standard specification) |
| BDE_TRIGGER | Simple bi-directional edge trigger. |
| BIASGAIN | FF Standard Bias/Gain. (From FF standard specification) |
| CALC/LOGIC | Advanced calculation and logic block that has its own language as well as the ability to handle simple ST (1131). It has extensible inputs, extensible outputs, and the ability to create temporary variables. |
| Condition | Handles simple condition statements using expression capability. |
| Counter | Simple up/down counter that handles several different Accumulation methods. |
| CTLSEL | FF Standard Control Selector. (From FF standard specification) |
| DI | FF Standard Discrete Input. (From FF standard specification) |
| DI Lite | A scaled back version of the FF discrete input. |
| DIVIDE | Simple Divide. |
| DO | FF Standard Discrete Output. (From FF standard specification) |
| DT | FF Standard Deadtime with advanced control research implemented. (From FF standard specification) |
| DtoI | A boolean fan in that converts up to 16 discrete inputs to a 16-bit integer value. Also has some special abilities for capturing input patterns. |
| FILT | Simple filter. |
| H/L MON LIMIT | Simple high/low signal monitor and limiter. |
| INTEGRATOR | FF Standard Integrator block. (From FF standard specification) |
| ItoD | Boolean fan-out. Takes a 16-bit integer and translates it into 16 discrete outputs. |
| L/L | FF Standard LeadLag with 2 additional types of equations to select. (From FF standard specification) |
| LOOP | An I/O and control block with the abilities of AI, PID, and AO rolled into one block. |
| LOOPD | An I/O and control block with the abilities of DI, Device Control, and DO rolled into one block. |
| MAN | FF Standard Manual Loader. (From FF standard specification) |
| MULTIPLEX | Simple multiplexor with extensible inputs. |
| MULTIPLY | Simple multiply with extensible inputs. |
| NDE_TRIGGER | Simple negative edge trigger. |
| NOT | Simple not. |
| OFF_DELAY | Simple off-delay timer. |
| ON_DELAY | Simple on-delay timer. |
| OR | Simple logical or with extensible inputs. |
| P/PD | FF Standard P/PD. (From FF standard specification) |
| PDE_TRIGGER | Simple positive directional edge trigger. |
| PERIOD | Simple monitor that triggers when an input is true for a specified period |
| PI | FF Standard Pulse Input. (From FF standard specification) |
| PID | FF Standard PID with many additions including the ability to choose algorithm type, form, and structure. (From FF standard specification) |
| RAMP | Simple ramp generator. |
| RATELIM | Simple rate limiter generator. |
| RATIO | FF Standard Ratio block. (From FF standard specification) |
| RETENTIVE | Simple retentive timer. |
| RS | Simple reset dominant flip-flop. |
| RUNAVE | Simple running average calculator. |
| SCALER | Simple scaler. |

TABLE I-continued

Function Blocks

| Function Block | Description/Comments |
| --- | --- |
| SIGGEN | Generates square waves, sin waves, random waves, or any combination of the three. |
| SIGNALCHAR | FF Standard Signal Characterizer. (From FF standard specification) |
| SIGSEL | Simple signal selector. |
| SPLITTER | FF Standard Splitter. (From FF standard specification) |
| SR | Simple set dominant flip-flop. |
| SUBTRACT | Simple subtract block. |
| TP | Simple timed pulse block. |
| TRANSFER | Simple transfer block. |
| XOR | Simple exclusive or block. |

At a definition and usage level of abstraction 530, the configuration architecture 500 includes definitions 532 and usages. Definitions 532 and usages, in combination, define the algorithm and the interface for objects including function blocks, control modules, equipment modules, links and attributes. The definitions 532 define algorithms and interfaces for function blocks, modules, links and attributes. Usages are objects and classes at the definition and usage level of abstraction 530 that represent the usage of one definition within another.

At an instance level of abstraction 540, the configuration architecture 500 includes instances, which are "tagged" items within the configuration. Plant areas 542, modules 544, attributes 546, and PIO blocks 548 are tagged instances. Instances are defined according to definitions 532. A plant area 542 represents a geographical or logical segmentation of a process site class 512. All objects and classes at the instance level of abstraction 540 are defined throughout the plant area level so that all module instances have a 0 or 1 association with a plant area 542. To be installed in a run-time system, the module instances must have a 1 association, meaning that the module is viewed as being "contained by" or "scoped" in this context of a plant area. A module instance 544 is an installable object that is associated to a specific object of plant equipment. An attribute instance 546 is a visible parameter in a module instance 544, a plant area instance 542 or other device. An attribute instance 546 may be used for an input signal, an output signal, data storage or the like.

At a device level of abstraction 550, the configuration architecture 500 includes devices 552 such as controllers, smart devices and consoles, and input/output devices (IO) 560 such as a PIO block, and the like, which represent physical process control equipment in the physical plant. A process input/output (PIO) block is an abstraction that represents various high density and low density conventional input/output devices including Hart, FieldBus and other input and output devices that are interfaced into the configuration architecture 500. High or low density relates to the number of channels on an I/O card. For example, 8 channels are typical on a low density card while a high density card may have 32 channels. Devices 552 are process control equipment in the configuration architecture 500 and include objects such as controllers, input/output devices, consoles and the like. Input/output devices (IO) 560 are the physical process input and output devices in the configuration architecture 500.

A smart device is a field device that is implemented to transmit and receive digital data pertaining to a device, including data relating to device calibration, configuration, diagnostics and maintenance. Typically, the smart device is also adapted to transmit a standard analog signal that is indicative of various information including, for example, a process value measured by a field device. Examples of smart field devices include field devices which follow a HART (highway addressable remote transducer) protocol, a Fieldbus protocol, a Modbus protocol and a device net protocol.

Various hierarchical relationships among system objects are implemented to facilitate navigation through the process control environment 100 shown in FIG. 1C by different users and to accomplish different tasks. Four different hierarchical relationships are defined including control, control system, operations and physical plant hierarchies. A specific system object may be implemented in multiple hierarchical systems.

The control hierarchy is a subset of a standard SP88 hierarchy and has system objects including site, physical area, equipment module, control module and control element objects. The control hierarchy is used to organize control operations and to define the scope of named objects. A user interacts with the control hierarchy on the basis of a site instance, equipment module definitions, control module definitions, a plant area instance, equipment module instances, control module instances, display module instances, and process I/O module/block instances, having signal tags.

The control system hierarchy includes operator/configuration stations, host computers, controllers, I/O devices, smart devices, gateways and the like, which are associated using various network standards including area control network (ACN), process control network (PCN) and other I/O network standards. In one embodiment, the ACN hardware includes standard 10-base-T ethernet communication ports and a workstation contains standard Ethernet 10-base-T interface cards and software drivers. A user interacts with the control system hierarchy on the basis of a defined site instance, a network definition, a defined network instance, devices, and subsystems such as files, cards, channels, controllers, operation stations, and Fieldbus segments.

The area control network (ACN) includes communication functionality at two levels, a remote object communications (ROC) level and a low level communications level. ROC level controls the interface between the applications and the ACN communications system. The low level communications support the interface with the TCP/IP sockets and the actual transmission of messages.

Remote Object Communications (ROC) are system operations supporting communication of objects in the process control environment 100 shown in FIG. 1C and particularly supporting communication between objects whether the objects reside in the same device or in remote devices. The ROC communication level supports communications message services including request/response, unsolicited reporting, event/alarm reporting and broadcast message service.

Request/Response is a service by which applications send messages to a remote device and receive a response from the device. Unsolicited Reporting is a service for periodically sending updated data to a remote device. Unchanged data is not reported. Event/Alarm Reporting is a guaranteed delivery message service which is used for the transmission of events, alarms and other vital information for delivery to a remote device. The broadcast message service is used to send messages to all devices on the communications network. The ROC level also sets communications policies for the communications subsystem. This means that it is responsible for managing what message get sent and when as well as how incoming messages are processed. Communications flow control will also be the responsibility of the ROC portion.

Low level communications support is included for device connection management, ACN redundancy and communications systems diagnostics. Device connection management establishes a communications connection between two devices and manages the transmission of messages between the two devices. ACN Redundancy handles the detection of communications link failures, controls the switch from one link to another and tracks the status of communication links between a host device and connected remote devices. Communications subsystem diagnostics tracks communication integrity and statistical information, responds to requests for communications diagnostic data.

Device connection management in an ACN communications system supports both UDP and TCP type device connections. UDP connections are used for normal real time data transfers between devices. TCP connections are used for special applications using a streaming protocol such as file transfers, device flash downloads, and the like. Communications between devices is managed by a Device Connection Object. The Device Connection Object transmits data and maintains the status of the communications links between two communicating devices.

All normal device connection message traffic is directed through a single UDP communications port. A Device Connection Object starts the communications system by creating the communication socket associated with this UDP port as well as creating the queues needed for management of the device connection message traffic. The Device Connection Object receives all incoming messages on a Device Connection communications socket and routes messages to the proper device connection instance for processing. The Device Connection Object handles timing functions of device connections, including notifying device connection instances when messages time out waiting to be acknowledged, when communications link checks are due and when device connection resyncs have timed out.

UDP type communications are used for the transfer of real-time data among devices. The remote object communications (ROC) subsystem passes messages to a UDP Device Connection for transmission to a destination device. A pool of message buffers is created on startup of each device. The message pool is used for all data transferred between devices, preventing the communications subsystem from exhausting memory and ensuring that no other task exhausts memory, thereby preventing the communication subsystem from running. Communication flow control is implemented in the Device Connection Object. If the number of message buffers in the communications buffer pool reaches a predefined low level, all remote devices are inhibited from sending messages until the low buffer problem is resolved in the affected device preventing loss of messages.

TCP-type communications are used for applications using a streaming-type protocol such as file transfers and device flash downloads. TCP-type connections are temporary connections established for the duration of the applications needs and terminated once the application has completed a communications task. For reasons of interoperability, compatibility, and availability, a TCP/IP protocol stack is employed. The TCP/IP stack supplies a connection-oriented, byte stream protocol (TCP) and a connectionless, message oriented protocol (UDP). The device connection supports request/response messages, unsolicited data, and event and alarm data between devices. The communication system maintains the device connection through one of two available communications links in the event of a single communications failure, typically a cable fault. Detection of a fault and switch to an alternate communications path transpires in a short, deterministic time span which is less than one second.

The operations hierarchy is defined for a particular set of users, specifically operators and maintenance engineers, generally for the purpose of accessing displays, reports, and other informational items. A user interacts with the operations hierarchy on the basis of a site instance, User Group definitions, a plant area instance, equipment module instances, control module instances, display instances, and report instances.

The physical plant hierarchy is defined for a particular set of users, specifically maintenance engineers and technicians, typically for the purpose of determining physical relationships among objects and navigating maintenance information about plant instruments and equipment. A user interacts with the physical plant hierarchy on the basis of a site instance, a maintenance area instance, a plant area instance, room instances, cabinet instances, node/device instances and display instances.

The system objects that are implemented in the multiple hierarchical systems are arranged into a plurality of subsystems including control, process I/O, control system hardware, redundancy management, event/alarm management, history services, process graphics, diagnostics presentation, user environment, management organization and field management system (FMS) subsystems. The control subsystem includes routines for configuring, installing and executing control modules and equipment modules. The process I/O subsystem is a uniform interface to devices including HART, Fieldbus, conventional I/O and other input/output systems. The control system hardware subsystem defines a control system topology, devices within the topology and capabilities and functions of the devices. The control system hardware subsystem also includes objects and data structures for accessing device level information indicative of status and diagnostics.

The redundancy management subsystem establishes a redundant context between primary and secondary control applications and manages switching in context between the primary and secondary control applications. The redundancy management subsystem also maintains and monitors redundant context diagnostic information including state information and data latency information. Network redundancy is accomplished using two separate Ethernet communications links or networks. The primary communication link is the preferred communications path. The secondary link is only used if the primary has failed. Communications switchovers are performed on a per device basis. For example, if device A is communicating with devices B and C and the primary link to device C fails, device A continues to communicate with device B on the primary link but switches to the secondary link to communicate with device C. Each Ethernet link is a separate, dedicated network having a dedicated set of IP addresses and a subnet mask.

The device connection object manages redundant communications including controlling when to switch to the secondary link and when to switch back to the primary link. Each device in the process control system tracks the communication status of all current links to remote devices by periodically sending link test messages when no other communications is occurring, to check the status of the communications links to each device. Redundancy switchovers are performed on a device connection basis.

The event/alarm management subsystem configures, monitors, and supplies notification of significant system states, acknowledgments and priority calculations. The history services subsystem stores and retrieves process and event information. The process graphics subsystem supplies user-defined views for display and operator interfacing onto the defined system architecture. The diagnostics presentation subsystem furnishes displays of diagnostic information, typically at the request of a user. The user environment subsystem supplies a user interface, allowing a user to enter commands to control operation of the process control environment 100 shown in FIG. 1C. The management organization subsystem sets an organizational structure of the process control environment 100 including specification of site, area, primitives, access to user libraries, and location of defined objects and instances. The FMS supplies user interfaces, views, and organization structure for the configuration, installation and monitoring of HART and Fieldbus devices.

A Fieldbus device implements localized control of a process within the process, in contrast to a longer-used and more conventional approach of controlling device functions from a main or centralized digital control system. A Fieldbus device achieves localized control by including small, localized controller/multiplexers 110 which are closely associated with field devices within the Fieldbus device. The small, localized controllers of a Fieldbus implement standardized control functions or control blocks which operate on the field devices within the Fieldbus device and which also operate on other smart field devices that are connected to the Fieldbus device.

Thus, the process control environment 100 implements smart field device standards, such as the Fieldbus H1 standard, Profibus standard, CAN standard and other bus-based architecture standards so that communications and control among devices, particularly Fieldbus devices, are performed so that Fieldbus-type control operations are transparent to a user.

The process control environment 100 allows attachment to a substantially unlimited number and type of field devices including smart devices, such as Fieldbus and HART devices, and conventional non-smart devices. Control and communication operations of the various numbers and types of devices are advantageously performed simultaneously and in parallel.

The process control environment 100 implements and executes a standard set of function blocks or control functions defined by a standard Fieldbus protocol, such as the Fieldbus H1 standard, so that Fieldbus-type control is achieved with respect to non-Fieldbus-type devices, such as a HART device 134 and a conventional device 136. In addition, the process control environment 100 enables Fieldbus devices to implement the standard set of function blocks and control functions. Advantageously, the process control environment 100 implements an overall strategy as if all connected devices are Fieldbus devices. This implementation is achieved, in part, by the usage of a function block as a fundamental building block for control structures. These function blocks are defined to create control structures for all types of devices. Usage of function blocks as fundamental building blocks is described in FIGS. 6, 7, 8 and 9.

The process control environment 100 implements an overall, user-developed control strategy through the definition of function blocks and control modules by downloading or installing specific portions of the control strategy into smart devices and non-smart devices. Thereafter, the smart devices automatically perform the downloaded portions of the overall strategy independently of other control system operations. For example, the portions of the control strategy downloaded or installed into the devices operate independently of and in parallel with the control operations of the controller/multiplexers 110 and the workstations, while other control operations manage the smart devices and implement other portions of the control strategy. In effect, the process control environment 100 implements a control strategy using the controller/multiplexers 110 within the smart devices.

Figure 6:
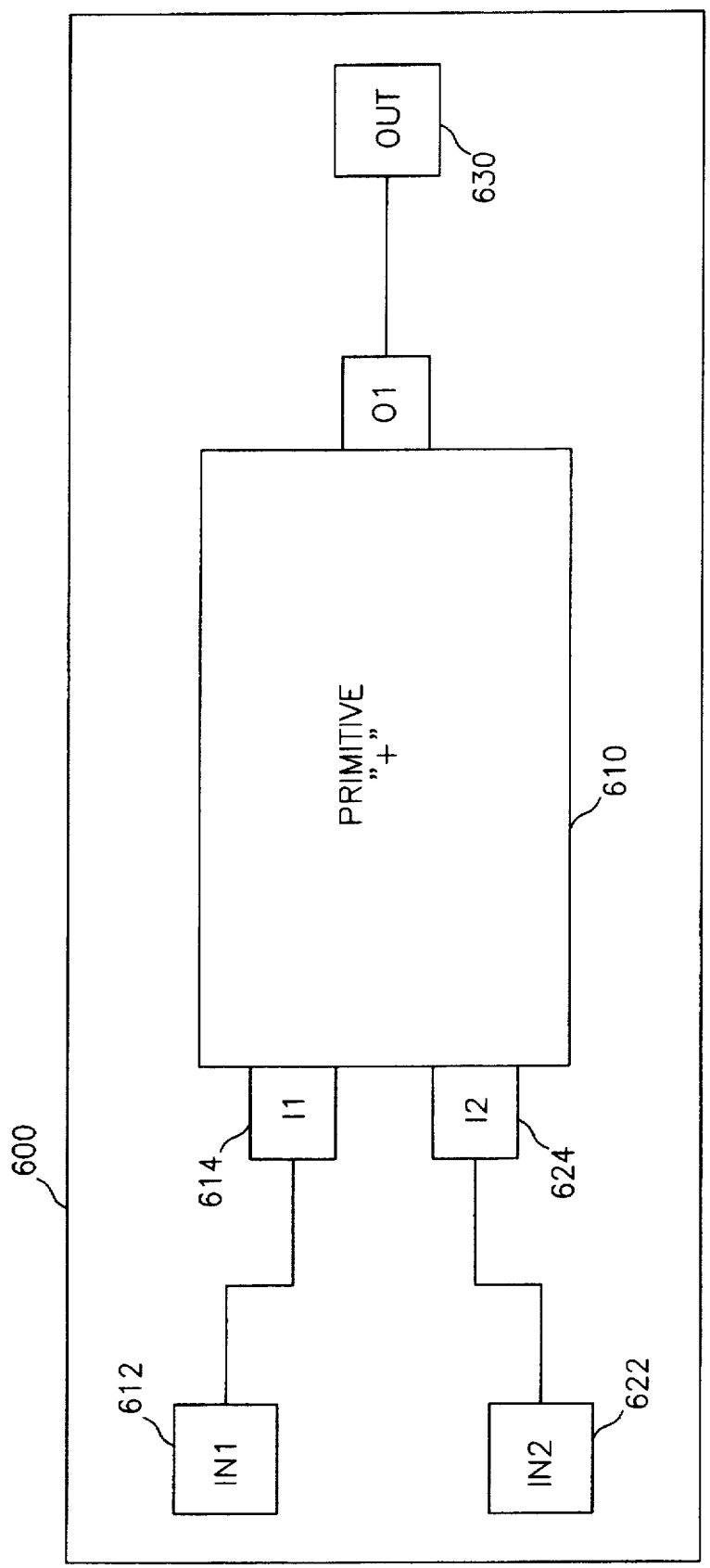
FIG. 6 is a block diagram illustrating an example of an elemental function block, which is one type of system object within the configuration model definition.

An example of a block diagram defining a function block of the functions 522 shown in FIG. 5 is illustrated in FIG. 6. Specifically, FIG. 6 depicts an "elemental" function block definition 600 which is defined to contain only primitive objects. The elemental function block definition 600 defines a sum function and includes a "+" primitive 610, a first input attribute 612 which is a first parameter 614 applied to the primitive 610, and a second input attribute 622 which is a second parameter 624 applied to the primitive 610. The primitive 610 produces a result that is supplied as an output attribute 630. In this example, the elemental function block definition 600 is a block definition that is created and named SUM.

Figure 7:
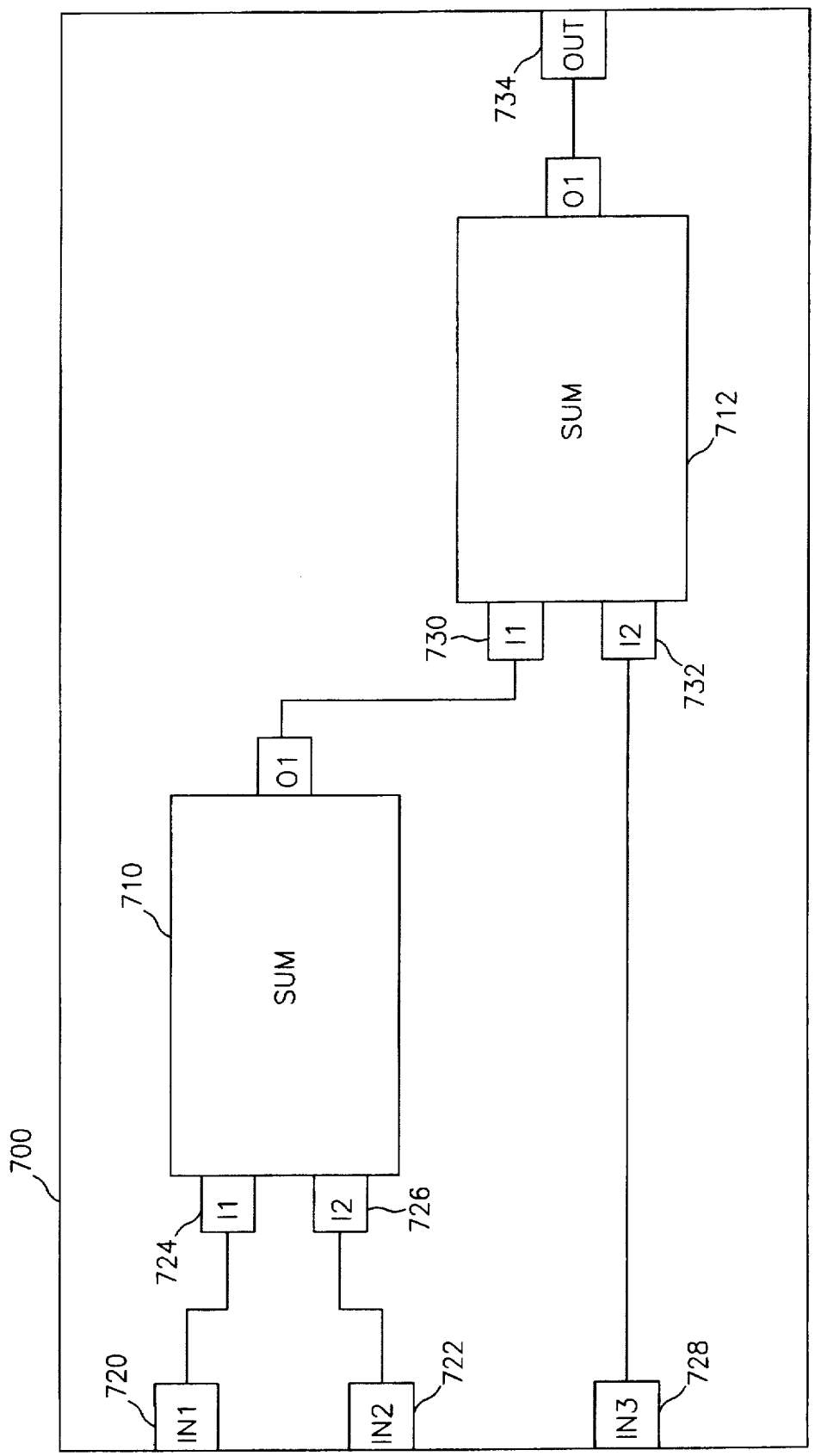
FIG. 7 is a block diagram depicting an example of a composite function block, which is another type of system object within the configuration model definition.

A second example of a block diagram defining a function block of the functions 522 shown in FIG. 5 is illustrated in FIG. 7. Specifically, FIG. 7 depicts a "composite" function block definition 700 which is defined to contain one or more elemental function blocks 600 and, optionally, one or more primitive objects. The composite function block definition 700 defines a composite sum function and includes a first SUM elemental function block 710 and a second SUM elemental function block 712, each of which is the same as the SUM elemental function block 600 illustrated in FIG. 6. The composite function block 700 has a first input attribute 720 and a second input attribute 722 which are respective first and second parameters 724 and 726 applied to the first SUM elemental function block 710. The first elemental function block 710 produces a result that is applied to the second SUM elemental function block 712 as a first parameter 730. The composite function block 700 has a third input attribute 728 that is a second parameter 732 applied to the second SUM elemental function block 712. The second SUM elemental function block 712 produces a result that is supplied as an output attribute 734. In this example, the composite function block definition 700 is a block definition that is created and named SUM3.

Figure 8:
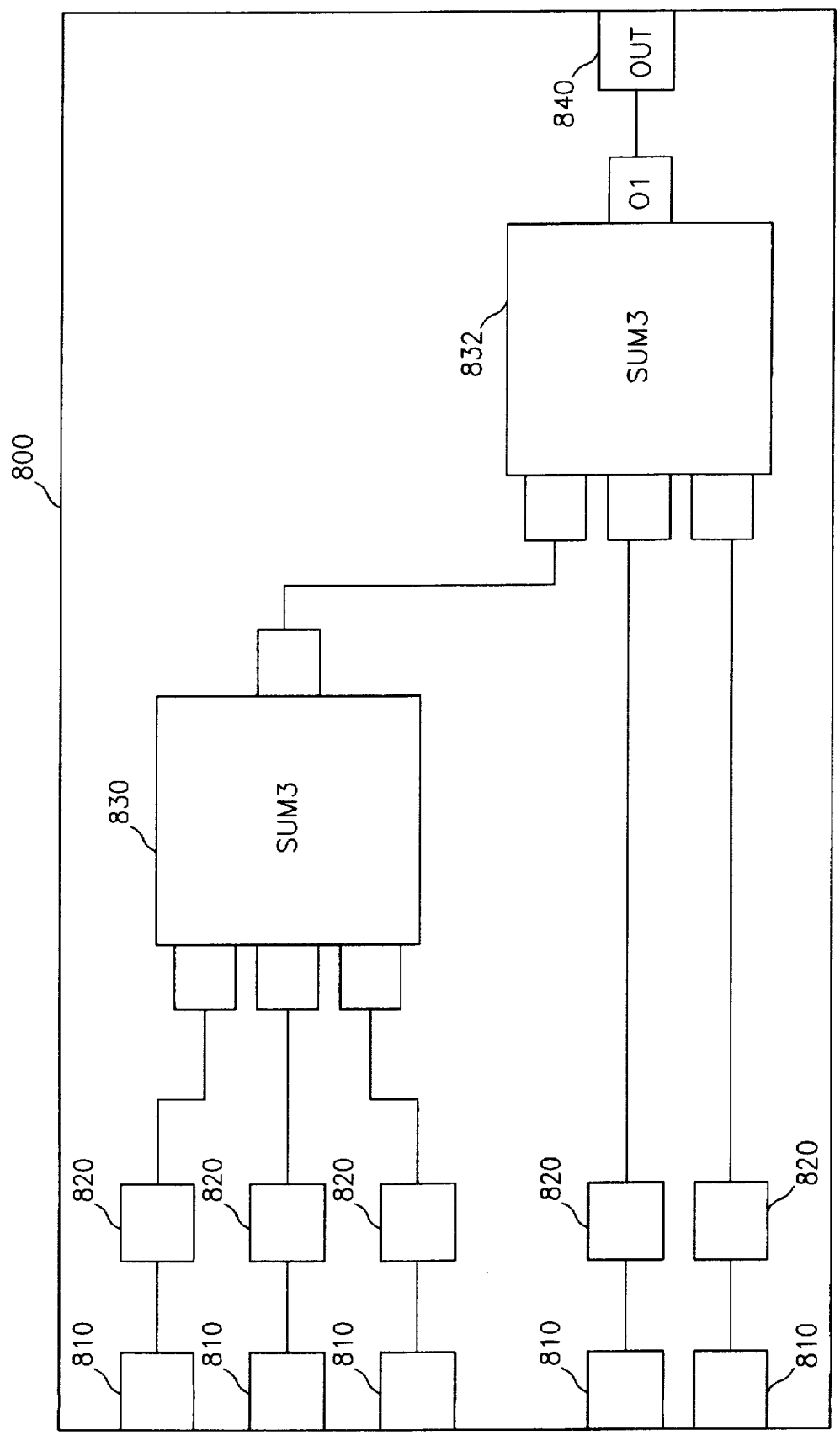
FIG. 8 is a block diagram illustrating an example of a control module, which is another type of system object within the configuration model definition.

An example of a block diagram defining a control module of the control modules 440 shown in FIG. 4 is illustrated in FIG. 8. Specifically, FIG. 8 depicts a control module definition 800 which is defined and contains various input attributes 810, elemental function blocks 820, a first SUM3 composite function block 830 and a second SUM3 composite function block 832. The exemplary control module 440 includes five input attributes 810 which are connected to five respective elemental function blocks 820, three of which are parameters applied to the first SUM3 composite function block 830. The first SUM3 composite function block 830 produces a result that is supplied as a parameter to the second SUM3 composite function block 832 in combination with parameters supplied by the remaining two elemental function blocks 820. The second SUM3 composite function block 832 produces a result that is supplied as an output attribute 840. In this example, the control module 800 is a control module definition that is created and named CM1.

Figure 9:
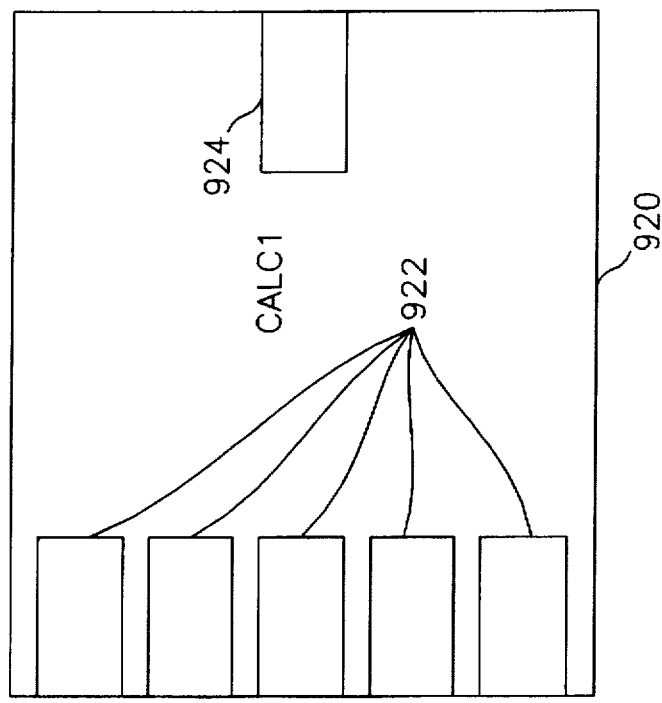
FIG. 9 is a block diagram showing a module instance, specifically a control module instance, which is created in accordance with the control module definition depicted in FIG. 8.
Figure 9:
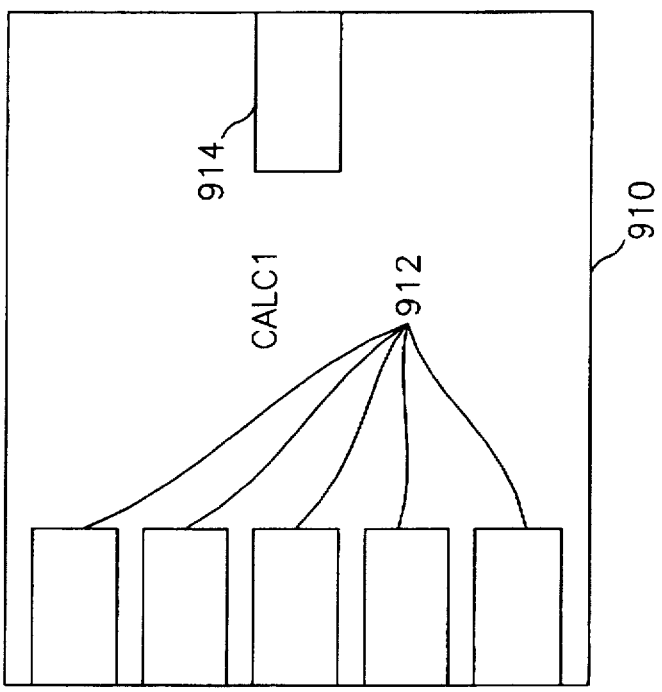

Examples of a block diagram defining a module instance of the module instances 544 shown in FIG. 5, specifically a control module instance, are shown in FIG. 9. Control module instances 910 and 920 are created in accordance with the CM1 control module definition so that each control module instance 910 and 920 includes five input attributes 912 and 922, respectively, that correspond to the five input attributes 810 shown in FIG. 8. Each control module instance 910 and 920 also includes one output attribute 914 and 924, respectively, that correspond to the output attribute 840 shown in FIG. 8. In this example, the control module instances 910 and 920 are control module instances that are created and tagged CALC1 and CALC2, respectively.

Using a definition editor, a system user creates and names definitions, such as the SUM elemental function block definition, the SUM3 composite function block definition and the CM1 control module definition. Then, using a module editor, the system user creates and tags instances, such as the CALC1 and CALC2 control module instances.

Figure 10:
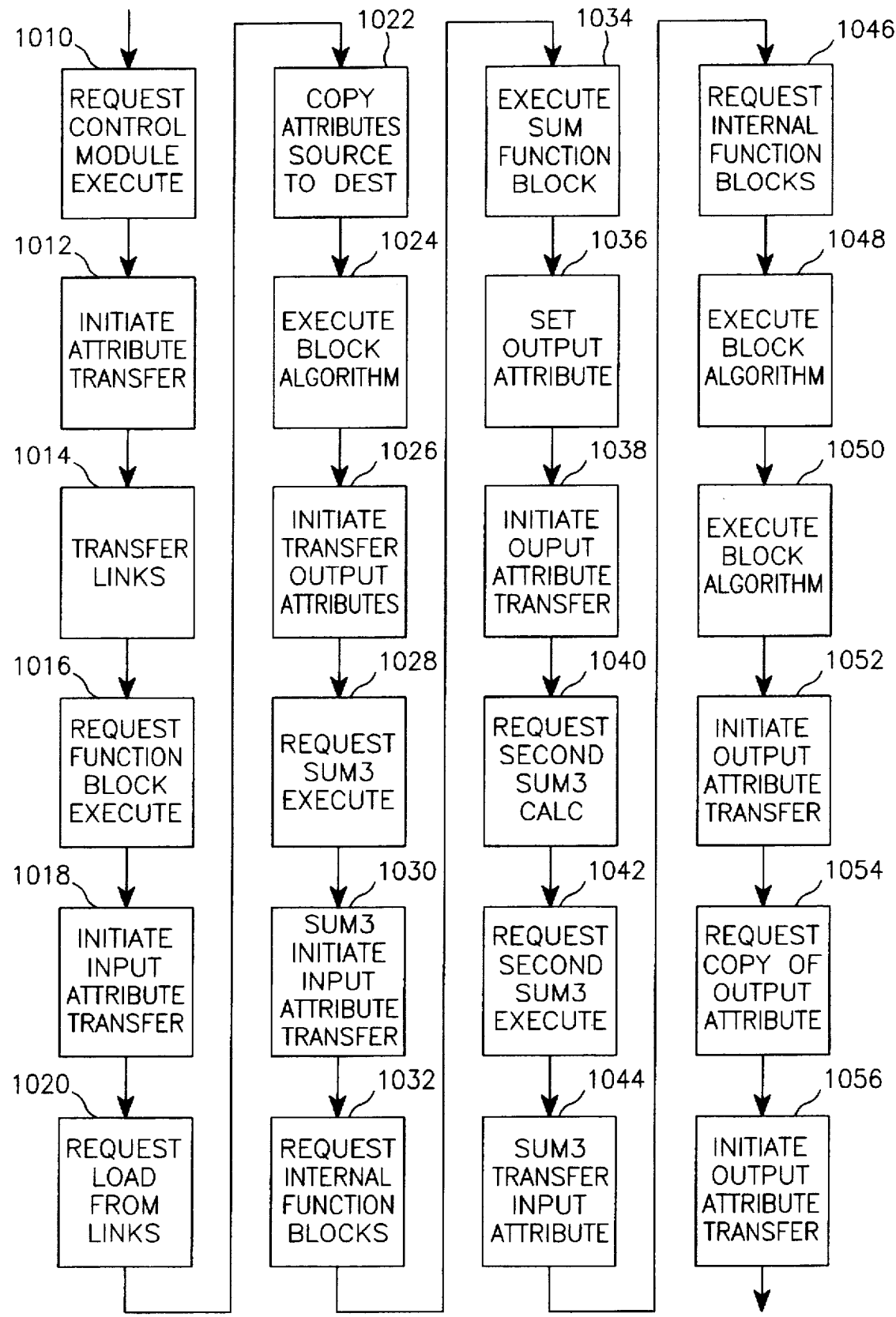
FIG. 10 is a flow chart which shows an example of execution of a control module at run-time.

Referring to FIG. 10, a flow chart shows an example of control module execution at run-time. A run-time program includes a scheduler routine. Scheduler routines are well-known in the computing arts. The scheduler routine requests execution 1010 of a composite control module, for example the composite control module 440 with tag CM1 shown in FIG. 8. The CM1 composite control module 440 initiates transfer 1012 of the input attributes 820, causing any associated links, or attribute associations, to transfer 1014. A database definition typically refers to "associations" while a runtime definition relates to "links". In steps 1016 through 1056 the CM1 composite control module 440 requests each elemental function block 820, first SUM3 composite function block 830 and second SUM3 composite block 832 to execute in turn.

Specifically, in step 1016 the CM1 composite control module 440 requests each elemental function block 820 to execute. The elemental function blocks 820 initiate transfer 1018 of input attributes, for example first input attribute 612 shown in FIG. 6. The input attributes of the elemental function blocks 820 request 1020 loading of values from the links transferred in step 1014. The links copy 1022 values from source attributes to destination attributes. The elemental function blocks 820 execute block algorithms 1024. Upon completion of block algorithm execution, the elemental function blocks 820 initiate transfer of output attributes 1026, for example output attribute 630 shown in FIG. 6.

In step 1028 the CM1 composite control module 440 requests first SUM3 composite function block 830 to execute. First SUM3 composite function block 830 initiates transfer 1030 of input attributes, for example input attributes 722, 724 and 726 shown in FIG. 7, from the elemental function blocks 820. In step 1032, first SUM3 composite function block 830 requests internal function blocks, for example, the first SUM elemental function block 710 and the second SUM elemental function block 712 shown in FIG. 7, to execute in turn. First SUM elemental function block 710 reads input attributes, executes a block algorithm and sets an output attribute in step 1034. Second SUM elemental function block 712 reads input attributes, executes a block algorithm and sets an output attribute in step 1036. First SUM3 composite function block 830 initiates transfer of output attributes in step 1038. The output attribute of first SUM3 composite function block 830 requests an associated link to copy the value from the output attribute in step 1040.

In step 1042 the CM1 composite control module 440 requests second SUM3 composite function block 832 to execute. Second SUM3 composite function block 832 initiates transfer 1044 of input attributes from the links connected to the first SUM3 composite function block 830 output attributes. In step 1046, second SUM3 composite function block 832 requests internal function blocks, for example, the first SUM elemental function block 710 and the second SUM elemental function block 712 shown in FIG. 7, to execute in turn. First SUM elemental function block 710 reads input attributes, executes a block algorithm and sets an output attribute in step 1048. Second SUM elemental function block 712 reads input attributes, executes a block algorithm and sets an output attribute in step 1050. Second SUM3 composite function block 832 initiates transfer of output attributes in step 1052. The output attribute of second SUM3 composite function block 832 requests an associated link to copy the value from the output attribute in step 1054.

In step 1056 the CM1 composite control module 440 initiates transfer of output attributes and output attribute 840 requests a link from second SUM3 composite function block 832 to copy the value of the second SUM3 composite function block 832 output attributes. In some embodiments, output function blocks push output values to a user-configured PIO block attribute (not shown). Thus, PIO attributes are "pulled" by function blocks while output function blocks push output values to PIO Block attributes. Similarly, input function blocks pull input attribute values from PIO Block attributes.

A user defines a module control strategy by specifying function blocks that make up control modules and determine the control strategy. The user modifies or debugs a module control strategy by adding, modifying and deleting function blocks, configuring parameters associated with the function blocks and creating a view to new attributes.

By defining function blocks and control modules, a user-defined control strategy, application program or diagnostic program is represented as a set of layers of interconnected control objects identified as modules. A layer of the control strategy includes a set of modules which are interconnected in a user-specified manner. A module typically includes an algorithm for performing a specific function and display components which are used to display information to a user. A module is optionally represented to include a set of input and output connections for connecting to other modules. A module may be considered to be a "black box" which performs a specified function and is connected to other modules via specified input and output connections.

Figure 11:
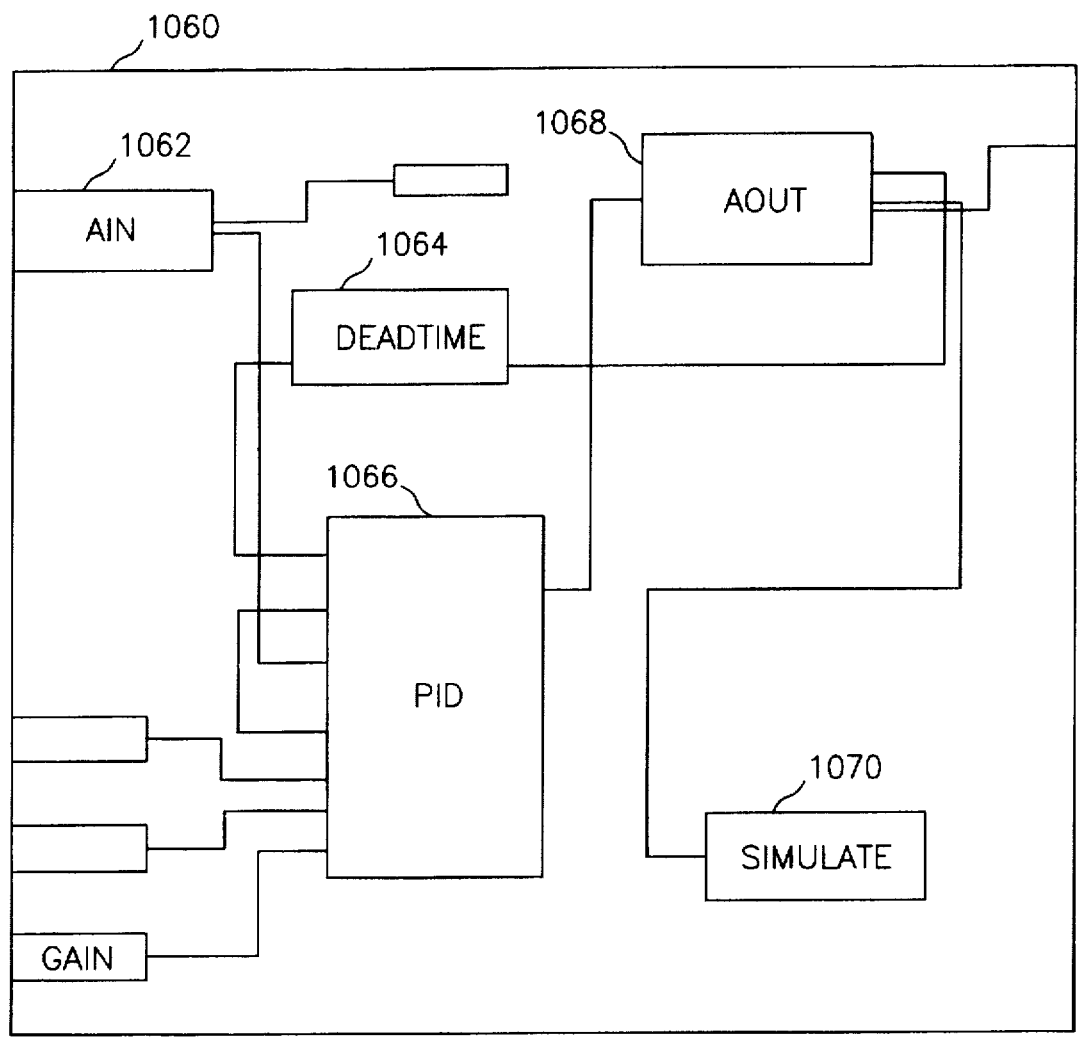
FIG. 11 is a flow chart which shows an example of a module at a highest layer of a control structure.

Referring to FIG. 11, a display screen serves as a flow chart which shows an example of a module or application program LOOPSIM 1060 at a highest layer of a control structure. The illustrated layer of the LOOPSIM 1060 application program includes an input attribute (AIN) module 1062 called AI1, a deadtime module 1064, a proportional, integral, differential (PID) control module 1066, an output attribute (AOUT) module 1068 and a simulate module 1070. Each of the illustrative modules includes named input connections and output connections which are connected to the other modules via lines. The set of modules, the input connections and the output connections of the set of modules, and the interconnections between modules define the operation of the LOOPSIM 1060 application.

At a lowest level, a module is a set of interconnected function blocks. At higher levels, a module is a set of interconnected submodules which, in turn, may include a further set of submodules. For example, the PID control module 1066 is typically a set of interconnected submodules which perform the different functions included in a PID functionality. The input and output connections of the PID module 1066 are an input connection and an output connection of one or more of the submodules within a next lower layer of the PID module 1066. The submodules in the PID module 1066 optionally include other input and output connections sufficient to define the interconnections between the submodules.

An application, a module or a submodule, at any module level, is optionally modified by a user to perform a slightly different function or to perform the same function in a different manner. Thus, a user optionally modifies the module, thereby modifying the control structure, in a desired manner. Specifically, a user optionally adds input and output connections to modules and extends the input and output connections of a module to a higher level module so customize modules for various applications. For example, a user optionally adds a new input connection or output connection to the PID module 1066 to the "edge" of the PID module 1066 which makes the input connection and output connection appear as input and output connections to the PID module 1066.

The process control environment facilitates the definition and modification of the control structure by furnishing editing operations in a plurality of control languages including IEC-1131 standard languages such as Field Blocks, Sequential Function Charts (SFC), Ladder Logic and Structured Text. Accordingly, different types of users, from different control backgrounds use the different languages to write different modules for implementing the same or different applications.

Control modules are specified to have several advantageous character Some control modules allow direct access to attributes. For example, some attributes, called "heavy" attributes, support direct (maximum performance) communications. Direct communications are advantageously used for connecting function blocks and Control Modules, supporting event/alarm detection, and high performance trending, for example. Some attributes are created automatically upon definition of a control module with a user having the option to promote or force a parameter to be exposed as an attribute of a Control Module. Other parameters are made accessible through a module, such as a Control Module, an Equipment Module, a PIO Block, or a Device, which contains the parameter but direct communications performance of the attributes does not warrant the overhead incurred in supplying this performance. These parameters are advantageously accessed to supply information relating to control system tuning, debugging and maintenance. In some embodiments, these parameters are accessed by a general purpose parameter browser applications, which use services provided by tagged containers to reveal attributes, invokeable services, and subcomponents within the containers.

Figure 12:
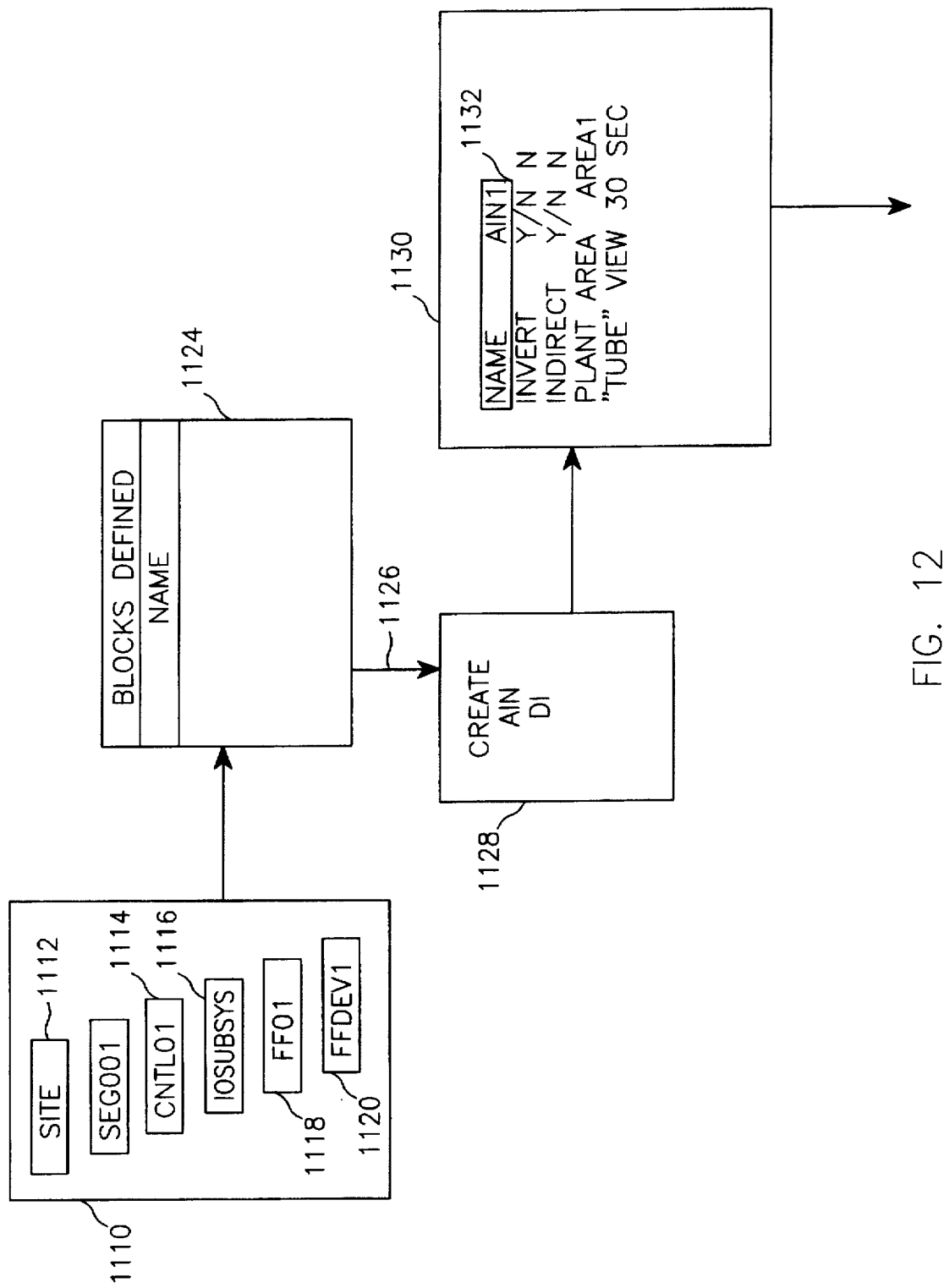
FIG. 12 is a block diagram which illustrates an object-oriented method for installing a process I/O attribute block into a PIO device.

Referring to FIG. 12, a block diagram illustrates an object-oriented method for installing a process I/O attribute block into a PIO device through the operation of the control subsystem. A block of defined objects 1110 includes a site object 1112, a controller device 1114, a controller I/O subsystem 1116, a PIO interface device 1118 and a PIO device 1120. Prior to installation of the PIO device, the controller I/O subsystem 1116 is previously created. The PIO device 1120 is also previously created, either by installation or downloading. The block of defined objects 1110 directs a detail pointer 1122 to a list of block definitions 1124 to specify a particular type of object to be created by a create pointer 1126 directing the operation of a create block 1128. The block definitions 1124 includes a PIO input attributes (AIN) block definition either as hardwired or by previous installation. Attributes of the specified object are set by a user through the operation of an editor 1130. Prior to installation of the PIO device, an input attribute (AIN) block 1132 does not exist.

Prior to installing the AIN block 1132, a user creates the PIO device 1120 then sets up initial values for AIN block attributes using the editor 1130. The user also sets a period for view parameter acquisition. The AIN block 1132 is saved and then installed.

Figure 13:
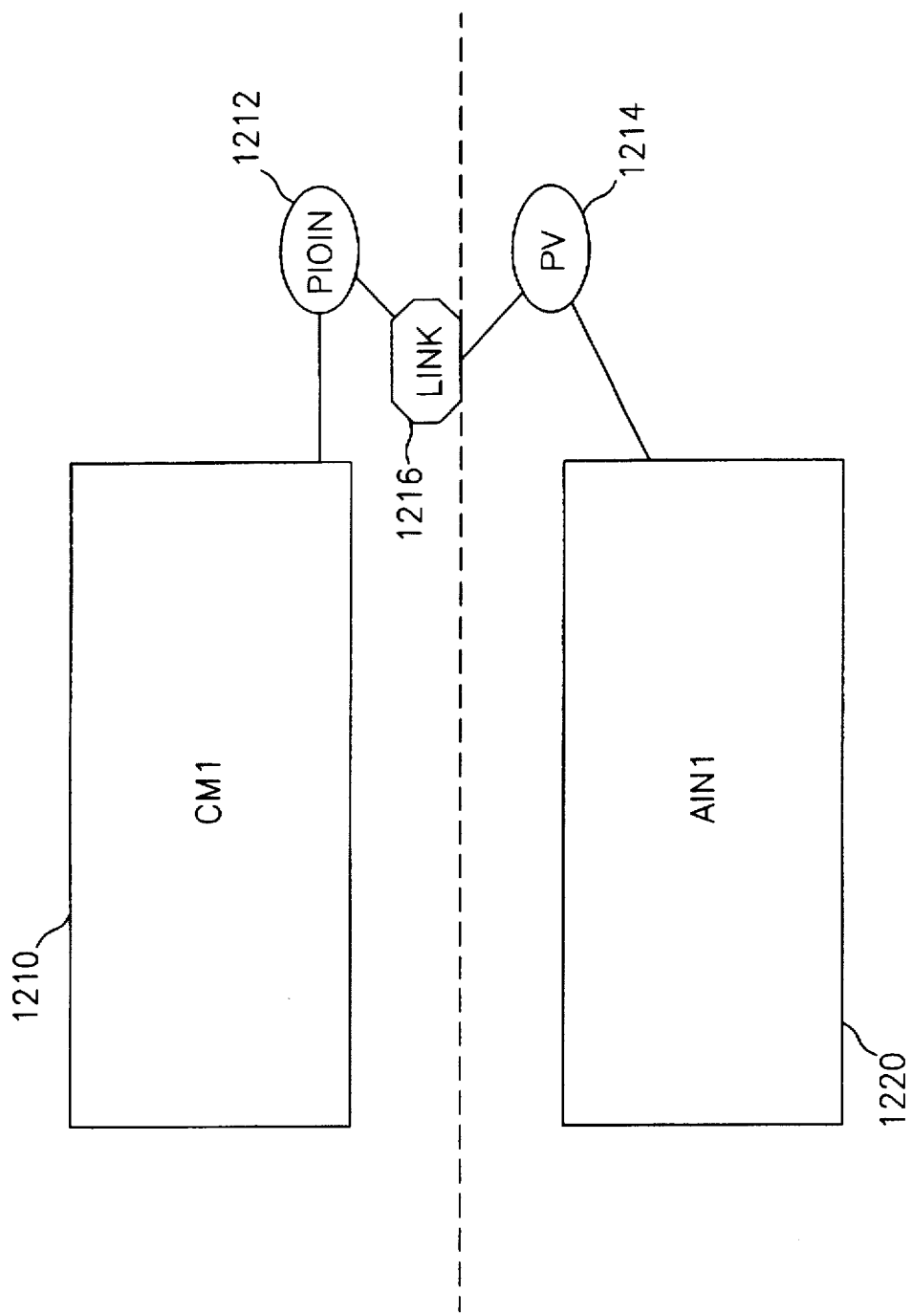
FIG. 13 is a block diagram depicting an object-oriented method for linking a control module input attribute to a PIO attribute.

Referring to FIG. 13, a block diagram illustrates an object-oriented method for linking a Control Module input attribute to a process I/O attribute. Prior to linking of the control module input attribute to the PIO attribute, the PIO block AIN 1220 is previously installed and the control module 1210 is also installed. The user specifies that a PIOIN attribute 1212 of the control module 1210 is connected to an attribute input process variable PV 1214 and requests that a link be made. A link 1216 is made as the control module finds the PIOIN attribute and returns a corresponding attribute index, locates PIO AIN in a plant area, find the process variable PV attribute and returns a corresponding attribute index, instructs the run-time linker 1216 to create a link with a source at the process variable (PV) 1214 and a destination at the PIOIN attribute 1212, creates the link and connects the link 1216. At end of a download, links are resolved by the linked objects.

Figure 14:
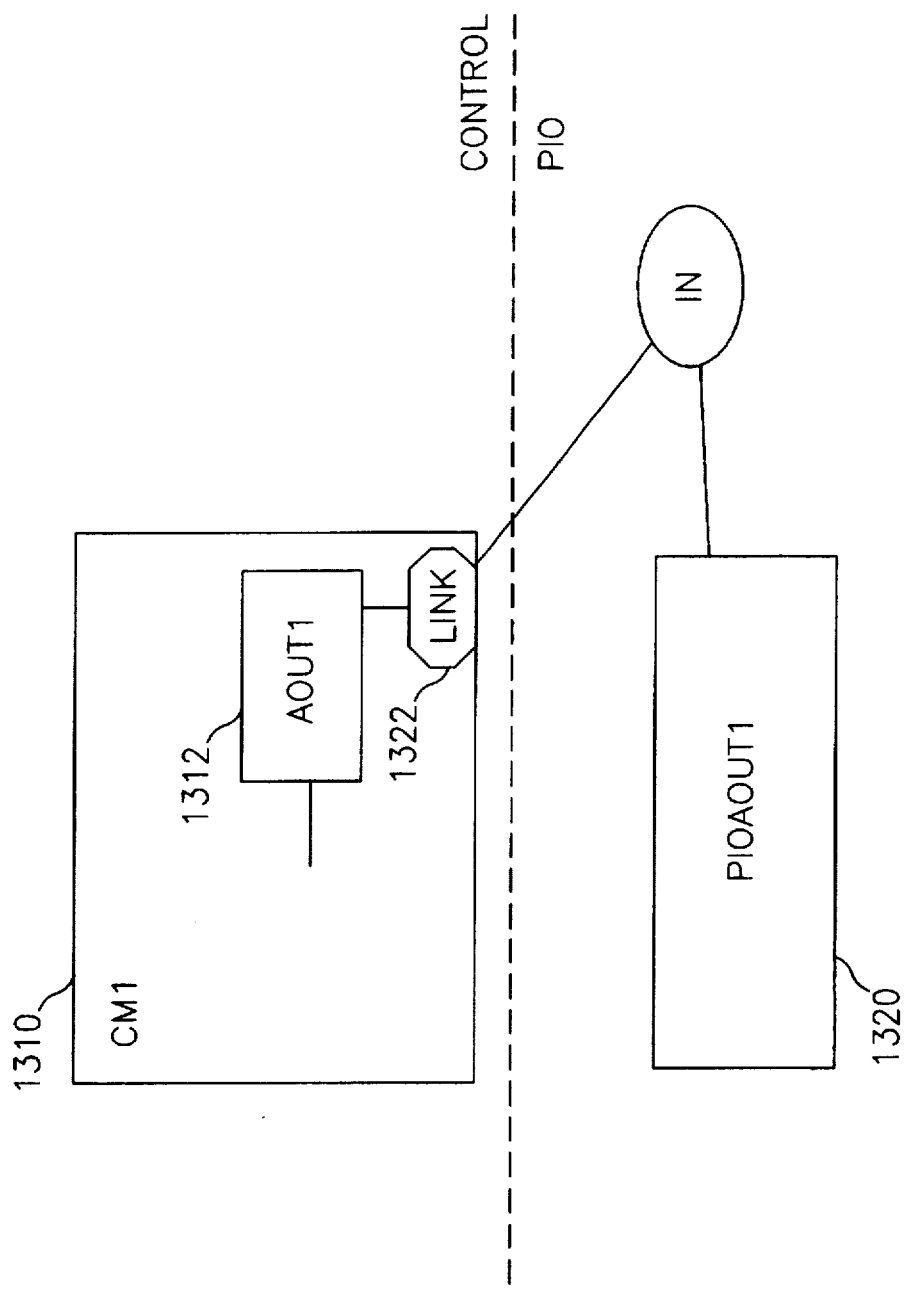
FIG. 14 is a block diagram showing an object-oriented method for linking a control module output attribute to a PIO attribute.

Referring to FIG. 14, a block diagram shows an object-oriented method for linking a control module output attribute (AOUT) 1312 attribute to a PIO output attribute (PIOAOUT) 1320. A control module 1310 is previously installed and the control module output attribute (AOUT) 1312 is installed within the control module 1310. The user specifies that the control module output attribute (AOUT) 1312 is connected to the a PIO output attribute (PIOAOUT) 1320. The link is made as the run-time implementation of the control module 1310 is sent a message to form the connection, the control module 1310 finds the AOUT attribute, requests location of the PIOAOUT attribute 1320, creates a link 1322 and connects the AOUT attribute 1312 and the PIOAOUT attribute 1320 to the link 1322.

Figure 15:
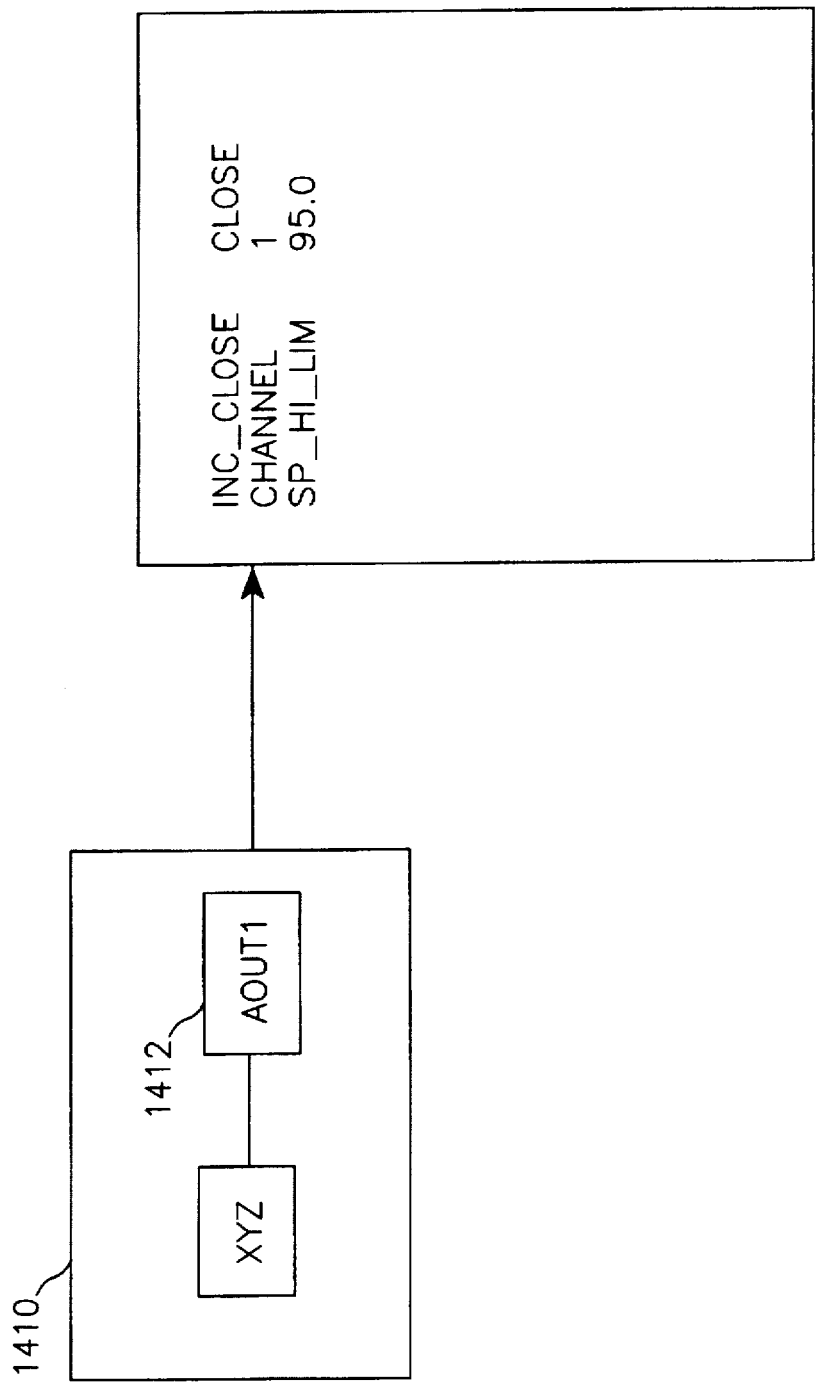
FIG. 15 is a block diagram showing an object-oriented method for reading values of contained PIO attributes.

Referring to FIG. 15, a block diagram shows an object-oriented method for reading values of contained PIO attributes. A PIO block 1410 is previously installed and an output attribute (AOUT) 1412 is previously installed within the PIO block 1410. A user, for example an engineer, requests a detailed view of the block in which all attribute values are displayed. The detailed display includes one or more sets of display groups, also called view definitions, associated with the PIO block 1410. A proxy is previously established for the PIO Block 1410. A user requests detail for the output attribute (AOUT) 1412. Attribute names and values for the AOUT block are presented by an application program requesting a proxy client routine to access a view, an AOUT proxy client setting a return view definition and creating an attribute proxy object, and the application program requesting the AOUT proxy client to read out values for attributes named with granted privileges. The application program formats and displays the data. Display group parameters are part of an I/O block definition and are, therefore, not configurable. Display groups are defined for attributes. Information is advantageously updated while a PIO block is not linked since display groups and view groups control updating of non-linked PIO attributes associated with a block.

The process control environment 100 shown in FIG. 1C implements an overall strategy as if all connected devices are Fieldbus devices not only by the usage of a function block as a fundamental building block for control structures, but also by implementing an input/output architecture that treats Fieldbus and nonFieldbus devices in the same manner. The fundamental character of the input/output architecture is based on instrument signal tags (ISTs) that furnish user-configurable names for all I/O signals including Fieldbus and nonFieldbus I/O signals.

From the perspective of a user, an IST binds a user-defined name to a signal type, to a specific signal in the I/O subsystem, to a signal path including an attribute and to a set of signal property settings.

ISTs are not installed in the manner of other system objects. Instead, signal properties inherent to the IST tag are combined with I/O Port and I/O Device properties that are made available when an I/O Card is installed. The combination of IST, I/O Port and I/O Device properties furnish information for creating a PIO function block in the run-time system. The signal path from ISTs is included in the script that defines I/O Function Blocks during installation of a module.

To communicate throughout the process control environment 100, an I/O type Function Block uses an I/O reference definition. An IST satisfies the specification for an I/O reference. Conventional I/O devices, such as MTL devices supplied by Measurement Technologies Limited of the United Kingdom, have an IST for each channel. Hart and Fieldbus I/O devices may include an IST for each distinct "I/O signal" on a Port or in a field Device. IST names have system-wide scope and share the name space of Modules, Devices, and Areas. In large systems, ISTs typically correspond to instrument signal names on instrumentation drawings. In small systems, formal instrument drawings may not exist so that no obvious IST names are inferred. Typically, ISTs are automatically generated as cards are configured based on a device hierarchy path representing a controller node, I/O subsystem, card and port so that arbitrary IST names are avoided. Typically most ISTs are created automatically when a new I/O card is defined. For multiple-signal I/O devices, an IST is automatically created for only a single "primary signal". In addition to automatic IST creation, a user may also create ISTs using an "Assign . . . " menu available from the Explorer Node/IOsubsys/Port/Device tree with a Port or Device selected or using a "New . . . " menu available from the Explorer IST tree.

ISTs have a "signal type" property to ensure compatibility between the I/O signal and the I/O Function Block(s) that accesses the I/O signal. Signal type is one of: AIN, AOUT, DIN, DOUT, PCIN, PCOUT. ISTs have a set of "signal-related" attributes specific to the signal type (e.g. EU0 and EU100 for a AIN, MOMENTARY or LATCHED for a DOUT, etc.). All signal sources with the same signal type have the same set of "signal attributes". All other properties of the I/O subsystem objects are held in card, port, or device attributes.

Fully configured ISTs have a fully qualified path to a corresponding signal in the I/O system, e.g. "CON1/IO1/SO1/CO1/FIELD_VAL". An IST may be created without a defined path defined so that module configuration may be completed before I/O structure details are fully defined. Modules with I/O Function Blocks using ISTs with no defined path may be configured and installed but the run-time system must deal appropriately with missing I/O paths of missing ISTs on I/O Function blocks. A signal source has no more than one IST. Attempts to configure more than one IST with the same path are rejected.

A user may delete an IST, thereby deleting associated signal properties and possibly leaving some unresolvable IST references in I/O Function Blocks. A deleted IST does not affect card/port/device properties with a normal display of the IST on the Port/Device in the Explorer tree indicating no associated IST.

I/O-interface Function Blocks have at least one IST-Reference property. An IST-Reference property is either left blank to indicate that the function block does not connect to a IST, or is designated with a valid IST name. An IST-Reference property in an I/O Function Block is compatible with exactly one IST signal type. For example, the IST-Reference in the AI Function Block has an IST with a signal type "AIN" only. Several I/O Function Blocks are compatible with the same IST signal type.

For compatibility with Fieldbus I/O Function Block definitions, Fieldbus I/O Function Blocks have attributes such as XD_SCALE, OUT_SCALE which overlap with some of the signal properties in ISTs. When a valid IST-Reference is made, the configured values of these overlapped Function Block attributes are ignored in the Run-time system and the corresponding properties from the IST are used instead. An engineer configuring Fieldbus I/O Function Blocks uses an indication of ignored attributes when a IST reference is in place. Such an indication is typically presented on a display as grayed out and non-editable text with values copied from the IST. The I/O Function Block holds a private setting for the ignored attributes which are typically downloaded and promptly overridden. If the IST-Reference is removed, the setting for these attributes retains utility.

I/O Cards, Ports and Devices are incorporated into a configuration by a user operating a user interface, either the Explorer™ or the Module Definition Editor. The channels on conventional I/O cards are called "ports" and treated as an I/O Port so that special case terminology for conventional I/O is avoided. The user interface also allows a user to delete I/O Cards, Ports or Devices. Multiple I/O Card types are supported including, for example, 8-chan MTL AI, 8-chan MTL AO, 8-chan MTL DI, 8-chan MTL DO, 4-chan MTL Thermocouple/RTD, 8-chan HART input, 8-chan HART output, and 4-chanSolenoid. Some I/O Card types have a combination of I/O Port types on the same I/O Card. Deletion of an I/O Card deletes all subordinate Ports. Deletion of an I/O Port deletes all subordinate Devices. Deletion of I/O Ports or I/O Devices does not delete related instrument signal tags (ISTs), but the path of the IST path to the associated I/O signal no longer is operable. If another I/O Port or I/O Device is created which has the same path, the IST automatically rebinds to the I/O Port or I/O Device, so long as the signal type is compatible.

A user can initiate the Install of an I/O subsystem, which installs or reinstalls all I/O Cards defined in the Subsystem. The user can initiate the Install of a single I/O Card, which installs the card properties and all properties for subordinate I/O Ports and I/O Devices.

The Explorer™ and the Module Definition Editor configure the I/O subsystem by accessing current signal values, status, and selected properties that are directly addressable as Attributes in the I/O subsystem. The user displays a graphic indicative of the current status of cards, ports, devices, and signal values and status by accessing the respective cards, ports, devices and signal values and status using device hierarchy attribute path addressing (for example, "CON1/IO1/C01/P01/FIELD_VAL").

I/O subsystem attributes are communicated using the physical device path (for example, CON1/IO1/C01/P01/D01/FIELD_VAL) for addressing in communications between devices. Communication of I/O subsystem attributes is advantageously used to transmit attributes from a controller/multiplexer 110 to a workstation 102, 104, 106 shown in FIG. 1C for display and from a first to a second controller/multiplexer 110 for virtual I/O handling.

Figure 16:
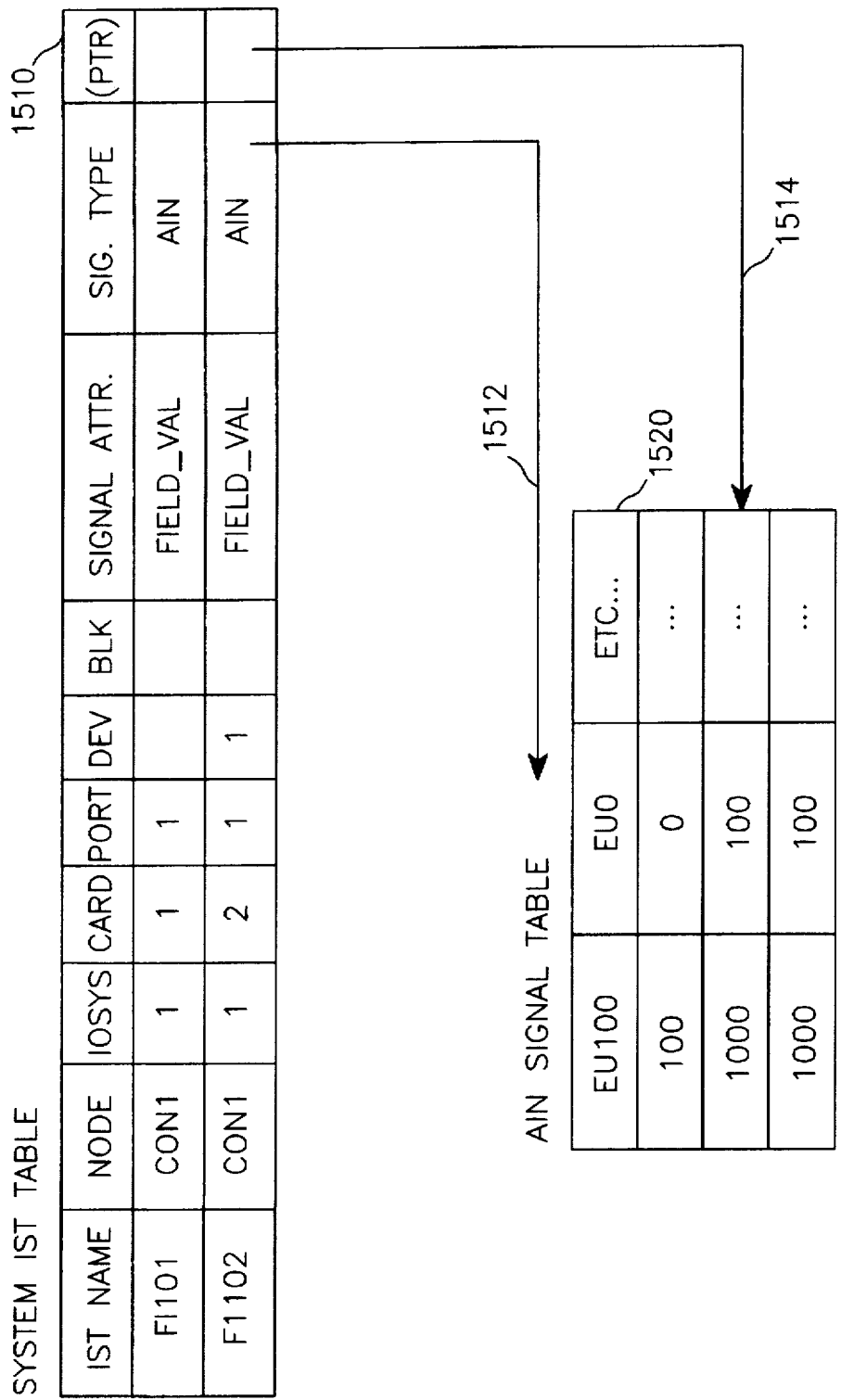
FIG. 16 is a block diagram which illustrates an organization of information for an instrument signal tag.

Referring to FIG. 16, a block diagram illustrates an organization of information for an instrument signal tag (IST). An system IST table 1510 contains information relating to an IST including path information and pointers to a system object. A first pointer 1512 designates a signal type which points to an attribute signal table 1520. A second pointer 1514 designates an entry in the attribute signal table 1520.

Accessing of information using device hierarchy attribute addressing advantageously allows system diagnostic displays to be designed and built for system integration checkout before Control Module work is complete. Device hierarchy attribute addressing also supports direct addressing of I/O signals from Modules, bypassing the use of I/O function blocks and avoiding I/O function block behavior. I/O Card, I/O Port and I/O Device identifiers are generally defined automatically according to slot position information and the like.

Figure 17:
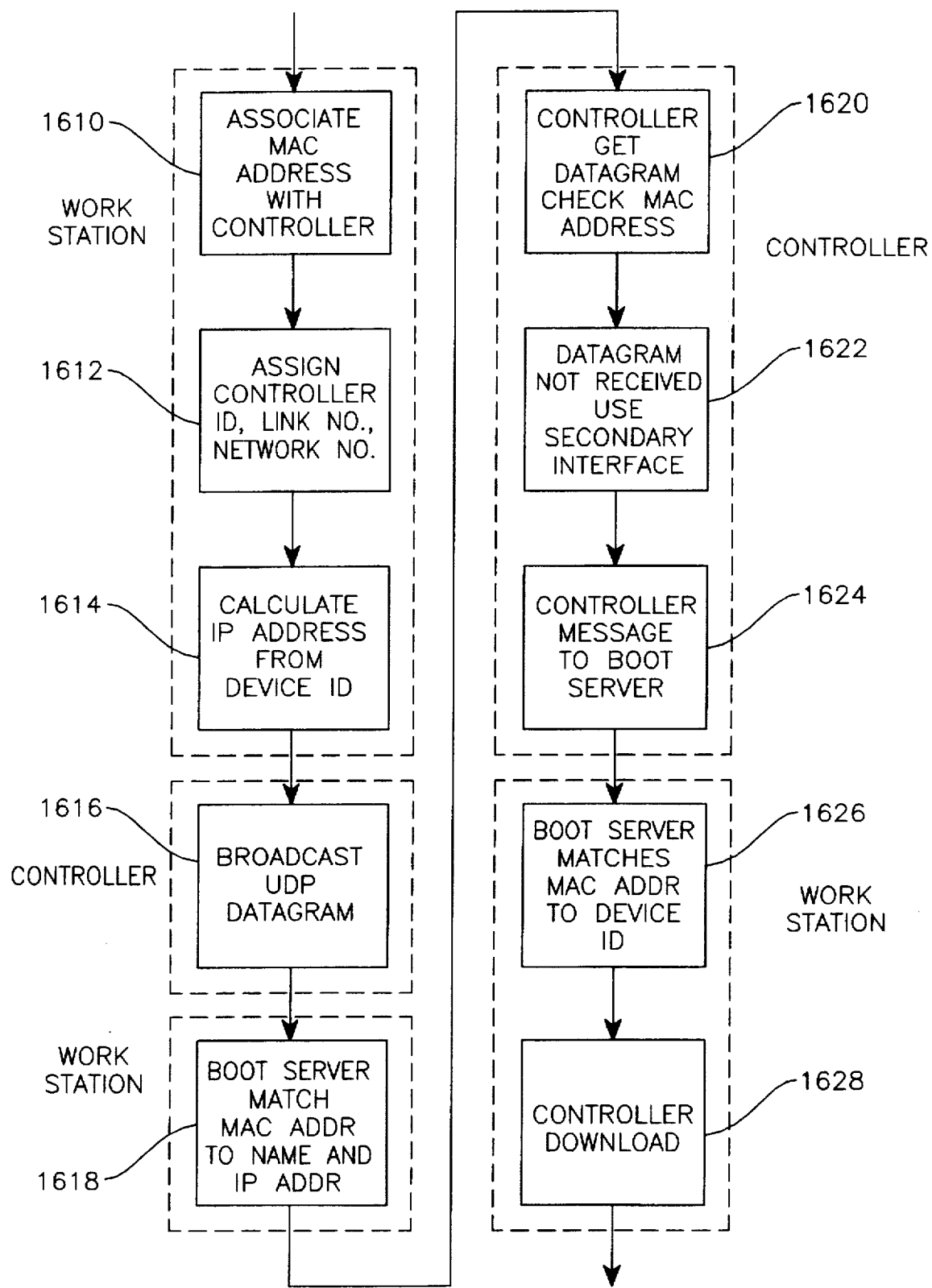
FIG. 17 is a flow chart illustrating a method for bootstrap loading a control system throughout a network in the process control environment.

Referring to FIG. 17, a flow chart illustrates a method for bootstrap loading a control system throughout a network in the process control environment 100, including the operations of assigning the controller/ multiplexers 110 to a set of IP Addresses, a node name and other startup information that is not stored in flash ROMs of a controller/multiplexer 110. A process 1600 for assigning internet protocol (IP) Addresses to a Controller upon its initial bootup includes the step of associating a MAC address in a Boot server, a Windows NT™ workstation, with a controller/multiplexer name 1610. The MAC address alone designates the controller/multiplexer identity. In step 1612, the name of the controller/multiplexer is assigned an arbitrary device ID, and an ACN link number and a PCN network number that are determined by the cable attached to the controller/multiplexer. In step 1614, an IP address of a device is calculated from the device ID, the ACN link number and the PCN network number. In step 1616, a UDP datagram, which designates default primary and secondary IP addresses that are reserved for booting nodes and includes the controller/multiplexer MAC address in the UDP user data, is broadcast to a special UDP reserved boot port using the default primary IP address for the source address on the primary interface. In step 1618, the boot server matches the MAC address with the assigned name and IP addresses, and broadcasts the assigned name and IP addresses with an echo of the MAC address to the UDP boot port. By broadcasting, the problem of doing any routing or ARP static entry manipulation is avoided. In step 1620, the controller/multiplexer receives the datagram, checks the MAC address, and if the MAC address matches, sets the IP addresses and saves the node name and device ID. If the datagram is not received, the procedure is repeated using the secondary interface through the operation of branch step 1622. In step 1624, the controller/multiplexer, using the new address, sends a message to the boot server saying indicating that the controller/multiplexer is operational.

In step 1626, a user enters a Device Name, Device MAC Address, ACN Link Number and PCN Network Number. The device ID can be automatically assigned by configuration software. The communications subsystem calculates the devices three IP addresses from the configured ACN Link number, PCN Network Number and the assigned device ID. In step 1628, controller/multiplexer or I/O card software is flash downloaded over the ACN network by passing messages and S-Record files between devices on the ACN.

Figure 18A:
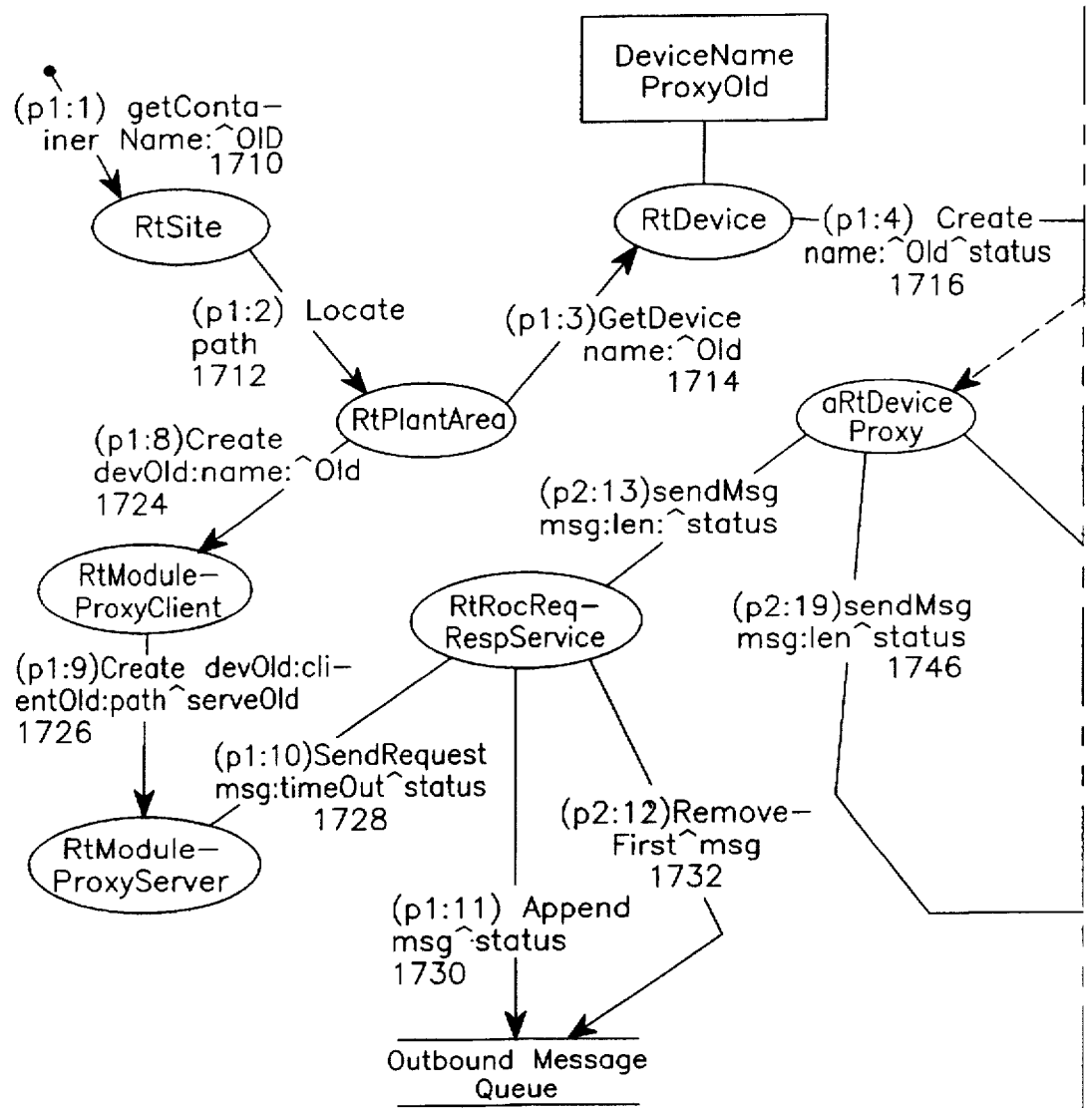
FIG. 18 is an object communication diagram illustrating a method for creating a device connection for an active, originating side of the connection.
Figure 18A:
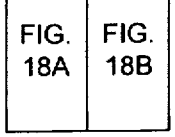
Figure 18B:
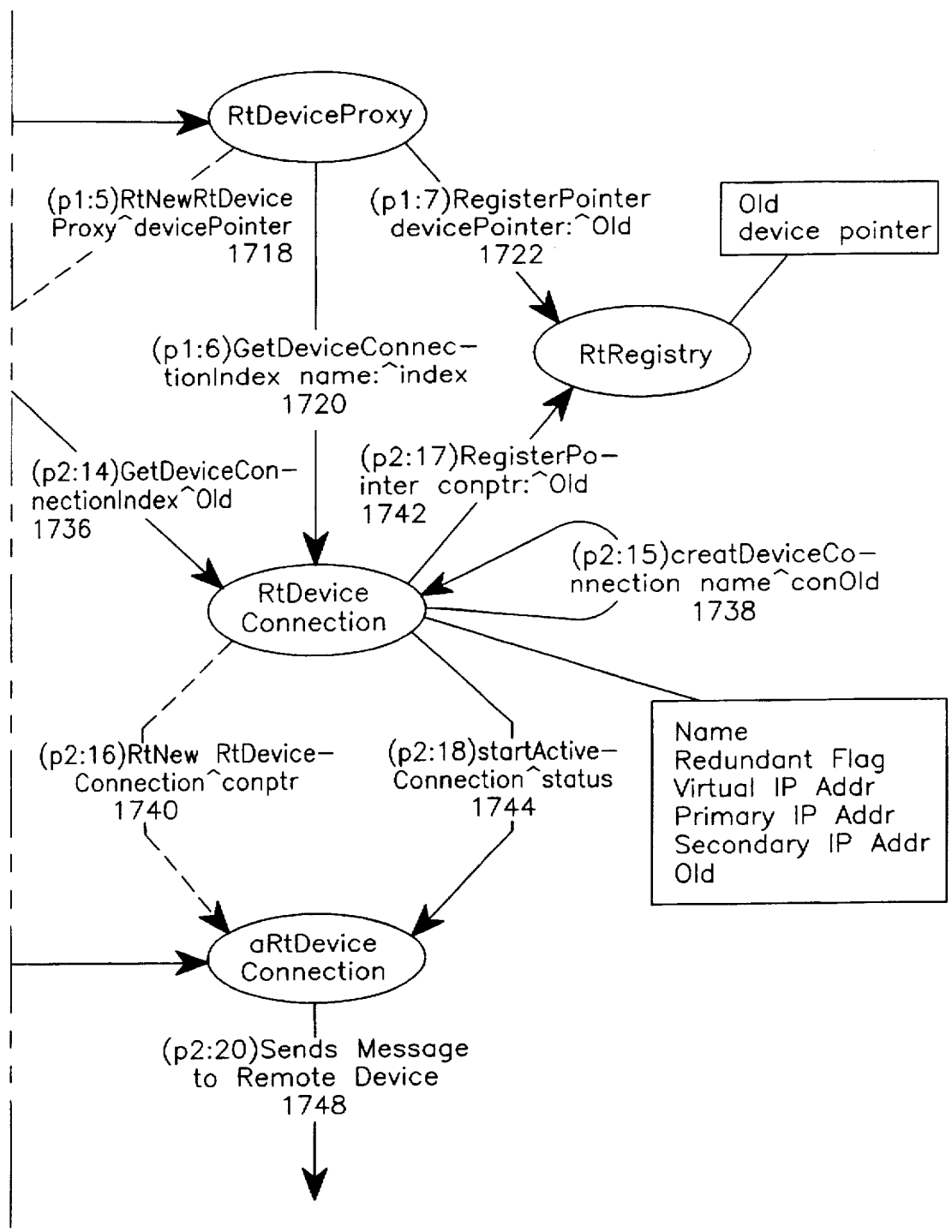

Referring to FIG. 18, an object communication diagram shows a method for creating a device connection for the active, originating side of a connection. An application program in either a workstation or a controller/multiplexer requests access to an attribute which is contained in another device. A UDP communications connection to the other device is established by the communication services so that the attribute can be accessed. Creation of a device connection spans two separate application programs. The application program which initiates the connection by requesting data located in another device and the Remote Object Communications (ROC) Services application program that actually sends the messages to the other device. If no connection exists when the ROC Services process is ready to send a message to a device, the ROC services create a connection to that device.

Prior to creating the device connection, a device to be connected has a valid Device Table containing the source device, is operating and includes an object RtDeviceConnection which monitors messages on the device connection port. After the device connection is created, a connection is established between the two devices and an RtDeviceConnection instance is created in the active device to handle the connection.

In step 1710, an application program sends a message getContainer to object RtSite which returns the object ID of the module found or created. In step 1712, object RtSite sends a Locate message to object RtPlantArea which locates the module and return its object ID. In step 1714, object RtSite sends a GetDevice message to object RtDevice which returns the object ID of the device containing the module. In step 1716, assuming that a proxy for the remote device does not exist, object RtDevice sends a Create message to object RtDeviceProxy. In step 1718, object RtDeviceProxy creates an instance of object RtDeviceProxy using template RtNew. In step 1720, object RtDeviceProxy asks object RtDeviceConnection to GetDeviceConnectionIndex which returns the index of the device name in the device connection table managed by object RtDeviceConnection. In step 1722, object RtDeviceProxy registers the pointer to the RtDeviceProxy instance for the connected device by sending a RegisterPointer message to the object RtRegistry and returns the device proxy Object ID to object RtDevice. In step 1724, object RtPlantArea sends a Create message to object RtModuleProxyClient to create a proxy client for the remote module. In step 1726, object RtModuleProxyClient sends a Create message to object RtModuleProxyServer to create a proxy server for the module in the remote device. In step 1728, object RtModuleProxyServer builds a create proxy server message and asks object RtRocReqRespService to SendRequest to the remote device. In step 1730, object RtRocReqRespService Appends the message to the Outbound Message Queue for the ROC Communications Services process to send to the remote device. In step 1732, object RtRocReqRespService in the ROC Comm Services process issues a RemoveFirst command to the Outbound Message Queue and gets the create proxy server message. In step 1734, the RtRocReqRespService sends the message by issuing a sendMsg command to the aRtDeviceProxy instance for the destination device. In step 1736, the aRtDeviceProxy instance issues a GetDeviceConnection command to RtDeviceConnection to get the Object ID for the RtDeviceConnection instance for the destination device. Assuming that a device connection does not already exist, in step 1738, object RtDeviceConnection performs a createDeviceConnection. In step 1740, object RtDeviceConnection creates an instance of RtDeviceConnection using template RtNew. In step 1742, object RtDeviceConnection registers the pointer to the RtDeviceConnection instance by sending a RegisterPointer message to the object RtRegistry and returns the device connection Object ID to object RtDeviceConnection. In step 1744, object RtDeviceConnection sends a startActiveConnection message to the aRtDeviceConnection instance. The aRtDeviceConnection instance performs the necessary steps to establish the connection to the other device. In step 1746, the RtDeviceProxy instance issues a sendMsg to the aRtDeviceConnection instance to send the create server message to the remote device. In step 1748, the aRtDeviceConnection instance sends the message to the remote device over the newly created connection.

Figure 19:
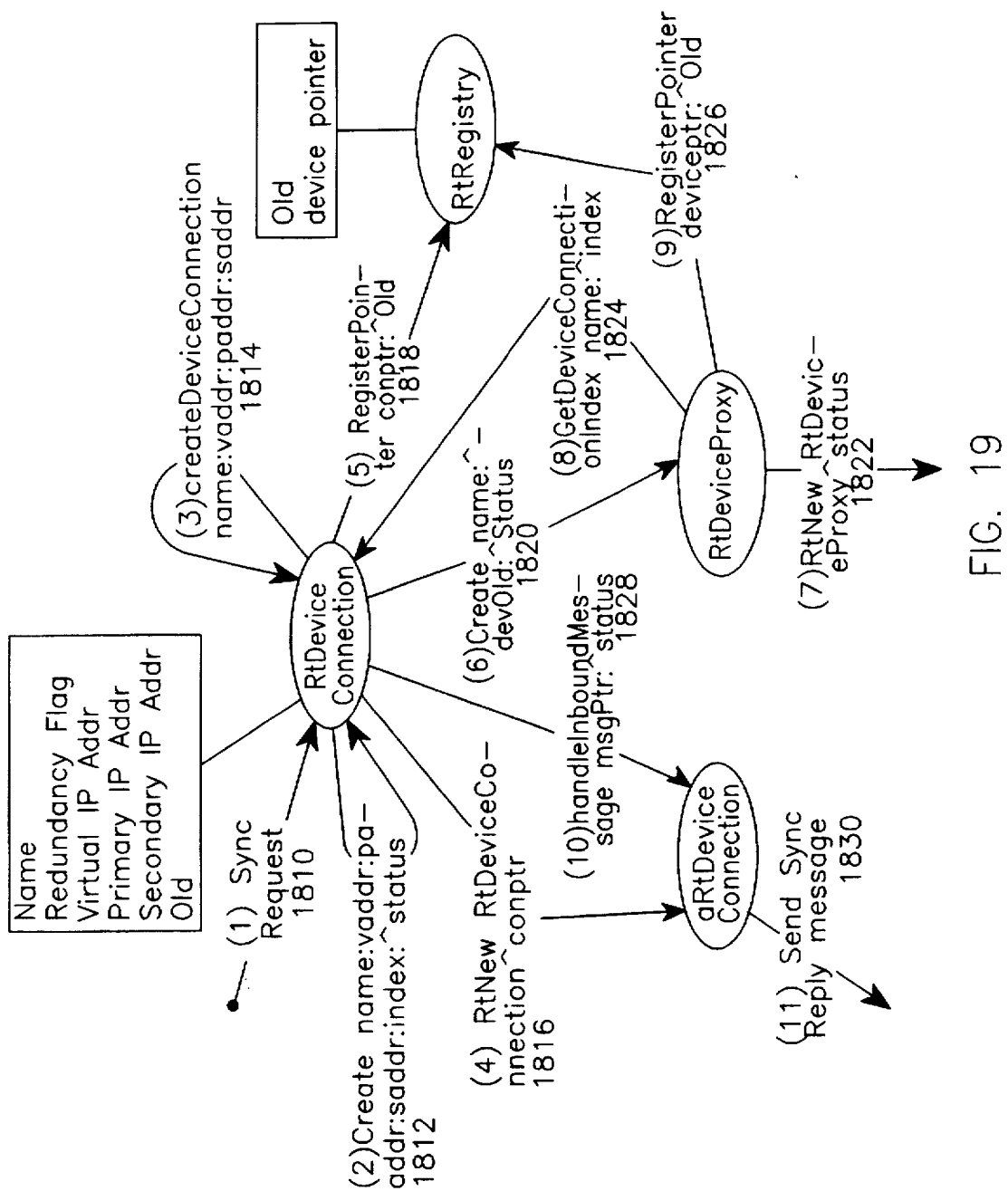
FIG. 19 is an object communication diagram illustrating a method for creating a device connection for a passive, listening side of the connection.

Referring to FIG. 19, an object communication diagram shows a method for creating a device connection for the passive, listening side of a connection. A request to establish a device connection is received from another workstation or controller/multiplexer. The communications services establishes a UDP communications connection with the requesting device.

Previous to creation of the connection, a device to be connected to is operating and contains an object aRtDeviceConnection which is ready to establish a connection. Object RtDevice Connection exists in the device and is listening for input messages in the form of a sync request. After the connection is created, a connection is established between the two devices and an RtDeviceConnection instance is created in the passive device to handle the connection.

In step 1810, object RtDeviceConnection receives a sync request message from a remote device. In step 1812, object RtDeviceConnection sends a Create message to object RtDeviceConnection to create a connection to the requesting device. Assuming that a device connection does not already exist, object RtDeviceConnection performs a createDeviceConnection in step 1814. In step 1816, object RtDeviceConnection creates an instance of RtDeviceConnection using template RtNew. In step 1818, object RtDeviceConnection registers the pointer to the RtDeviceConnection instance by sending a RegisterPointer message to the RtRegistry and returns the device connection object ID to object RtDeviceConnection. In step 1820, object RtDeviceConnection sends a Create message to object RtDeviceProxy to create a device proxy for the requesting device. In step 1822, object RtDeviceProxy creates an instance of RtDeviceProxy using template RtNew. In step 1824, object RtDeviceProxy sends a GetDeviceConnectionIndex message to the object RtDeviceConnection to have the index of the device in the device connection table managed by RtDeviceConnection for later use. In step 1826, object RtDeviceProxy registers the pointer to the RtDeviceProxy instance by sending a RegisterPointer message to the RtRegistry and returns the device proxy object ID to RtDeviceConnection. In step 1828, object RtDeviceConnection passes the sync request message to the aRtDeviceConnection instance for processing via the handleInboundMessage method. In step 1830, object aRtDeviceConnection sends a sync response message back to the remote device to indicate successful completion of the Device Connection creation.

Figure 20:
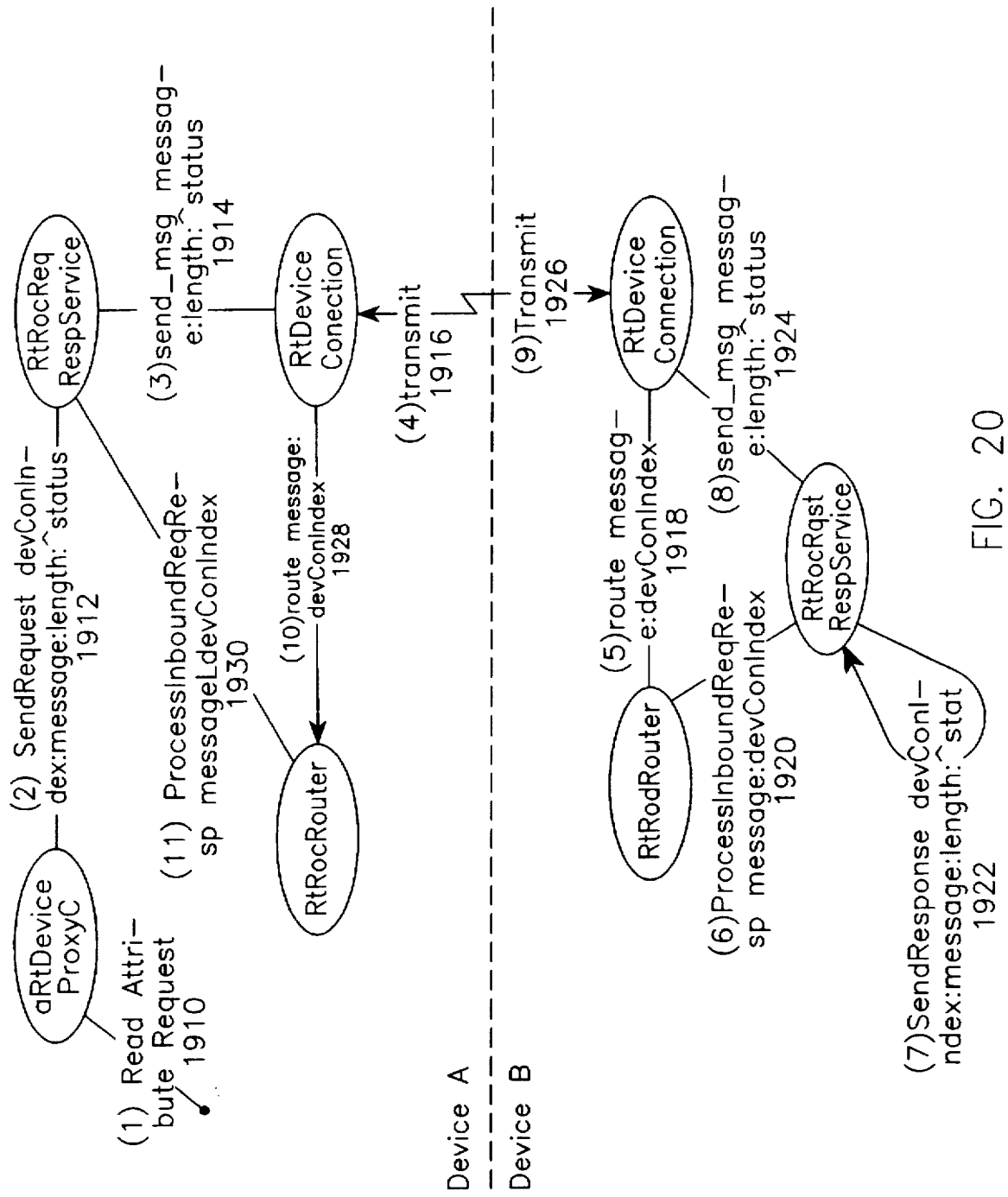
FIG. 20 is an object communication diagram illustrating a method for sending request/response messages between devices.

Referring to FIG. 20, an object communication diagram illustrates a method for sending request/response messages between devices. The remote object communications (ROC) service in one device sends a request message to the ROC service in another device. The request message is processed and a response message is sent back to the originating device.

Prior to sending messages, a UDP device connection is established between devices. Following the sending of request/response messages between devices, a response message from a remote device has been received and is ready for processing by ROC services.

In step 1910, a read attribute request is issued by an application program to an aRtDeviceProxy instance associated with a remote device. In step 1912, the aRtDeviceProxy instance builds a request message to be sent to the remote device to read the attribute value and asks the RtRocReqRespService to send the message using the SendRequest method. In step 1914, object RtRocReqRespService sends the message to the instance of RtDeviceConnection associated with the connection to the remote device using the send_msg method. In step 1916, the instance of RtDeviceConnection then transmits the message to the remote device over the device connection. In step 1918, the instance of RtDeviceConnection in the remote device receives the message and requests the RtRocRouter class to route the message to the correct inbound message service. In step 1920, object RtRocRouter determines that the message is a request/response message and requests object RtRocReqRespService to ProcessInboundReqResp. After the message is processed by the ROC services and the message consumer a response message is built, in step 1922 object RtRocRqstRespService sends the response message to the originating device using the SendResponse method. In step 1924, the outbound message queue processing of RtRocReqRespService sends the response message to the instance of RtDeviceConnection associated with the connection to the source device using the send_msg method. In step 1926, the instance of RtDeviceConnection then transmits the response message back to the original device. In step 1928, the instance of RtDeviceConnection in the original device receives the message and requests the RtRocRouter class to route the message to the correct inbound message service. In step 1930, object RtRocRouter determines that the message is a request/response message and requests RtRocReqRespService to ProcessInboundReqResp.

Figure 21A:
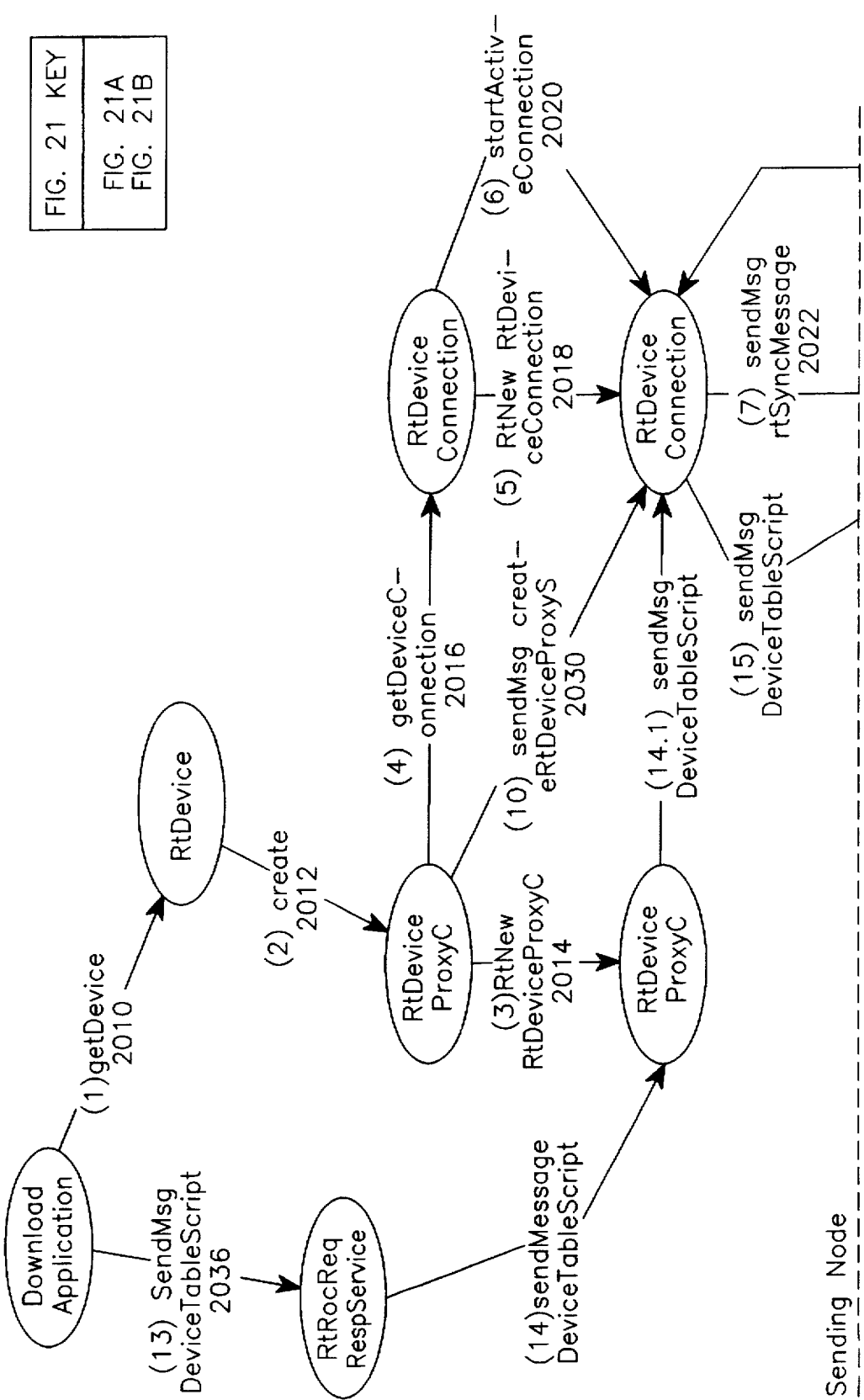
FIG. 21 is an object communication diagram illustrating a method downloading a network configuration.
Figure 21B:
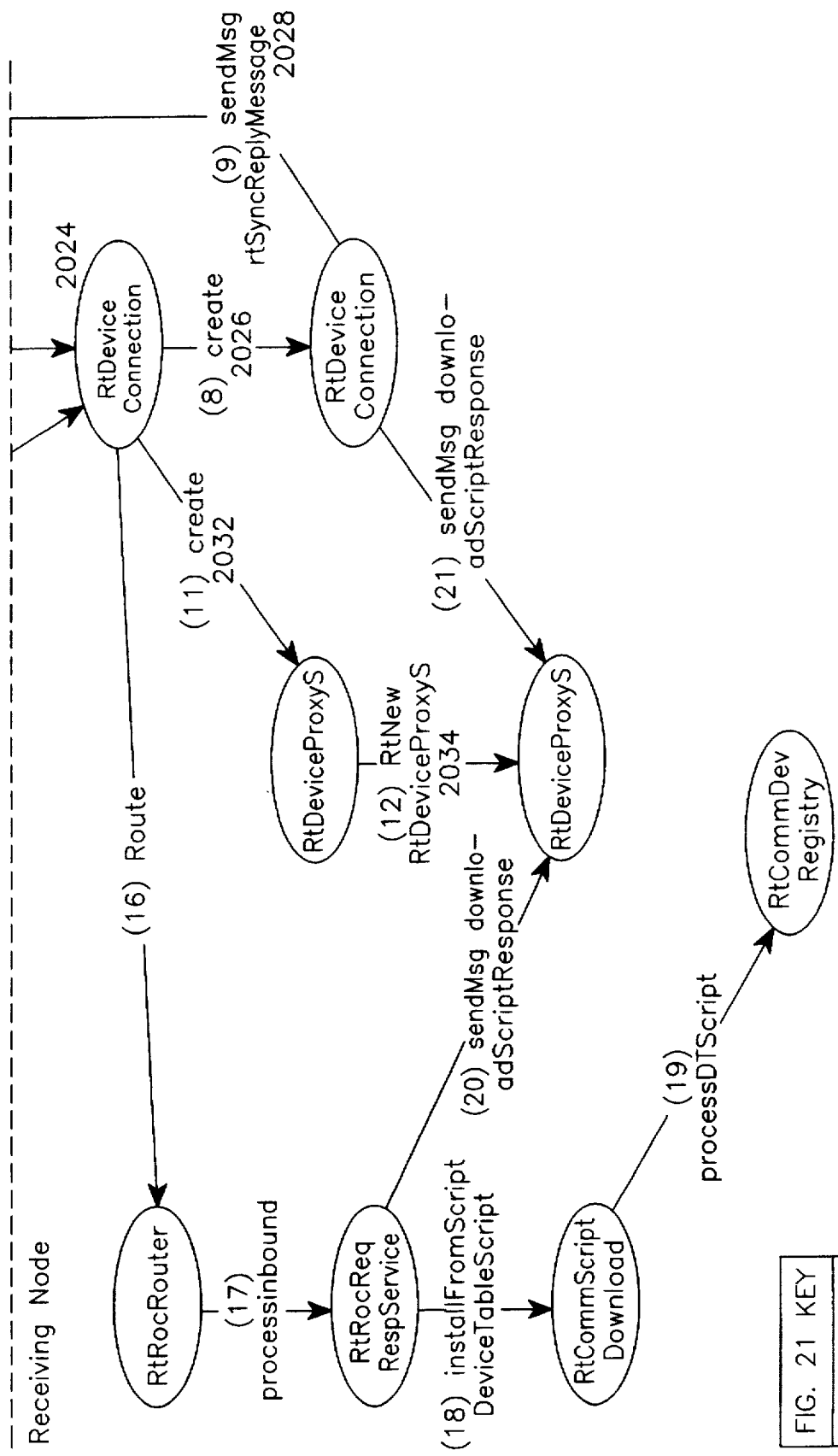
Figure 22A:
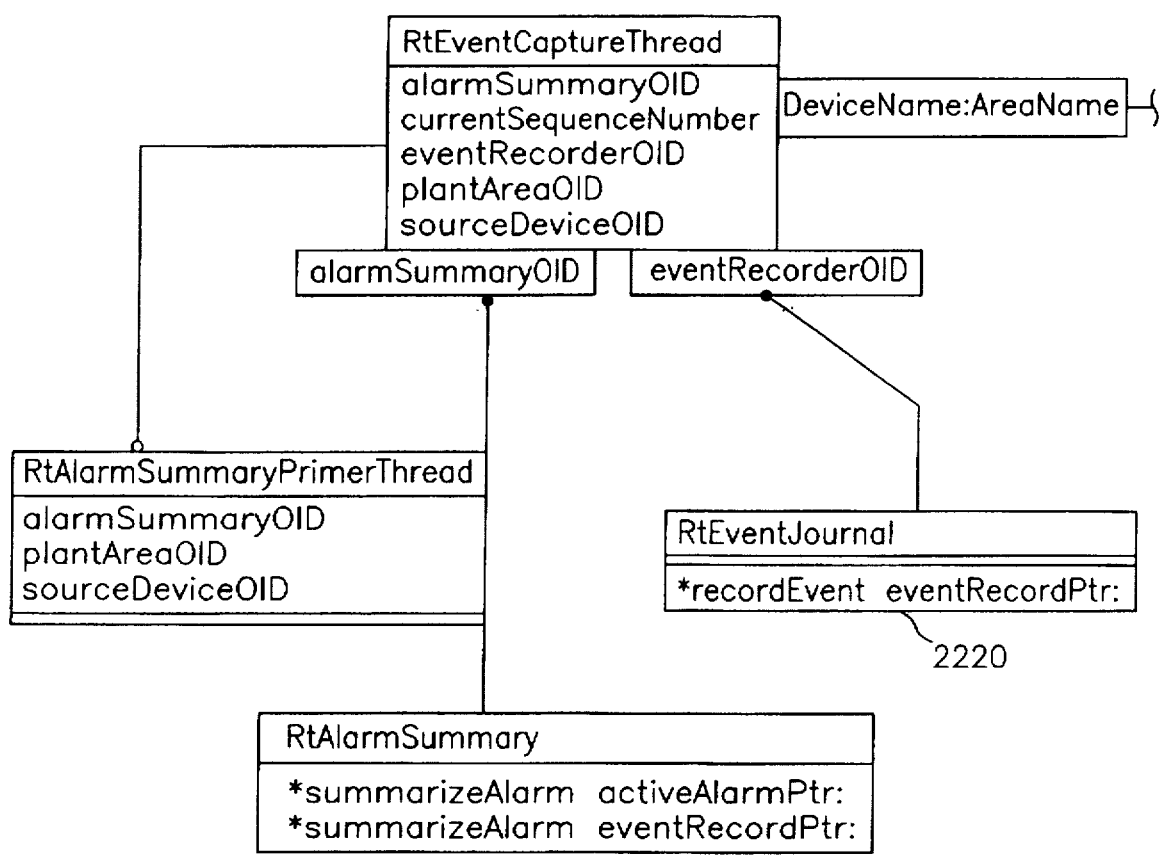
FIG. 22 is an object model showing object relationships of various objects for handling alarm and event functions.
Figure 22A:
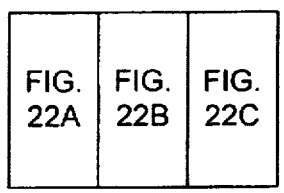
Figure 22B:
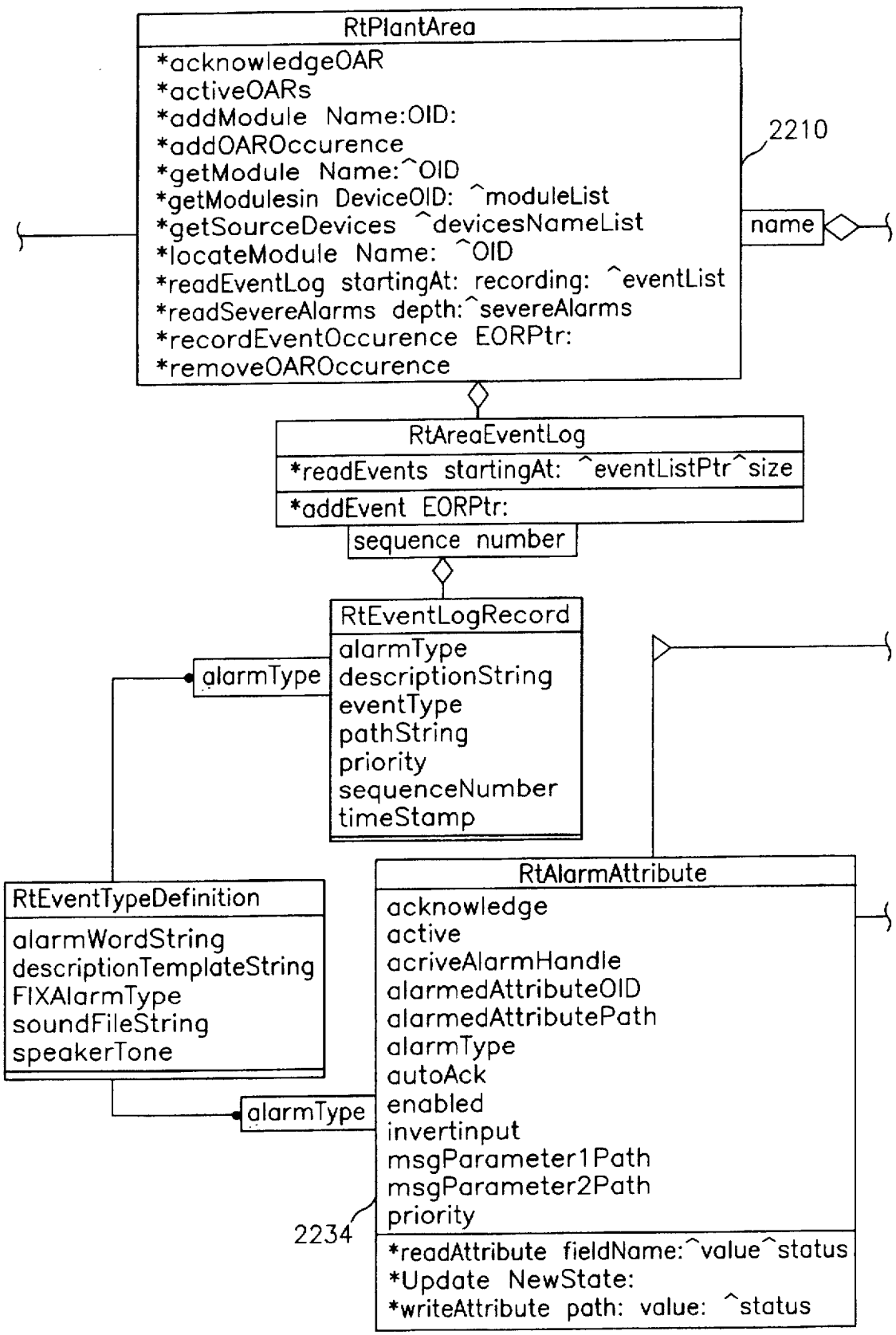
Figure 22C:
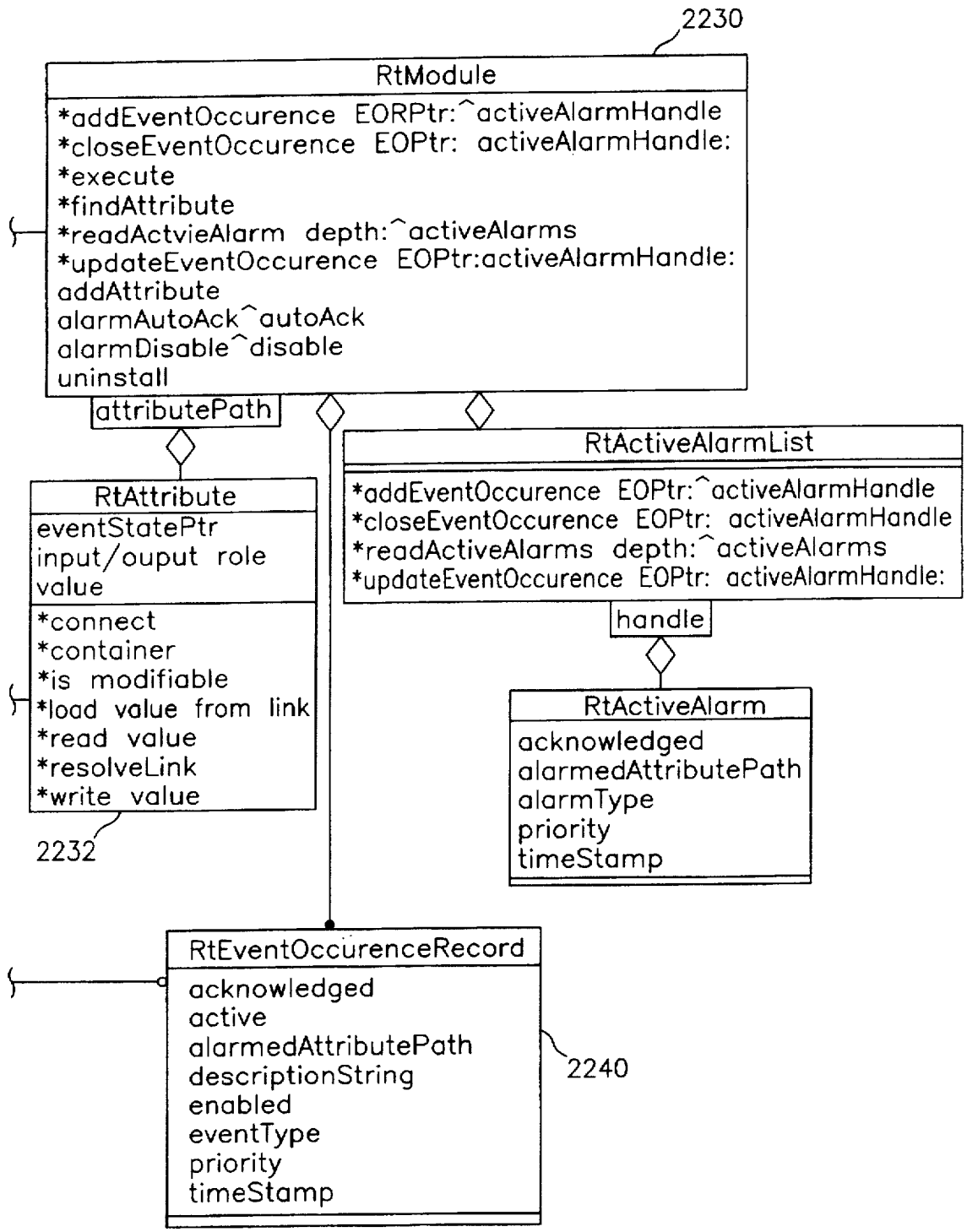

Referring to FIG. 21 an object communication diagram illustrates a method downloading a network configuration. A user, following completion of the device configuration for a system, initiates a download to a controller/multiplexer. A device table configuration script is built by the configuration application. Using communications services, the configuration application establishes a device connection with the controller/multiplexer to receive the download and sends a download script to the controller device. The controller/multiplexer receives the download script messages and processes the device table. In step 2010, a configuration download application program builds remote object communications (ROC) script download messages containing the device table download script. In step 2012, the Download application issues a GetDevice message to RtDevice to get the Object ID for the RtDeviceProxy for the remote device. In step 2014, the RtDeviceProxy does not yet exist so a Create message is sent to RtDeviceProxyC to create the necessary device proxy object. In step 2016, RtDeviceProxyC sends a GetDeviceConnIndex message to RtDeviceConnection to get the index of the device connection for the remote device in the device connection table. In step 2018, the device connection does not yet exist so aRtDeviceConnection object is created to manage the connection to the remote device. A lookup is performed in the database to find the remote device entry. The device communications data (for example, ID and IP Addresses) is retrieved from the database and a new entry is added to the configuration devices connection table. This connection is marked permanent in the connection table since the device initiated the connection. In step 2020, a startActiveConnection message is sent to the aRtDeviceConnection object to establish a connection to the remote device. In step 2022, the aRtDeviceConnection sends an RtSyncMessage to the remote device. In step 2024, the remote device receives the RtSyncMessage and attempts to find an entry in the device connection table for the sending device. In step 2026, no entry is found so a new entry is added to the device connection table for the sending device and aRtDeviceConnection object is created to handle the connection in the receiving device. In step 2028, a RtSyncReplyMessage is created and sent back to the sending device containing the device connection index from the device table. The device connection is now established and ready to send and receive messages. In step 2030, the RtDeviceProxyC sends a create RtDeviceProxyS message to the remote device. In step 2032, the RtDeviceProxyS is created in the remote device. In step 2034, the Download Application sends the download scripts to the remote device via RtRocReqRespServices using the SendMsg call. In step 2036, RtCommScriptDownload receives the Device Table script and processes each device table item and stores the data in a database Registry used to hold configuration data. For controller/multiplexers this processing is used to create RtDeviceConnection objects and add the objects to the device connection table, allowing the memory to be acquired on download rather than subsequently.

Referring to FIG. 22, an object model shows object relationships of various objects for handling alarm and event functions. Various conditions are defined to be "events" including Alarms, Alarm acknowledgments, user changes (writing attributes, invoking methods, log-in/out), configuration changes to the "run-time" system (installations, de-installs, etc.), Sequential Function Chart (SFC) state changes, Operator Attention Requests (OARs), and other miscellaneous Events (non-alarm state transitions including equipment state changes).

A common characteristic for all types of events is that the occurrence or state transition of an event can be recorded in a Event Journal. All events are associated with one (or more) plant areas. Event occurrence records (RtEventOccurrenceRecord 2240) are captured in the Event Journal, or Journals, (RtEventjournal 2220) designated for the associated plant area (RtPlantArea 2210).

A user activates the Event Journal, typically using a workstation, by configuring one or more Plant Areas within which the activated Event Journal captures events. On-line operation of the Event Journal is modified under user control by disabling or enabling specified classes of events to be recorded.

The user configures an Alarm behavior by creating Alarm Attributes (RtAttribute 2232) in Control Modules or Equipment Modules (RtModule 2230). An Alarm Attribute furnishes reference to any boolean Attribute within the Control Module or Equipment Module containing the Attribute. Alarm Attributes are created only at the Module level. Alarm Attributes are not created in Composite Function Blocks.

Figure 23:
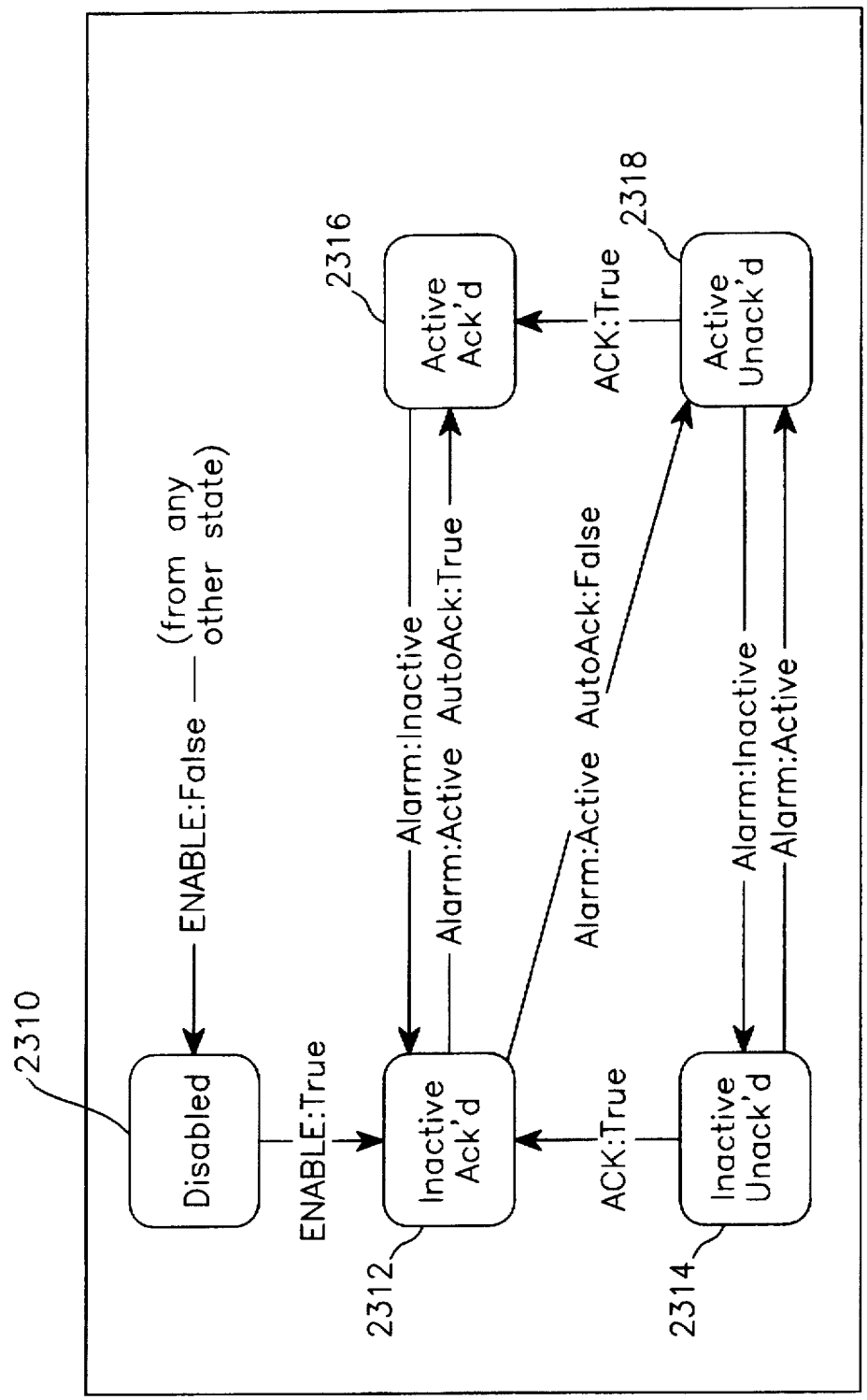
FIG. 23 is a state transition diagram which depicts alarm attribute states.

Referring to FIG. 23, a state transition diagram illustrates alarm attribute states. A user either disables or enables an Alarm Attribute. When disabled 2310, the Alarm Attribute appears in a "normal" condition, called an "Inactive and Acknowledged" condition. The Disabled/Enabled condition of an Alarm Attribute is changed either on-line by an Operator, or automatically by a control algorithm in the system. The initial Disabled/Enabled condition is set at configuration time. An enabled Alarm Attribute has either an Active condition 2316 or 2318 or an Inactive condition 2312 or 2314. The Alarm is Active ("in alarm") when the referenced boolean Attribute is TRUE. The Alarm Attribute is optionally configured to invert the sense of the alarm state, so an Alarm Attribute with .INV characteristic TRUE operates is if the referenced Attribute's value of FALSE indicates an "in alarm" condition. The Active/Inactive condition is driven by the state of the referenced Attribute so that the Active/Inactive condition is not directly changed by the Operator or another control algorithm.

While Enabled, an Alarm Attribute has either an Acknowledged 2312 or 2316 or Unacknowledged state 2314 or 2318. The Alarm Attribute is placed in the Unacknowledged condition only if the Alarm Attribute makes a transition from Inactive to Active state, unless automatically acknowledged. An Operator or another control algorithm may acknowledge the Alarm, changing the Alarm Attribute to the Acknowledged condition.

An Alarm Attribute is either automatically acknowledged (AACK'd) or not automatically acknowledged. AACK is determined from the current Alarm priority. A user-configured, system-wide table determines AACK behavior. For example, the table may designate that all "LOW" priority Alarms are automatically acknowledged (AACK is TRUE), all "MEDIUM" and "HIGH" priority Alarms are not automatically acknowledged (AACK is FALSE). When AACK is TRUE, the alarm is never placed in an Unacknowledged condition.

The combined operation of the Enable/Disabled, Active/Inactive, and Acknowledged/Unacknowledged conditions results in user-visible states for an Alarm Attribute that are shown in FIG. 23.

An enabled Alarm Attribute initially goes to the Inactive/Ack'd State 2312, and may immediately transition to either Active/Unack'd 2314 or Active/Ack'd 2316. The transition to Active/Ack'd 2316 is accompanied by a standard "transition" behavior for Alarms in which the transition is timestamped and the event is recorded in the event journal, for example.

The Alarm Attribute has multiple fields that provide a user-visible interface. A CUALM "current alarm" field is "OK" when the Alarm Attribute is in the Disabled state 2310, the Inactive/Ack'd state 2312 or Inactive/Unack'd state 2314. Otherwise CUALM is the word/value associated with the configured Alarm Type. A DESC "description" field has an alarm description that is generated when the Alarm Attribute changes state. The DESC field is initialized to the empty string. A LAALM "latched alarm" field is "OK" when the Alarm Attribute is in the Disabled state 2310 or the Inactive/Ack'd state 2312. Otherwise the LAALM field is the word/value associated with the configured Alarm Type. The LAALM field presents "latched" alarm activations, enabling Acknowledgment even if the duration of being Active is very short. A NALM "unacknowledged alarm" field indicates the Acknowledged/Unacknowledged condition of the Alarm Attribute. The NALM field is used to determine when alarm summary entries can be removed. An ENAB "alarm enabled" field indicates the current Enabled condition for the Alarm Attribute. An IENAB "alarm initially enabled" field indicates the configured Enabled condition for the Alarm Attribute. An INV "inverted input" field indicates whether the value of an associated boolean Attribute is inverted before alarm processing. The INV configurable characteristic permits an Alarm Attribute reference normally TRUE boolean Attributes, for example an Attribute holding a discrete input. A PRI "alarm priority" field indicates current priority (High/Medium/Low) of an Alarm Attribute. TABLE II shows the boolean Attributes as follows:

dition having precedence over the Acknowledged condition, the Alarm Priority in order of High then Medium then Low precedence, and the Time of Detection with the newest timestamp gaining precedence.

Alarm Consolidation is available at the SP88 Module level and the Plant Area level. Alarm consolidation is accessed via a pre-defined Attribute name "ALARMS" available on SP88 Modules (Control & Equipment) and Plant Areas. ALARMS is an indexed Attribute, where the index selects the Nth highest priority alarm in the consolidation (e.g. ALARMS[1] accesses the highest priority Alarm, ALARMS[2] accesses the second highest priority Alarm, etc.) Thus, for example, 'AREA1/FIC101/ALARMS[1]' references the highest priority Alarm in Module FIC101 and 'AREA1/ALARMS[2]' references the second highest priority Alarm in Plant Area AREA1. The maximum index supported on the ALARMS Attribute is 5.

The Fields supported on the ALARMS[N] Attribute include the LAALM "latched alarm" field which indicates the Active Or Unacknowledged conditions of the Nth priority Alarm Attribute. The LAALM Field is in the alarm word, or alarm type value, of the Nth priority Alarm Attribute during the ACTIVE/UNACK'D, ACTIVE/ACK'D, or INACTIVE/UNACK'D states. The NALM "unacknowledged alarm" field indicates the Acknowledged/Unacknowledged condition of the Nth priority Alarm Attribute. The PRI "alarm priority" field indicates the con-

TABLE II

Attribute: (user defined boolean Attribute)

| Field Name: | Access/[Privilege] | A_(ASCII): | F_(Float): | B_(Binary): |
|---|---|---|---|---|
| CV (or none) | (same as LAALM) | (same as LAALM) | (same as LAALM) | (same as LAALM) |
| CUALM | Read: [view] Write: N/A Config: N/A | "OK" (alarm word) | 0 (alarm type number[1]) | 0 (alarm type number) |
| DESC | Read: [view] Write: N/A Config: N/A | (description generated at the time of alarm state change) | N/A | N/A |
| ENAB | Read: [view] Write: [alarms] Config: N/A (init to IENAB) | "NO" "YES" | 0.0 1.0 | 0 1 |
| INV | Read: [view] Write: N/A Config: [config] | "NO" "YES" | 0.0 1.0 | 0 1 |
| IENAB | Read: [view] Write: N/A Config: [config] Instance overrideable | "DISABLE" "ENABLE" | 0.0 1.0 | 0 1 |
| LAALM | Read: [view] Write: N/A Config: N/A | "OK" (alarm word) | (alarm type number) | (alarm type number) |
| NALM | Read: [view] Write: [operate] Config: N/A (init FALSE) | "NO" "YES" | 0.0 1.0 | 0 1 |
| PRI | Read: [view] Write: [alarms] Config: [config] Instance overrideable | "LOG" "LOW" "MEDIUM" "HIGH" | 3.0 2.0 1.0 0.0 | 3 2 1 0 |

[1]Compatible with FIX Alarm Types. See Alarm Types Table below.

The process control system 100 consolidates many potential Active Alarm conditions into a short list of "highest priority" alarms. A selection criteria is used to select the highest priority alarms for consolidation. The selection criteria includes analysis, in order of decreasing preference, the Acknowledged condition with the Unacknowledged configured priority (High/Medium/Low) of the Nth priority Alarm Attribute. A TAG "alarm Tag" field returns a fully qualified Attribute reference string (excluding Field) for the Nth priority Alarm Attribute. A MODULE "alarm Module" field indicates the SP88 Module (tag) which has the Nth priority Alarm. The MODULE tag returns a Module reference string which can be used to access the "primary control display" attribute for that Module.

Some Fields are supported on the ALARMS Attribute only at the SP88 Module level. If an index value is applied for these fields, the index value is ignored. The SP88 Module level ALARMS Attribute fields include an ENAB "alarm enabled" field which indicates the current Alarm Enabled condition for the Module. A PRIAD "priority adjustment" field is a number (normally 0) which is added to the current Priority of each Alarm Attribute in the Module when determining the effective Priority of an Alarm. The PRIAD Module-wide adjustment is used to decrease the Alarm Priorities of all the alarms in a Module, permitting diminished Alarm visibility. TABLE III describes the ALARMS Attribute, in detail, as follows:

to 'AREA1/FIC10/ALARMS.ENAB') Disabling Alarms at the Module level overrides, but does not overwrite, individual Alarm's ENAB condition. When Alarms are Enabled at the Module level, Alarm processing determined by the individual Alarm's .ENAB condition is restored.

Each SP88 Module in the system includes a single Enable/Disable condition. When one user changes state, all Alarms in that Module are Enabled/Disabled for all users.

A user having an operate privilege can Acknowledge Alarms. With the operate privilege, a user Acknowledges a single Alarm Attribute by writing FALSE to the .NALM field (e.g. writing FALSE to 'AREA1/FIC101/ HIALM.NALM'). Attempts to write TRUE to the .NALM are ignored. Each Alarm Attribute in the process control system has a single Acknowledge condition. When one user

TABLE III

Attribute: ALARMS[N] (N = 1 . . . 5, 1 is highest priority alarm)

| Field Name: | Access/[Privilege] | A_(ASCII): | F_(Float): | B_(Binary): |
|---|---|---|---|---|
| CV (or none) | (same as LAALM) | (same as LAALM) | (same as LAALM) | (same as LAALM) |
| ENAB | Read: [view]<br>Write: \|alarm\|<br>Config: N/A (init TRUE) | "NO"<br>"YES" | 0.0<br>1.0 | 0<br>1 |
| LAALM | Read: [view]<br>Write: N/A<br>Config: N/A | "OK"<br>(alarm word of Nth alarm) | 0<br>(alarm type number of Nth alarm) | 0<br>(alarm type number of Nth alarm) |
| MODULE | Read: [view]<br>Write: N/A<br>Config: N/A | Module name for Nth alarm attribute. | N/A | N/A |
| NALM | Read: [view]<br>Write: N/A<br>Config: N/A | "NO"<br>"YES" | 0.0<br>1.0 | 0<br>1 |
| PRI | Read: [view]<br>Write: N/A<br>Config: N/A | "LOW"<br>"MEDIUM"<br>"HIGH"<br>(priority of Nth alarm) | 2.0<br>1.0<br>0.0 | 2<br>1<br>0 |
| PRIAD | Read: [view]<br>Write: \|alarm\|<br>Config: N/A (init 0) | "0" . . . "3" | 0.0 . . . 3.0 | 0 . . . 3 |
| TAG | Read: [view]<br>Write: N/A<br>Config: N/A | Full reference path for Nth alarm attribute. | N/A | N/A |

User-Level Alarm Consolidation is achieved using an "Alarm Banner" in the graphical user interface. Alarm consolidation is supported for a "current user". Each user is granted authority over one or more Plant Areas. The "current user" alarm consolidation provides the ability to present the highest priority alarms of the set of Plant Areas currently in the user's span of control. A pre-defined "attribute container" exists, named "THISUSER", which supports the ALARMS[N] Attribute. Users optionally construct displays referencing 'THISUSER/ALARMS[N].field' to allow quick access to the highest priority alarms for the "current user".

A user Enables and Disables Alarms if granted an alarm privilege. With the alarm privilege, a user may Enable or Disable a single Alarm Attribute by writing to the .ENAB field (e.g. writing TRUE to 'AREA1/FIC101/ HIALM.ENAB'. Each Alarm Attribute in the process control system includes a single Enable/Disable condition. When one user changes state, Alarms are Enabled/Disabled for all users. With the alarm privilege, a user may Enable or Disable all alarms in a SP88 Module Alarm by writing to the ENAB field of the ALARMS Attribute (e.g. writing TRUE changes state. Alarms are Acknowledged for all users. With the operate privilege, a user may Acknowledge all alarms in a SP88 Module Alarm by writing FALSE to the .NALM field of the ALARMS Attribute (e.g. writing FALSE to 'AREA1/ FIC101/ALARMS.NALM'), an operation which has substantially the same effect as writing FALSE to the .NALM field of all Alarm Attributes in the Module. Attempts to write TRUE to the .NALM are ignored.

A user having an alarm privilege can change alarm priority. With the alarm privilege, a user may change PRI on a single Alarm Attribute by writing to the .PRI field (e.g. writing 0 to 'AREA1/FIC101/HIALM.PRI' to make it a "HIGH" priority alarm). Since Auto Acknowledgment behavior is determined by Alarm Priority, changing Alarm Priority may cause an Alarm to change acknowledgment status. For example, changing from a priority with AutoAck FALSE to a priority with AutoAck TRUE should cause unacknowledged alarms to be acknowledge. Also, changing from a priority with AutoAck TRUE to a priority with AutoAck FALSE should cause acknowledged alarms to become unacknowledged.

Each Alarm Attribute in the system has a single .PRI condition. When one user changes state, .PRI is changed for all users.

With the alarm privilege, a user may adjust the effective priority for all alarms in a SP88 Module Alarm by writing to the .PRIAD field of the ALARMS Attribute. For example, a user writing 1 to 'AREA1/FIC101/ALARMS.PRIAD' increases the current Alarm Priority value, thereby diminishing the annuciation behavior, by one "step" so that HIGH priority becomes MEDIUM priority, and LOW priority becomes LOG. The user only sets PRIAD to positive numbers and therefore is only used to diminish normal annunciation behavior. Setting PRIAD to 0 reestablishes the "normal" priorities determined per Alarm Attribute. Effective alarm priorities are not adjusted "below" LOG. Since Auto Acknowledgment behavior is determined by Alarm Priority, changing PRIAD at the Module level may cause individual Alarms to change acknowledgment status.

Each SP88 Module in the system has a single .PRIAD value. When one user changes state, all Alarms in that Module are affected for all users.

Alarms are viewed using a display under a standard FIX™ Alarm Summary. The FIX™ graphic and display program, which is marketed by Intellution of Norwood, Mass., is well known in the computing arts. The FIX™ Alarm Summary Link is the primary method to view filtered and sorted lists of Active Alarms. All capabilities of the Journal assigned to a Plant Area. All alarm state transitions shown in FIG. 23 are recorded in the Event Journal, including transitions between the Inactive/Unack'd 2314 and the Active/Unack'd state 2318. Thus an operator viewing the LAALM field in displays or alarm summaries does not see transitions between Active/Inactive states for unacknowledged alarms, these transitions are recorded in the Event Journal.

Event journal entries for alarm state transitions include: (1) a timestamp of the alarm state transition as determined by the device (e.g. controller) detecting the alarm condition, (2) an "alarm" event type which distinguishes from other event journal entries, (3) a user-defined alarm category, (4) a current alarm priority, (5) an alarm word string as configured in the system Alarm Type table, (6) an new alarm state, (7) an attribute reference string or path for the alarmed attribute, and (8) a description string assembled from the description string configured in the Alarm Type table, with the configured (up to two) Attribute values inserted in the string.

A Event Journal browser application presents data in a manner shown in TABLE IV, generally sorted by timestamp and filtered on event type="ALARM" and attribute reference string="FIC101/PID1/HIALM"):

TABLE IV

| DA-MO-YR 10:11:04.4 | ALARM | PROCESS | MEDIUM | HIGH | ACT/UNACK | FIC101/PID1/HIALM | value 96.2 limit 95.0 |
| DA-MO-YR 10:11:18.6 | ALARM | PROCESS | MEDIUM | HIGH | INACT/UNACK | FIC101/PID1/HIALM | value 93.7 limit 95.0 |
| DA-MO-YR 10:13:45.6 | ALARM | PROCESS | MEDIUM | HIGH | DISABLED | FIC101/PID1/HIALM | value 93.1 limit 95.0 |
| DA-MO-YR 10:22:00.1 | ALARM | PROCESS | MEDIUM | HIGH | ACT/UNACK | FIC101/PID1/HIALM | value 95.8 limit 95.0 |
| DA-MO-YR 10:22:20.9 | ALARM | PROCESS | MEDIUM | HIGH | ACT/ACK | FIC101/PID1/HIALM | value 95.9 limit 95.0 |
| DA-MO-YR 10:27:59.4 | ALARM | PROCESS | MEDIUM | HIGH | CLEAR | FIC101/PID1/HIALM | value 94.0 limit 95.0 |

Alarm Summary Link are supported, with the following exceptions or extensions. First, a "Tagname" column shows the process control system Attribute reference path, excluding the Field name, for the Alarm Attribute (e.g. 'AREA1/

Alarm state transitions events in the Event Journal are distinct from operator change journal entries, although operator changes cause corresponding alarm state changes. For example, as shown in TABLE V as follows:

TABLE V

| DA-MO-YR 10:13:45.9 | CHANGE | CJONES | A FIC101/PID1/HIALM.ENAB | new value = FALSE |
| DA-MO-YR 10:22:00.1 | CHANGE | CJONES | A FIC101/PID1/HIALM.ENAB | new value = TRUE |
| DA-MO-YR 10:22:21.3 | CHANGE | CJONES | A FIC101/PID1/HIALM.NALM | ALARM/ACK |
| DA-MO-YR 15:28:59.4 | CHANGE | BSMITH | A FIC101.ENAB | new value = FALSE |

FIC101/HIALRM'). Second, a "Description" contains a user-configured string that is constructed at the time the Alarm is detected so that an Alarm captures the value of up to two Attributes at the point the Alarm was first detected. Only one "Alarm" per "Tag" is possible so that multiple Alarms may be shown for each SP88 Module in the Alarm Summary. Third, a "Time Last" entry contains the time of the last state transition for the Active Alarm, which could be the time of acknowledgement, or the time of the last transition between Active/Inactive for an unacknowledged alarm. Fourth, a "Node" column entry, which shows FIX SCADA Node source for the Alarm, is meaningless for process control system Alarms so that a by Area Filter and Sort feature are lost. Fifth, all Alarms are mapped into one of the FIX Alarm types to achieve foreground color based on the Alarm Type.

A user can access an Alarm State Transition Journaling record. Alarm state transitions are recorded in the Event The Alarm Attributes are configured, thereby setting the Alarm behavior and presentation, using the described sequence of operations. First, an "Alarm Types" Table and an "Alarm Annunciation" Table are configured. Second, in an optional step, the user-defined alarm conditions are configured, setting the boolean Attributes. Third, Alarm Attributes are created to reference the boolean Attributes, thereby identifying the System "Alarm Type", priority, and the like. Fourth, Module "instances" are created based on Module Definitions that contain Alarms. Fifth, a presentation of Alarm information is inserted into displays (pictures) via database links, dynamic color links, and Alarm Summary links. Sixth, the "Alarm Types" and "Alarm Annunciation" Tables are configured.

The "Alarm Type" table has several functions, including (1) acting as a system (Site) wide common resource which defines a common Alarm presentation behavior to speed the Alarm configuration process for each Alarm, (2) encouraging standard alarm messaging in Summaries and History Journals to improve query and analysis that information, (3) mapping alarms into FIX Alarm States.

The "Alarm Types" Table contains columns including an Alarm Type, an Alarm Word, a category and a description string column. The Alarm Type column contains a brief description of the Alarm Type, which is used to select the appropriate Type when creating an Alarm Attribute. The Alarm Word column includes a string that is returned when reading the A_CUALM or A_LAALM Fields when the Alarm is Active. The category column describes a user defined word recorded in the Event Journal used to help filter/sort queries. The description string appears in the Alarm Summary Link and contains up to two place holders for Attribute value substitution at Alarm Detection time.

The "Alarm Types" Table default content is shown in TABLE VI as follows:

the scope of the current user, at a Workstation without a sound card. A value of 0 indicates that the PC speaker should not be used for alarms with this priority If a .WAV file and a non 0 speaker frequency are specified for the same alarm priority, the PC speaker is used only if no sound card is present.

The "Alarm Annunciation" Table default content is shown in TABLE VII as follows:

TABLE VII

| Alarm Priority | Automatic Ack | .WAV File | PC Speaker Freq. |
| --- | --- | --- | --- |
| HIGH | NO | ALRMHIGH.WAV | ? |
| MEDIUM | NO | ALRMMED.WAV | ? |
| LOW | YES | ALRMLOW.WAV | ? |
| LOG | YES | | 0 |

TABLE VI

| Alarm Type | Alarm Word | Category | Description String | Summ Status[2] # |
| --- | --- | --- | --- | --- |
| Communication Error | COMM | INSTRUMENT | Communication Error | 197 |
| Open Circut Detected | OCD | INSTRUMENT | Open Circuit Detected | 193 |
| General I/O Failure | IOF | INSTRUMENT | General I/O Error | 192 |
| Floating Point Error | FLT | SYSTEM | Floating Point Error | 137 |
| Over Range | OVER | INSTRUMENT | Over Range Value % P1 | 67 |
| Under Range | UNDER | INSTRUMENT | Under Range Value % P1 | 66 |
| Statistical Alarm | ERROR | SYSTEM | Statistical Alarm Type % P1 Value % P2 | 12 |
| New Alarm | NEW | SYSTEM | New Alarm Value % P1 | 14 |
| Any Alarm | ANY | SYSTEM | Any Alarm Value % P1 | 13 |
| Change From Normal | CFN | PROCESS | Change From Normal Value % P1 | 7 |
| Change of State | COS | PROCESS | Change of State | 6 |
| High High Alarm | HIHI | PROCESS | High High Alarm Value % P1 Limit % P2 | 4 |
| Low Low Alarm | LOLO | PROCESS | Low Low Alarm Value % P1 Limit % P2 | 1 |
| Rate of Change | RATE | PROCESS | Rate of Change Rate % P1 Limit % P2 | 5 |
| High Alarm | HIGH | PROCESS | High Alarm Value % P1 Limit % P2 | 3 |
| Low Alarm | LOW | PROCESS | Low Alarm Value % P1 Limit % P2 | 2 |
| Deviation Alarm | DEV | PROCESS | Deviation Alarm Target % P1 Actual % P2 | 8 |
| Normal State | OK | | Normal State | 0 |
| (user defined) | (user defined) | | (user defined) | N/A |

[2]Probably no reason for this to be configured, or even visible to the user.

Standard alarm types match the alarms types supported in FIX™.

The "Alarm Annunciation" table is a system (Site) wide common resource which furnishes a common definition of Alarm annunciation behavior to speed the Alarm configuration process for each Alarm.

The "Alarm Types" Table contains the columns including an Alarm Priority, an Auto Acknowledgement, a WAV file and a PC speaker frequency column. The Alarm Priority designates the Alarm priority word (HIGH/MEDIUM/LOW/LOG). The Auto Acknowledgment column contains a YES/NO value indicating if alarms of this priority should be automatically acknowledged when detected and providing an opportunity to make less important alarms less "distracting". The WAV file contains a filename of a NT compatible .WAV file which is played (looping) when an Alarm is detected (within the scope of the current user) at a Workstation with a sound card. Omitting this file name indicates that no .WAV file should be played for alarms with this priority. The PC Speaker frequency sets a value used to play a tone on the PC speaker when an Alarm is detected, within A user attaches Alarm (behavior) to boolean Attributes by creating Alarm Attributes according to the SP88 Module Definition which reference another boolean Attribute in the same Module.

A user create an Alarm Attribute by entering: (1) a target Attribute by path or by drag-and-drop, for example, (2) a boolean Attribute defining the alarm condition, (3) an Alarm Type selected from the system-wide list of Alarm Types, (4) an Alarm Priority (High/Medium/Low/Log), (5) an Initial Alarm Enable condition (YES/NO), (6) an Invert Input (YES/NO), (7) an optional Name of Attribute having a value to be substituted for %P1, (8) an optional Name of Attribute having a value to be substituted for %P2.

Items 7 & 8, the Attribute names, are restricted to Attributes in the same SP88 Module and are specified as "module relative" attribute references (e.g. "SP" and "PID1/PV" rather than "FIC101/SP" or "FIC101/PID1/PV".

The user also creates Module "instances" based on Module Definitions that contain Alarms. When a Module instance is created, all Alarm behavior specified in the Module Definition applies to the Module instance. The .PRI and .ENAB fields may be overridden on Alarm'd Attributes when the Module instance is created. For example. if for an Alarm Attribute named 'HIGHLIMITED', PRI is MEDIUM when the Module Definition is constructed, then when the Module instance is created, 'HIGHLIMITED.PRI' may be overridden to be LOW for this instance.

Alarm are supported for Device/Subsystem Attributes in Controllers. Attributes are defined for devices and device subsystems to provide access to information about the operation of the control system and connections to other systems. The Attributes are accessible via diagnostic tools and via pre-defined or user-defined displays. It is valuable for some of these Attributes, especially "consolidation" Attributes, to participate in the Alarm system to draw attention to abnormal conditions in the control system.

Users create Control Modules (instances) to implement a desired "Device Alarm" strategy for Controllers and Subsystems, including processor, communications, I/O, redundancy, and the like.

Using Function Block algorithms, the Device/Subsystem Attributes are accessed most efficiently in the same device, but also supported for other Controllers and Workstations. Device and Subsystem Attributes are used as inputs to Function Blocks, which then can be configured to applying alarm limits on these Attributes, converting these values to boolean Attributes. AlarmAttributes then reference the boolean Attributes. In general, the full algorithm definition capability of the Function Block system is used to build simple or complex Device Alarming schemes.

A number of the pre-defined Alarm Types, which are consistent with FIX™ alarm types, are suitable for distinguishing "Device Alarm" presentation and behavior. Predefined Control Module Definitions are supplied providing fairly comprehensive Device Alarm "modules" for Controllers, and each type of I/O system. Users optionally disable or extend these standard modules.

Users may elect several strategies for placing Device Alarm modules in Plant Areas including a small-system strategy, a "segregation" strategy and a "partitioned responsibility" strategy, for example. In the small system an "all in one" strategy is imposed in which the Plant Area concept is not applied. One or more Device Alarm Modules in each Controller form an integrated presentation of Device and SP88 Module alarms. In the segregation strategy a separate Plant Area is designated which has all Device Alarm modules from all Controllers. The segregation strategy enables Area filtering/sorting on Alarm summaries, allowing Operators to focus on SP88 Module Alarms and Process/Maintenance Engineers to focus on Device Alarms. The partitioned responsibility strategy is used when the system becomes large enough to control scope of responsibility by Plant Area. Device Alarm Modules are placed in the same Plant Area as the SP88 modules impacted by the Device Alarm Modules. The partitioned responsibility strategy forms an integrated presentation of Device and SP88 Module alarms for Plant Areas within scope of responsibility.

Alarms are supported for Device/Subsystem Attributes in Workstations. User-initiated applications such as Draw, View, engineering tools, and the like individually present information about abnormal conditions or errors encountered, in the appropriate context. Workstation Services which are activated on a workstation before a user logs on and continue to run through log-off/log-on cycles) implement a technique for drawing attention to problems, even for an unattended Workstation. In one embodiment, Workstation Services are monitored by Device Alarm Modules executing in one or more Controllers. The Services construct a set of status and integrity Attributes, which are accessed by Controller(s) running instances of Device Alarm Modules which control the user-defined Device Alarming strategy. Predefined Control Module Definitions are supplied providing fairly comprehensive Device Alarm "modules" for Workstations, and each major Service (e.g. communications, history journal, etc.) Users may disable or extend these standard modules.

In one embodiment of the process control system, event conditions that are not afforded "Alarm" status are given a priority of "LOG". LOG Alarms are not consolidated in ALARMS Attributes, do not appear in the Alarm Summary, do not provide audible annunciation of state changes, and appear in Event Journals as type "EVENT" rather than type "ALARM". In other respects a LOG priority Alarm operates as HIGH/MEDIUM/LOW priority Alarm so that an event (1) is enabled/disabled individually, (2) is disabled at the Module level with other alarms, (3) individual Alarms can be "turned into Events" by changing their priority to "LOG" (writing 3 to .PRI).

By setting .PRIAD at the Module level, one or more levels of Alarms can be converted to Events (e.g. writing 2 to PRIAD drops all Alarm priorities in the Module by 2 steps; HIGH priority becomes LOW, MEDIUM and LOW priority become LOG, LOG remains LOG). Setting .PRIAD to 3 forces all Alarms in the Module to become "Events". CUALM, LAALM, NALM field supported to display current status (even blinking if unacked).

LOG events also (4) may invert the input boolean, to reverse the sense of the OK event condition for usage to log changes in state of Discrete Inputs, (5) may add user defined "alarm words" to the Alarm Types table to give event conditions useful names, (6) record all state changes for a LOG priority alarm in the Event Journal.

User selectable "intensities" of system event detection (e.g. "debug intensity", "normal intesity", "shutdown intensity") are configured in Control Module algorithms based on the setting of a user defined "intensity" Attribute. System Events are thus aligned with one (or perhaps more) Plant Areas, and so enabling the Event Journal on a Workstation for one or more Plant Areas automatically sets the destination for all "System Event" records.

A user changing an Attribute or invoking a method on a System Object is considered an event and is recorded in the appropriate Event Journal. Changes to control hierarchy (Control Module, Equipment Module, Plant Area, etc.) Attributes are recorded in the Event Journal(s) designated for that Plant Area. Changes to Device/Subsystem Attributes are recorded in the Event Journal(s) for the "primary Plant Area" designated for that Device.

Figure 24:
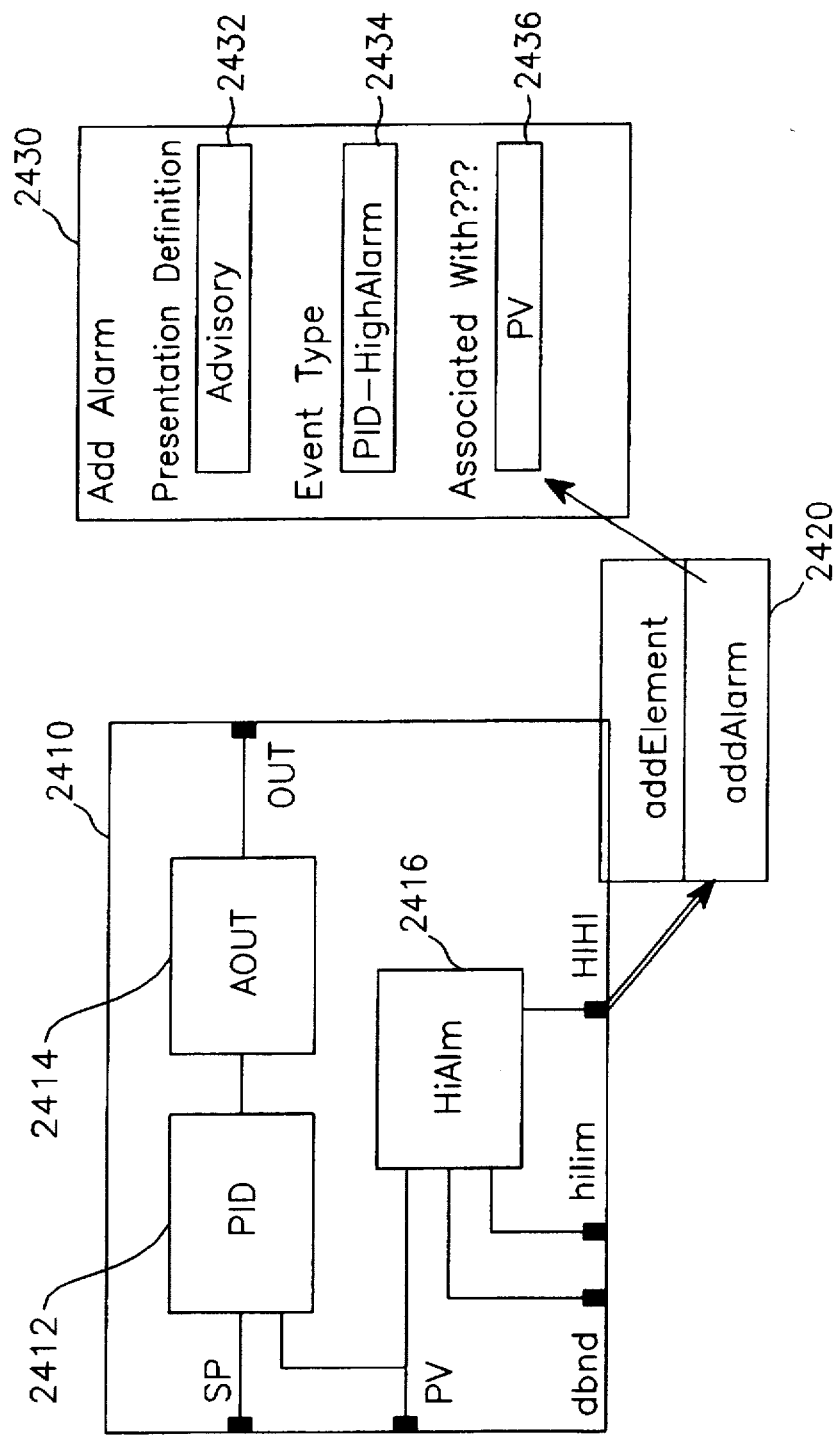
FIG. 24 is a context diagram showing a context for defining an alarm event with respect to a control module.

Referring to FIG. 24, a context diagram shows a context for defining an alarm event with respect to a control module. An Alarm appears in a "Plant Area scope" active alarm list presentation. A composite module (CM) instance 2410 includes a PID function block 2412, an output attribute 2414 and a high alarm attribute 2416. A user, such as a configuration engineer, selects the composite module 2410 for editing and selects "add alarm" 2420 on Attribute "HIHI". The user also selects the event priority definition named "Advisory" 2432 and the event type definition named "HIALARM" 2434. The user then saves the changes to the control module 2410.

Referring again to FIG. 22, alarm and event management is described. Alarms and user-defined "events" which are configured as LOG priority Alarms introduce multiple behaviors into the process control system.

A special kind of RtAttribute, hereafter called RtAlarmAttribute 2234, has a distinct "data type" supporting Alarm specific fields such as CUALM, NALM, and the like which may be read and written. Read access to the fields allows presentation of the state of individual Alarms. Write access to selected fields gives an ability to Acknowledge Alarms, and change certain alarm behaviors.

Several characteristics of Alarm behavior, such as Disabled and AUTOACK behavior, may be overridden on-line at the SP88 Module level. Reverting to the individual Alarm conditions of Enabled/Disabled and NoAutoAck/AutoAck occurs when the Module level overrides are removed. The changing of Module level overrides should "immediately" impact individual Alarm states. Thus changes on the Module level override force re-evaluation of all Alarm states within the module under the new conditions.

Active alarms are consolidated at the Module (RtModule 2230), Plant Area (RtPlantArea 2210), and User Session so that the "highest priority alarms" at each of the levels may be presented. This consolidation is accessed through the ALARMS[] Attribute supported by Module, Plant Area and User Session objects.

FIX™ Alarm Summary Links are used in FIX™ pictures (displays) to present a list of "current" alarms. The content for the Alarm Summary Link is maintained by the ALMSUM.EXE process (which shuts down when FIX™ shuts down, and FIX™ shuts down whenever an NT user logs off[3], and NT users log off to allow a new user to "log in".) Thus the system must both "prime" the ALMSUM process with all current alarms (subject to current user responsibility scope) to get it started when an new user logs-on, and it must feed the ALMSUM process information about new alarm occurrences, and alarm acknowledgments so a up-to-date summary can be presented.

[3]ALMSUM.EXE is a NT process in FIX for NT beta 5.5. Intellution has indicated that it would become an NT service in release 5.5. This would reduce the frequency of needing to "re-prime" the FIX Alarm Summary, but we'd still need the ability to do it when the workstation device came on line.

All alarm state transitions are directed to the appropriate Event Journal(s) (RtEventJournal 2220) for the Plant Area which "contains" the RtAlarmAttribute 2234. Multiple Event Journal targets are supported, so that a complete Event Journal can be reconstructed if one workstation running one of the Event Journals is off line for a period of time.

Audible annunciation of Alarm entry state transitions executes on workstations doing Alarm Summarization (feeding the FIX ALMSUM.EXE process). Audible annunciation may consist of a continuous tone (user configured frequency) on the PC speaker, and/or a continuous (looping) .WAV file played on a compatible sound card installed in the PC. A program is executed to turn off both the speaker and the sound card, thus the sound may be turned off by any FIX™ (view button or keyboard) script, or an ICON in the program Group if FIX VIEW is not running.

Figure 25:
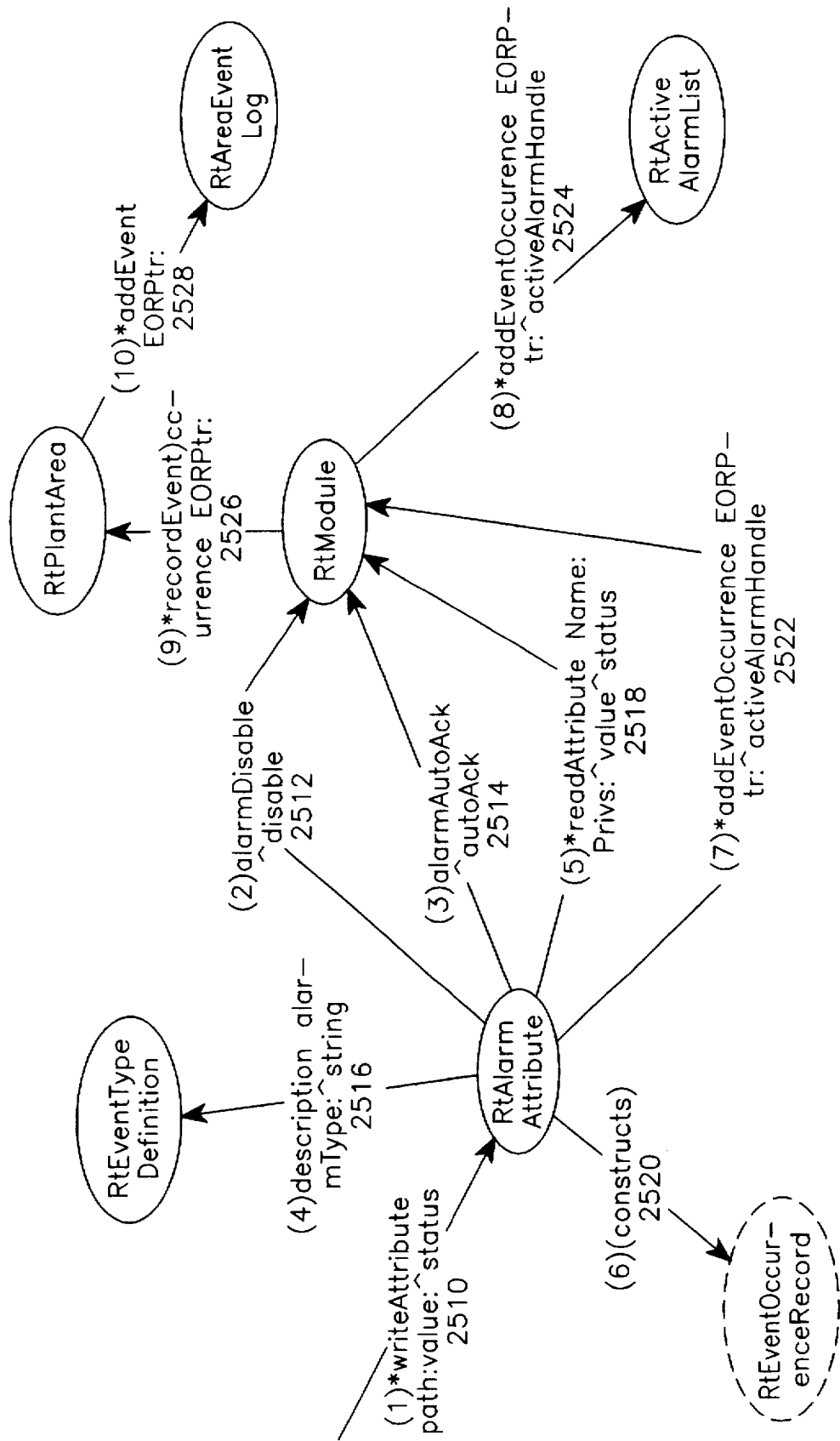
FIG. 25 is an object communication diagram illustrating a method for performing an attribute write operation that evokes an "in alarm" status.

Referring to FIG. 25, an object communication diagram illustrates a method for performing an attribute write operation that evokes an "in alarm" status.

Previous to the attribute write operation, a RtAlarmAttribute has been configured and installed, alarms are ENABLED at both the Attribute and the Module level, alarm AUTOACK is false at both the Attribute and the Module level, and the current Alarm state is "Inactive/Acknowledged".

The "write Attribute" method causes the state of an Alarm Attribute to go into the alarm state. The alarm fields of the Alarm Attribute are updated to reflect the new Alarm state. An event occurrence record is constructed, and sent to the Module, Plant Area, and workstation applications (Alarm Summary, Event Journal), as needed.

When the at tribute write operation is complete, the current Alarm state is "Active/Unacknowledged", the active alarm has been recorded by the Module, the event occurrence record has been constructed, and has been queued for transmission to devices monitoring this Plant Area in this Device.

In a step 2510 of the write attribute method, RtAlarmAttribute receives a writeAttribute, which causes a state transition in the boolean Attribute to enter the alarm state. In step 2512, RtAlarmAttribute gets alarmDisable status from the RtModule containing RtAlarmAttribute so that both Attribute and Module Alarm behavior are ENABLED. In step 2514, RtAlarmAttribute gets alarmAutoack status from the RtModule containing RtAlarmAttribute so that for both Attribute and Module Alarm AUTOACK is DISABLED. In step 2516, RtAlarmAttribute computes a new alarm state, the "Active/Unacknowledged" state and reads the prototype event descriptor string from RtEventTypeDefinition using AlarmType as an index. In step 2518, RtAlarmAttribute constructs the descriptionString for the RtEventOccurenceRecord, reading current attribute values from the containing RtModule, if necessary. In step 2520, RtAlarmAttribute constructs a new RtEventOccurenceRecord. Since a new alarm is created, RtAlarmAttribute tells its containing RtModule to addEventOccurrence in step 2522. In step 2524, RtModule tells its RtActiveAlarmList to addEventOccurrence, adding a new entry to the list and returning a handle by which the entry can be accessed in the future. This handle is ultimately stored by RtAlarmAttribute. In step 2526, RtModule sends the RtEventOccurenceRecord to the RtPlantArea of RtModule via recordEventOccurrence. In step 2528, RtPlantArea tells its RtAreaEventLog to addEvent. RtAreaEventLog sees that at least one workstation client has registered an interest in receiving EventLog records, creates an RtEventLogRecord from the RtEventOccurenceRecord, and queues the RtEventLogRecord, thereby destroying the RtEventOccurenceRecord.

Also referring to FIG. 25, the object communication diagram is also applicable to Acknowledgement of an Alarm, causing the current alarm state to go to "Active/ Acknowledged". The new alarm state for the existing alarm is recorded by the Module, a new event occurrence record is constructed, and is been queued for transmission to devices monitoring this Plant Area in this Device. The method includes application of the "write Attribute" method (writing FALSE to the NALM Field) to cause the state of an Alarm Attribute to be acknowledged. Alarm fields of the Alarm Attribute are updated to reflect the new Alarm state. An event occurrence record is constructed, and sent to the Module, Plant Area, and workstation applications (Alarm Summary, Event Journal) as needed.

In step 2510, RtAlarmAttribute receives a writeAttribute, causing the NALM Field to change state to FALSE. In step 2512, RtAlarmAttribute gets alarmDisable status from the RtModule containing RtAlarmAttribute so that both Attribute and Module Alarm behavior are ENABLED. In step 2516, RtAlarmAttribute computes a new alarm state, the "Active/Unacknowledged" state and reads the prototype event descriptor string from RtEventTypeDefinition using AlarmType as an index. In step 2518, RtAlarmAttribute constructs the descriptionString for the RtEventOccurenceRecord, reading current attribute values from the containing RtModule, if necessary. In step 2520, RtAlarmAttribute constructs a new RtEventOccurenceRecord. Since an existing alarm is updated, RtAlarmAttribute tells the RtModule containing RtAlarmAttribute to updateEventOccurrence, identifying RtModule by the handle returned when from updateEventOccurrence in step 2522. In step 2524, RtModule tells RtActiveAlarmList to updateEventOccurrence, thereby updating the existing entry in the list. In step 2526, RtModule sends the RtEventOccurenceRecord to the RtPlantArea of RtModule via recordEventOccurrence. In step 2528, RtPlantArea tells its RtAreaEventLog to addEvent. RtAreaEventLog sees that at least one workstation client has registered an interest in receiving EventLog records, creates an RtEventLogRecord from the RtEventOccurenceRecord, and queues the RtEventLogRecord, thereby destroying the RtEventOccurenceRecord.

Also referring to FIG. 25, the object communication diagram is also applicable to acknowledgement of clearing of an alarm condition, in which the "write Attribute" method causes the state of an Alarm Attribute to go out of the alarm state. The alarm fields of the Alarm Attribute are updated to reflect the new Alarm state and an event occurrence record is constructed and sent to the Module, Plant Area, and workstation applications (Alarm Summary, Event Journal) as needed. When the write Attribute method is complete, the current Alarm state is "Inactive/Acknowledged". The current alarm information for this alarm has been removed by the Module. A new event occurrence record has been constructed and queued for transmission to devices monitoring this Plant Area in this Device.

In step 2510, RtAlarmAttribute receives a writeAttribute, which causes a state transition in the boolean Attribute to go out of the alarm state. In step 2512, RtAlarmAttribute gets alarmDisable status from the RtModule containing RtAlarmAttribute so that both Attribute and Module Alarm behavior are ENABLED. In step 2516, RtAlarmAttribute computes a new alarm state, the "Active/Unacknowledged" state and reads the prototype event descriptor string from RtEventTypeDefinition using AlarmType as an index. In step 2518, RtAlarmAttribute constructs the descriptionString for the RtEventOccurenceRecord, reading current attribute values from the containing RtModule, if necessary. In step 2520, RtAlarmAttribute constructs a new RtEventOccurenceRecord. Since an existing alarm is cleared, RtAlarmAttribute tells the RtModule containing RtAlarmAttribute to updateEventOccurrence, identifying RtModule by the handle returned when from updateEventOccurrence. In step 2522, RtModule tells RtActiveAlarmList to updateEventOccurrence, thereby updating the existing entry in the list. In step 2526, RtModule sends the RtEventOccurenceRecord to the RtPlantArea of RtModule via recordEventOccurrence. In step 2528, RtPlantArea tells its RtAreaEventLog to addEvent. RtAreaEventLog sees that at least one workstation client has registered an interest in receiving EventLog records, creates an RtEventLogRecord from the RtEventOccurenceRecord, and queues the RtEventLogRecord, thereby destroying the RtEventOccurenceRecord.

Also referring to FIG. 25, the object communication diagram is also applicable to disablement of an alarm by causing the ENAB Field of an Alarm Attribute to become FALSE. The alarm fields of the Alarm Attribute are updated to reflect the new Alarm state and an event occurrence record is constructed, and sent to the Module, Plant Area, and workstation applications (Alarm Summary, Event Journal), as needed. Following the disablement of an alarm, the current Alarm state is "Inactive/Acknowledged" and the ENAB field is FALSE. The current alarm information for this alarm has been removed by the Module. A new event occurrence record (alarm DISABLE) has been constructed and is queued for transmission to devices monitoring this Plant Area in this Device.

In step 2510, RtAlarmAttribute receives a writeAttribute, which causes the ENAB Field to become FALSE. In step 2516, RtAlarmAttribute computes a new alarm state, the "Active/Unacknowledged" state and reads the prototype event descriptor string from RtEventTypeDefinition using AlarmType as an index. In step 2518, RtAlarmAttribute constructs the descriptionString for the RtEventOccurenceRecord, reading current attribute values from the containing RtModule, if necessary. In step 2520, RtAlarmAttribute constructs a new RtEventOccurenceRecord, identifying this event as an alarm disable event. Since the alarm is disabled when previously active, this event is the clearing of an existing alarm. RtAlarmAttribute tells the RtModule containing RtAlarmAttribute to clearEventOccurrence, identifying RtModule by the handle returned when from clearEventOccurrence. In step 2522, RtModule tells RtActiveAlarmList to clearEventOccurrence, thereby removing the existing entry from the list. In step 2526, RtModule sends the RtEventOccurenceRecord to the RtPlantArea of RtModule via recordEventOccurrence. In step 2528, RtPlantArea tells its RtAreaEventLog to addEvent. RtAreaEventLog sees that at least one workstation client has registered an interest in receiving EventLog records, creates an RtEventLogRecord from the RtEventOccurenceRecord, and queues the RtEventLogRecord, thereby destroying the RtEventOccurenceRecord.

Also referring to FIG. 25, the object communication diagram is also applicable to enablement of an alarm by causing the ENAB Field of an Alarm Attribute to become TRUE. Prior to enablement of an alarm, the current state of the boolean Attribute shows the alarm would be Active if Enabled. AutoAck is False at the Attribute and Module level. The alarm fields of the Alarm Attribute are updated to reflect the new Alarm state and an event occurrence record is constructed, and sent to the Module, Plant Area, and workstation applications (Alarm Summary, Event Journal), as needed. Following the disablement of an alarm, the current Alarm state is "Active/Unacknowledged" and the ENAB field is TRUE. The current alarm information for this alarm is stored by the Module. A new event occurrence record (alarm Active/Unacknowledged) has been constructed and is queued for transmission to devices monitoring this Plant Area in this Device.

In step 2510, RtAlarmAttribute receives a writeAttribute, which causes the ENAB Field to become TRUE. In step 2512, RtAlarmAttribute gets alarmDisable status from the RtModule containing RtAlarmAttribute so that both Attribute and Module Alarm behavior are ENABLED. In step 2514, RtAlarmAttribute gets alarmAutoack status from the RtModule containing RtAlarmAttribute so that for both Attribute and Module Alarm AUTOACK is DISABLED. In step 2516, RtAlarmAttribute computes a new alarm state, the "Active/Unacknowledged" state and reads the prototype event descriptor string from RtEventTypeDefinition using AlarmType as an index. In step 2518, RtAlarmAttribute constructs the descriptionString for the RtEventOccurenceRecord, reading current attribute values from the containing RtModule, if necessary. In step 2520, RtAlarmAttribute constructs a new RtEventOccurenceRecord. Since the alarm is new, RtAlarmAttribute tells the RtModule containing RtAlarmAttribute to addEventOccurrence, identifying RtModule by the handle returned when from addEventOccurrence. In step 2522, RtModule tells RtActiveAlarmList to addEventOccurrence, thereby adding a new entry to the list. In step 2526, RtModule sends the RtEventOccurenceRecord to the RtPlantArea of RtModule via recordEventOccurrence. In step 2528, RtPlantArea tells its RtAreaEventLog to addEvent, RtAreaEventLog sees that at least one workstation client has registered an interest in receiving EventLog records, creates an RtEventLogRecord from the RtEventOccurenceRecord, and queues the RtEventLogRecord, thereby destroying the RtEventOccurenceRecord.

While the invention has been described with reference to various embodiments, it will be understood that these embodiments are illustrative and that the scope of the invention is not limited to them. Many variations, modifications, additions and improvements of the embodiments described are possible.

What is claimed is:

1. A process control system comprising:
    a field device including a source of event condition information;
    a controller coupled to the field device;
    a workstation coupled to the controller and including a user interface; and
    a software system implementing an event condition monitoring and display program for the process control system, the event condition monitoring and display program including:
        a plurality of control modules including event attributes, the control modules being selectively controlled and selectively distributed among the field device, the controller and the workstation, the control modules operating mutually independently and in parallel accumulating event condition information;
        a display routine for accessing the event condition information from the plurality of control modules and displaying the event condition information accessed from the plurality of control modules in an order of priority selected by a user; and
        a configuration routine for user-selectively defining and creating the control modules and the event attributes of the control modules, and for user selectively distributing the control modules among the field device, the controller, and the workstation.

2. A process control system according to claim 1, wherein: the event conditions are alarm conditions.

3. A process control system according to claim 1, wherein the event conditions are consolidated at a plant area level.

4. A process control system according to claim 1 wherein the event conditions are consolidated at a module level.

5. A process control system according to claim 1 wherein the event conditions are consolidated at a user level.

6. A process control system according to claim 1, wherein the software system further comprises:
    a routine for priming the event attributes with a current alarm set subject to a current user responsibility scope to begin accumulating an event count when a new user logs-on.

7. A computer program product comprising:
    a computer usable medium having computable readable code embodied therein including a process control system including a field device including a source of event condition information, a controller coupled to the field device, and computer coupled to the controller and including a user interface, the computer program product including an event condition monitoring and display program for the process control system, the event condition monitoring and display program including:
        a plurality of control modules including event attributes, the plurality of control modules being selectively controlled and selectively distributed among the field device, the controller and the workstation, the control modules operating mutually independently and in parallel accumulating event condition information;
        a display routine for accessing the event condition information from the plurality of control modules and displaying the event condition information accessed from the plurality of control modules in an order of priority selected by the user; and
        a configuration routine for user-selectively defining and creating the control modules and the event attributes of the control modules and for user selectively distributing the control modules among the field device the controller, and the workstation.

8. A computer program product according to claim 7 wherein: the event conditions are alarm conditions.

9. A computer program product according to claim 7 wherein the event conditions are consolidated at a plant area level.

10. A computer program product according to claim 7 wherein the event conditions are consolidated at a module level.

11. A computer program product according to claim 7 wherein the event conditions are consolidated at a user level.

12. A computer program product according to claim 7 further comprising:
    a routine for priming the event attributes with a current alarm set subject to a current user responsibility scope to begin accumulating an event count when a new user logs-on.

13. An article of manufacture encoding the computer program product according to claim 7.

14. A method for operating a process control system comprising the steps of:
    defining a plurality of conditions as events, the events being associated with a plant area;
    activating an event journal for logging event conditions;
    configuring an alarm behavior including the steps of:
        creating an alarm attribute, the alarm attribute being selectively created in a control module or in an equipment module;
        selectively disabling or enabling the created alarm attribute;
        selectively placing an enabled alarm attribute in an acknowledged state or an unacknowledged state; and
        selectively placing the alarm attribute in an active state or an inactive state;
    selecting a priority for the alarm attribute; and consolidating a plurality of active alarm conditions into a subset of highest priority alarms.

15. A method according to claim 14, further comprising the step of:
    transitioning between a plurality of alarm attribute states, including the steps of:
        selectively disabling or enabling an alarm attribute, the alarm attribute being in an "Inactive and Acknowledged" condition when the alarm attribute is disabled;
        configuring the alarm attribute with a boolean attribute so that an alarm is active when the boolean attribute is true and the alarm is inactive when the boolean attribute is true;
        optionally inverting the sense of the boolean attribute with an invert attribute; and when the alarm attribute is enabled, selectively acknowledging the alarm attribute or unacknowledging the alarm attribute.

16. A method according to claim 15, further comprising the step of:
selectively automatically acknowledging an alarm attribute or not automatically acknowledging the alarm attribute based on priority of current alarms.

17. A method according to claim 15, further comprising the step of:
recording transitions of the alarm event state in an event journal for logging event conditions.

18. A method according to claim 14, wherein the step of consolidating a plurality of active alarm conditions includes the steps of:
ranking an alarm condition in an order of decreasing order of precedence based on an ordered priority including:
first ranking an unacknowledged condition with precedence over an acknowledged condition;
second ranking a condition in order of high selected priority, medium selected priority, then low selected priority; and
third ranking a condition in order of time of detection with a newest timestamp condition having a precedence over an older timestamp condition.

19. A method according to claim 14, wherein the step of consolidating a plurality of active alarm conditions includes the step of:
user-level consolidation including the steps of:
displaying an alarm banner in a graphical user interface;
granting alarm privilege over a one or more plant areas to a user;
predefining an attribute container supporting an alarms attribute;
constructing a display referencing the attribute container; and
allowing access to highest priority alarms based on the display referencing the attribute container.

20. A method according to claim 14, wherein:
the conditions defined as events are conditions selected from among the conditions of:
alarms;
alarm acknowledgments;
user changes including attributes written by the user, methods invoked by the user, and log-in and log-out operations by the user;
configuration changes to a run time system including system installation and de-installation operations;
Sequential Function Chart (SFC) state changes;
Operator Attention Requests (OARs); and
miscellaneous events including non-alarm state transitions and equipment state changes.

21. A computer program product comprising:
a computer usable medium having computable readable code embodied therein encoding the method according to claim 14.

22. An article of manufacture storing the computer program product according to claim 21.

23. A computer program product comprising:
a computer usable medium having computable readable code embodied therein including a process control system further including:
a routine for defining a plurality of conditions as events, the events being associated with a plant area;
a routine for activating an event journal for logging event conditions;
a routine for configuring an alarm behavior including:
a routine for creating an alarm attribute, the alarm attribute being selectively created in a control module or in an equipment module;
a routine for selectively disabling or enabling the created alarm attribute;
a routine for selectively placing an enabled alarm attribute in an acknowledged state or an unacknowledged state; and
a routine for selectively placing the alarm attribute in an active state or an inactive state;
a routine for selecting a priority for the alarm attribute; and
a routine for consolidating a plurality of active alarm conditions into a subset of highest priority alarms.

24. A computer program product according to claim 23, further comprising:
a routine for transitioning between a plurality of alarm attribute states, including:
a routine for selectively disabling or enabling an alarm attribute, the alarm attribute being in an inactive and acknowledged condition when the alarm attribute is disabled;
a routine for configuring the alarm attribute with a boolean attribute so that an alarm is active when the boolean attribute is true and the alarm is inactive when the boolean attribute is true;
a routine for optionally inverting the sense of the boolean attribute with an invert attribute; and
a routine for when the alarm attribute is enabled, selectively acknowledging the alarm attribute or unacknowledging the alarm attribute.

25. A computer program product according to claim 24, further comprising:
a routine for selectively automatically acknowledging an alarm attribute or not automatically acknowledging the alarm attribute based on priority of current alarms.

26. A computer program product according to claim 24, further comprising:
a routine for recording transitions of the alarm event state in an event journal for logging event conditions.

27. A computer program product according to claim 23, wherein the routine for consolidating a plurality of active alarm conditions includes:
a routine for ranking an alarm condition in an order of decreasing order of precedence based on an ordered priority including:
a routine for first ranking an unacknowledged condition with precedence over an acknowledged condition;
a routine for second ranking a condition in order of High selected priority, Medium selected priority, then Low selected priority; and
a routine for third ranking a condition in order of time of detection with a newest timestamp condition having a precedence over an older timestamp condition.

28. A computer program product according to claim 23, wherein the routine for consolidating a plurality of active alarm conditions includes:
a routine for user-level consolidation including:
a routine for displaying an alarm banner in a graphical user interface;
a routine for granting alarm privilege over a one or more plant areas to a user;

a routine for predefining an attribute container supporting an alarms attribute;

a routine for constructing a display referencing the attribute container; and a routine for allowing access to highest priority alarms based on the display referencing the attribute container.

29. A computer program product according to claim 23, wherein:

the conditions defined as events are conditions selected from among the conditions of:

alarms;

alarm acknowledgments;

user changes including attributes written by the user, methods invoked by the user, and log-in and log-out operations by the user;

configuration changes to a run time system including system installation and de-installation operations;

Sequential Function Chart (SFC) state changes;

Operator Attention Requests (OARs); and miscellaneous events including non-alarm state transitions and equipment state changes.

30. An article of manufacture storing a computer program product according to claim 23.

* * * * *